US009811702B2

(12) United States Patent
Gifford et al.

(10) Patent No.: US 9,811,702 B2
(45) Date of Patent: Nov. 7, 2017

(54) OPTICAL ACCESSORY FOR ATTACHMENT TO MOBILE DEVICE

(71) Applicant: COGNEX CORPORATION, Natick, MA (US)

(72) Inventors: Michael Gifford, San Leandro, CA (US); David James Stein, Purlear, NC (US); Steven Kearns, Fort Myers, FL (US); John Bryan Boatner, Andover, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/092,028

(22) Filed: Apr. 6, 2016

(65) Prior Publication Data
US 2016/0300092 A1   Oct. 13, 2016

Related U.S. Application Data

(63) Continuation-in-part of application No. 14/682,062, filed on Apr. 8, 2015, which is a continuation-in-part of application No. 14/682,072, filed on Apr. 8, 2015.

(51) Int. Cl.
*G06K 7/10* (2006.01)
*H04M 1/21* (2006.01)
*H04M 1/02* (2006.01)

(52) U.S. Cl.
CPC ..... G06K 7/10821 (2013.01); G06K 7/10732 (2013.01); H04M 1/21 (2013.01); *H04M 1/0264* (2013.01)

(58) Field of Classification Search
CPC .... G06F 1/1635; G06K 7/0004; G06K 7/089; G06K 7/10722; G06K 7/10732; G06K 7/10752; G06K 7/10811; G06K 7/10881

USPC ............ 235/462.32, 462.43, 472.01–472.03
See application file for complete search history.

(56) References Cited

U.S. PATENT DOCUMENTS

| 8,346,979 | B1 | 1/2013 | Lee |
| 8,832,323 | B2 | 9/2014 | Lee |
| 9,107,484 | B2 | 8/2015 | Chaney |
| 9,110,355 | B1 | 8/2015 | Nourbakhsh |
| 2010/0134679 | A1 | 6/2010 | Lin |
| 2013/0013813 | A1 | 1/2013 | Lee |

(Continued)

FOREIGN PATENT DOCUMENTS

EP   2500758 A1   9/2012

OTHER PUBLICATIONS

European Patent Office, Extended European Search Report, Application No. 16164426.5, Aug. 17, 2016.

(Continued)

*Primary Examiner* — Seung Lee
(74) *Attorney, Agent, or Firm* — Quarles & Brady LLP

(57) ABSTRACT

An attachment assembly for use with a mobile device with a camera or a case for the mobile device can include one or more of an attachment base and an attachment body. The attachment base can be configured to be secured to at least one of the mobile device and the case. The attachment body can include at least one optical device for use with the camera and can be configured to be removably secured to the attachment base. The attachment base can removably secure the attachment body to the mobile device or the case when the attachment body is removably secured to the attachment base.

31 Claims, 40 Drawing Sheets

(56) References Cited

U.S. PATENT DOCUMENTS

| | | |
|---|---|---|
| 2013/0109316 A1 | 5/2013 | Lee |
| 2014/0071547 A1 | 3/2014 | O'Neill et al. |
| 2014/0078594 A1 | 3/2014 | Springer |
| 2015/0199549 A1 | 7/2015 | Lei et al. |
| 2015/0220766 A1* | 8/2015 | Russell .............. G06K 7/10881 235/462.42 |
| 2015/0254485 A1 | 9/2015 | Feng et al. |
| 2015/0356336 A1 | 12/2015 | Hoobler et al. |
| 2016/0188940 A1 | 6/2016 | Lu et al. |
| 2016/0209735 A1 | 7/2016 | Anderson |
| 2016/0232389 A1 | 8/2016 | Gifford |
| 2016/0292477 A1 | 10/2016 | Bidwell |

OTHER PUBLICATIONS

Webpage: http://www.scandit.com/products/case/; 6 pages; download date Jan. 4, 2017.

\* cited by examiner

FRONT

BACK

PDF417

| Codabar | PDF417 |
|---------|--------|
| Code 11 | Aztec Code |
| Code 93 | QR code |
| Other | Other |

Fig. 8

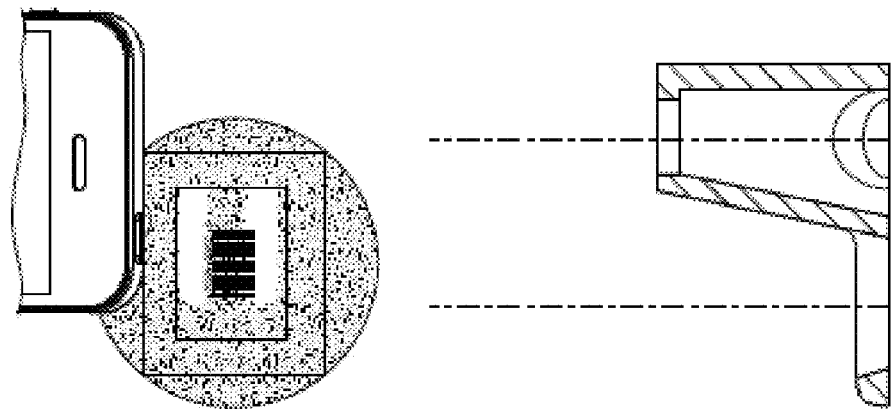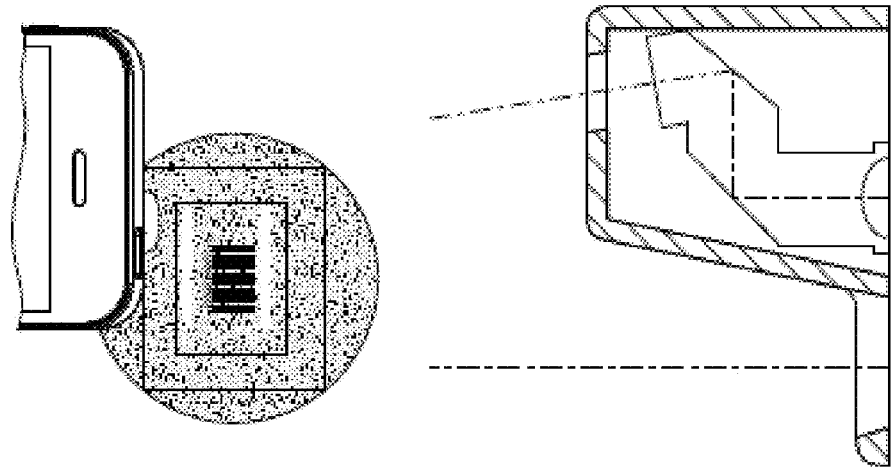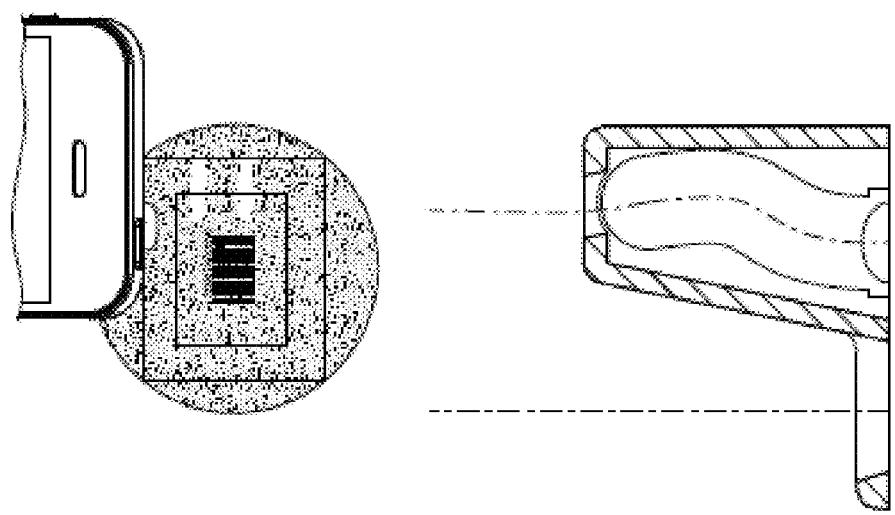
Fig. 21

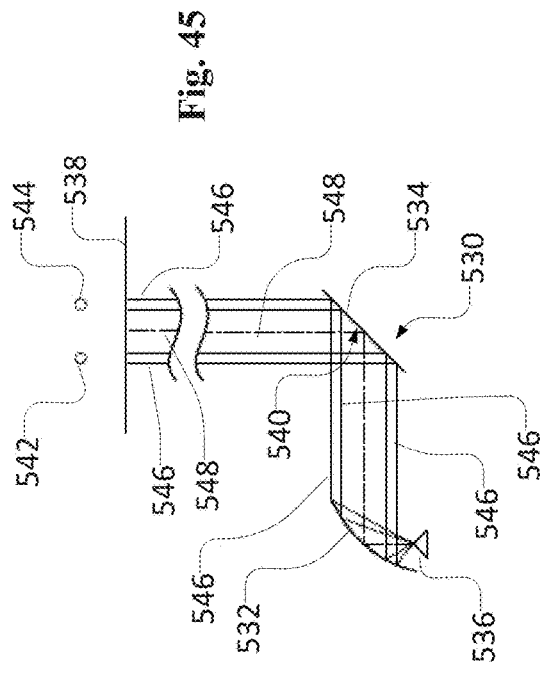
Fig. 45
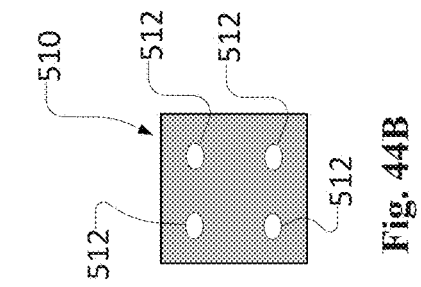
Fig. 46
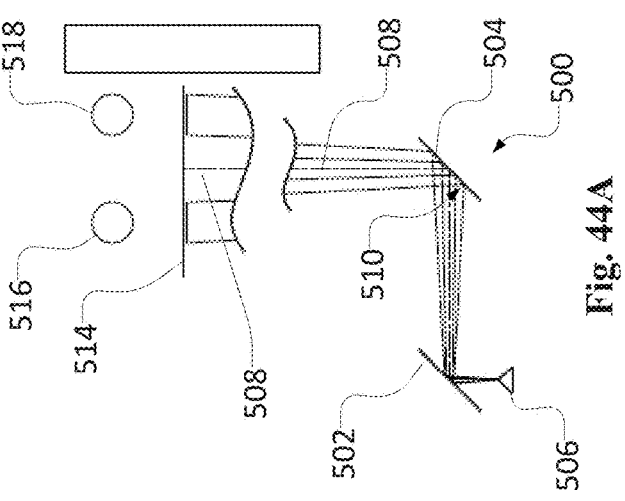
Fig. 44A
Fig. 44B

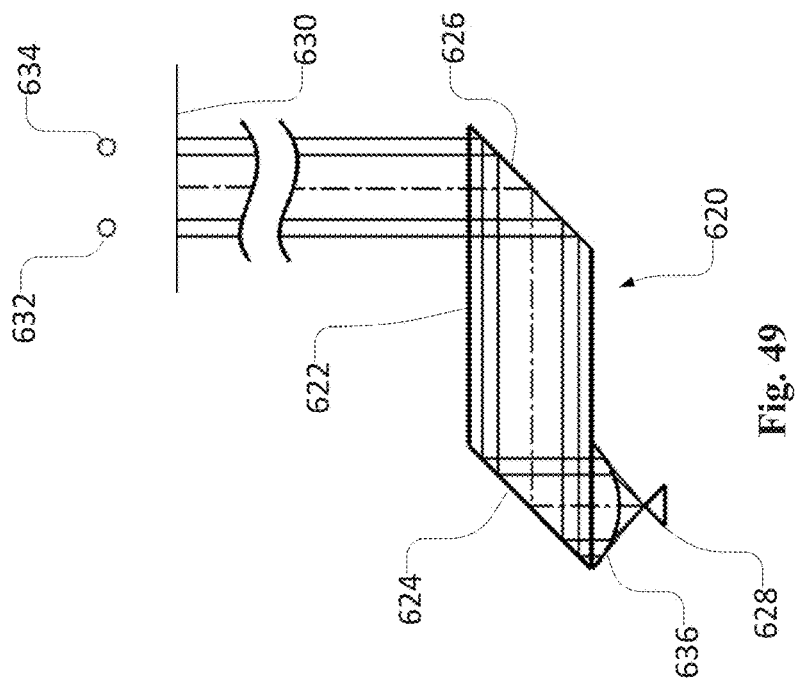
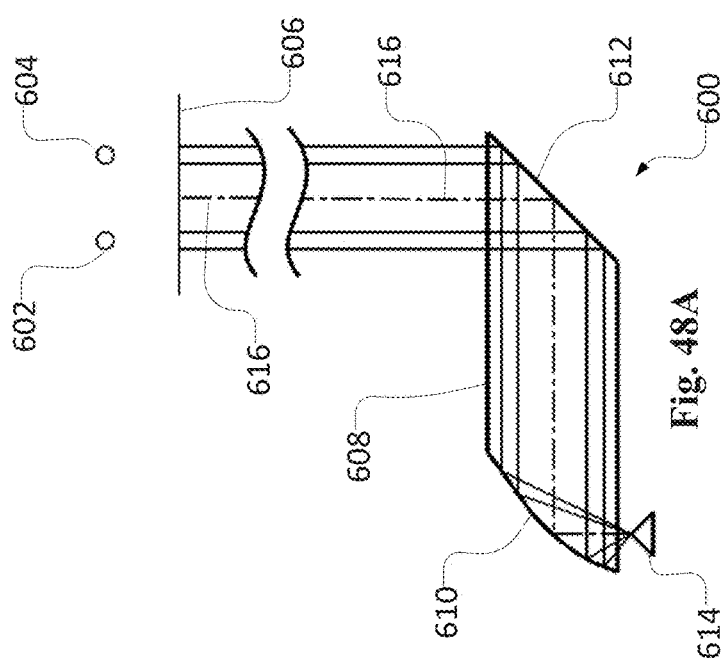
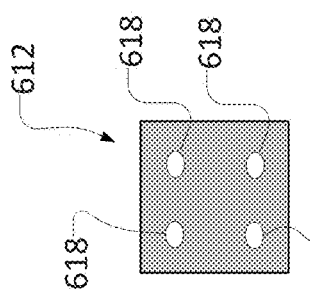

OPTICAL ACCESSORY FOR ATTACHMENT TO MOBILE DEVICE

CROSS-REFERENCE TO RELATED APPLICATIONS

This application is a continuation-in-part of co-pending U.S. patent application Ser. No. 14/682,062, titled "System for Capturing a Coded Image" and filed on Apr. 8, 2015 and is a continuation-in-part of co-pending U.S. patent application Ser. No. 14/682,072, titled "Aimer Accessory for Capturing a Coded Image" and filed on Apr. 8, 2015, both of which are incorporated herein by reference.

STATEMENT REGARDING FEDERALLY SPONSORED RESEARCH OR DEVELOPMENT

Not applicable.

FIELD OF THE INVENTION

The present invention relates to devices for optically acquiring data, and in particular, to optical barcode scanning devices.

BACKGROUND OF THE INVENTION

Handheld image and barcode scanning devices are well known and used in a wide range of enterprise applications. Barcode scanners are regularly used in connection with checkout stations at supermarkets and other retail establishments for reading barcodes on consumer goods. They are also useful in inventory collection and control for warehousing, shipping and storage of products.

Mobile electronic devices, such as smartphones and tablet computers, are well known and leveraged in a wide range of corporate and personal applications. Such devices, executing specialized software, are frequently being utilized to scan and decode barcodes on products, promotions, and coupons. The specialized software, or app, is typically downloaded to the device but may be preloaded. The app configures the smartphone or mobile device to use the built-in camera in the smartphone or mobile device to scan barcodes, such as those found on products or in magazines, stores, websites, and billboards.

Today's enterprise and personal workplace is changing. Technology is becoming more integrated with daily processes and procedures. In a mobile workplace, the mobile electronic device may provide a more cost effective and flexible alternative to traditional, dedicated and purpose-built handheld scanning devices.

However, scanning a barcode with a smartphone or other mobile electronic device can be cumbersome. To scan a barcode, the user is typically required to view the barcode through the display screen of the device in order to aim and focus the camera lens before the barcode can be successfully decoded. If the device's camera is not properly aimed and focused, it may be difficult or impossible to read the barcode, or may take an excessive amount of time to capture, detect, and decode the barcode from an image. As a result, the scanning of barcodes using a mobile electronic device is inefficient whenever there is a need for convenient, rapid, or high volume barcode detection and decoding. Improving the efficiency and ease-of-use of barcode scanning, using the built-in camera along with enhanced decoding software, is desirable.

Thus, methods and devices are needed to improve the efficiency and ease-of-use of scanning a barcode using a mobile device, such as a smartphone.

SUMMARY OF THE INVENTION

Technologies are described for optical scanning devices, and in particular to a system for scanning a barcode using a smartphone and other mobile devices.

Some embodiments of the invention include an attachment assembly for use with one or more of a mobile device with a camera and a case for the mobile device. The attachment assembly can include an attachment base and an attachment body. The attachment base can be configured to be secured to at least one of the mobile device and the case. The attachment body can include at least one optical device for use with the camera and can be configured to be removably secured to the attachment base. The attachment base can be removably secured to the at least one of the mobile device and the case when the attachment body is removably secured to the attachment base and the attachment base is secured to the at least one of the mobile device and the case.

Some embodiments of the invention include an attachment base for securing an attachment body to a case for a mobile device with a camera, where the case includes a first camera opening that is configured to align with a lens of the camera when the mobile device is inserted into the case, the case further includes a first shoulder at least partly surrounding the first camera opening, the attachment body includes at least one optical device for use with the camera, and the attachment body further includes at least one attachment arm with at least one protrusion. The attachment base can include, a second camera opening, a second shoulder at least partly surrounding the second camera opening, and at least one attachment opening with at least one overhang. The second shoulder can engage the first shoulder to align the camera opening with the lens of the camera when the attachment base is secured to the case. The at least one attachment opening can be configured to receive at least part of the at least one attachment arm, and the at least one overhang can be configured to engage the at least one protrusion to removably secure the attachment body to the attachment base.

Some embodiments of the invention include an attachment assembly for use with a mobile device with a camera and a case for the mobile device, where the case includes a first camera opening that is configured to align with a lens of the camera when the mobile device is inserted into the case, and the case further includes a first shoulder at least partly surrounding the first camera opening. The attachment assembly can include an attachment base and an attachment body. The attachment base can include at least one attachment opening with at least one overhang, a second camera opening, and a second shoulder at least partly surrounding the second camera opening. The second shoulder can engage the first shoulder to align the camera opening with the lens of the camera and prevent removal of the attachment base from the case via the first camera opening. The attachment body can include at least one optical device for use with the camera, and at least one attachment arm with at least one protrusion. The at least one protrusion can engage the at least one overhang, with at least part of the at least one attachment arm disposed within the at least one attachment opening, to removably secure the attachment body to the attachment base and the case.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The features and advantages of the invention are apparent from the following description taken in conjunction with the accompanying drawings in which:

FIG. 3A is a perspective diagram depicting an illustrative embodiment of an aimer accessory coupled to the mobile device of FIG. 1, and FIG. 3B is an exploded view of the aimer accessory of FIG. 3A;

FIG. 8 depicts an illustrative memory map of bar code symbologies used in the method of FIG. 6;

FIG. 21 are illustrative embodiments of light pipes or light-ray trace paths that are taught by this disclosure;

FIG. 44A is a schematic view of an optical device for projecting a pattern onto a target according to this disclosure;

FIG. 44B is a schematic view of a mask for the optical device of FIG. 44A;

FIG. 45 is a schematic view of another optical device for projecting a pattern onto a target according to this disclosure;

FIG. 46 is a schematic view of still another optical device for projecting a pattern onto a target according to this disclosure;

FIG. 48A is a schematic view of a further optical device for projecting a pattern onto a target according to this disclosure;

FIG. 48B is a schematic view of a reflecting surface for the optical device of FIG. 48A; and FIG. 49 is a schematic view of still a further optical device for projecting a pattern onto a target according to this disclosure.

DETAILED DESCRIPTION OF THE INVENTION

Figure 1A:
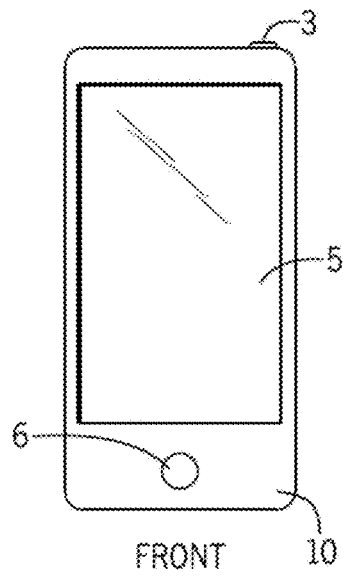
FIGS. 1A and 1B, collectively referred to herein as FIG. 1, show a diagram depicting aspects of a mobile device such as a smartphone.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein are methods and apparatus that permit users of mobile devices, such as a smartphone, to perform "blind and targeted scanning" of barcodes and other information bearing symbols. Generally, the methods and apparatus include an aimer module that collimates diffuse light from a lamp (LED or flash mechanism) on a mobile device for use in capturing a barcode image. The aimer module may also be integrated into a given mobile device or a protective case. Alternatively, the aimer module may be configured as an attachment for retrofit of a mobile device. Operation of the mobile device may be complemented with additional software to take advantage of the functionality of the aimer module. In order to provide some background for the teachings herein, some context is first provided.

Referring now to FIG. 1, there is shown aspects of an illustrative mobile device 10. In this example, the mobile device 10 is a "smartphone." Alternatively, the mobile device may be a tablet, an electronic pad, a laptop computer, or other mobile device. Salient aspects of the mobile device 10 include a home button 6, an on/off switch 3, a display 5, a camera 7, and a lamp 9. Generally, the foregoing components are conventional and provide functionality that is well known in the art. The mobile device 10 may be referred to herein as "smartphone 10" and by other similar terms. Illustrative smartphones include the IPHONE from Apple Corp. of Cupertino, Calif., devices operating on the ANDROID platform of Google Corp. of Mountain View, Calif., as well as devices operating in the WINDOWS environment provided by Microsoft Corp. of Redmond, Wash.

Figure 1B:
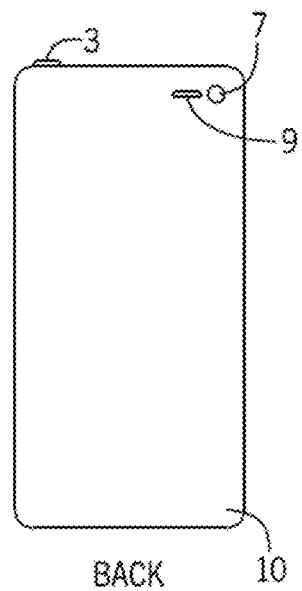

For purposes of convention and to aid in the discussion herein, terms of orientation are provided with regard to the figures. For example, FIG. 1A depicts the front of the mobile device 10. FIG. 1B depicts the back of the mobile device 10. The terms of orientation are with reference to orientation during operation of the mobile device 10. Generally, orientation of other components, such as the aimer module introduced herein, are with reference to orientation of the mobile device 10. For example, it is conceivable the aimer module mentioned herein could be adapted for usage on the front facing camera of the mobile device. However, again, this is not limiting of the teachings herein.

Figure 2:
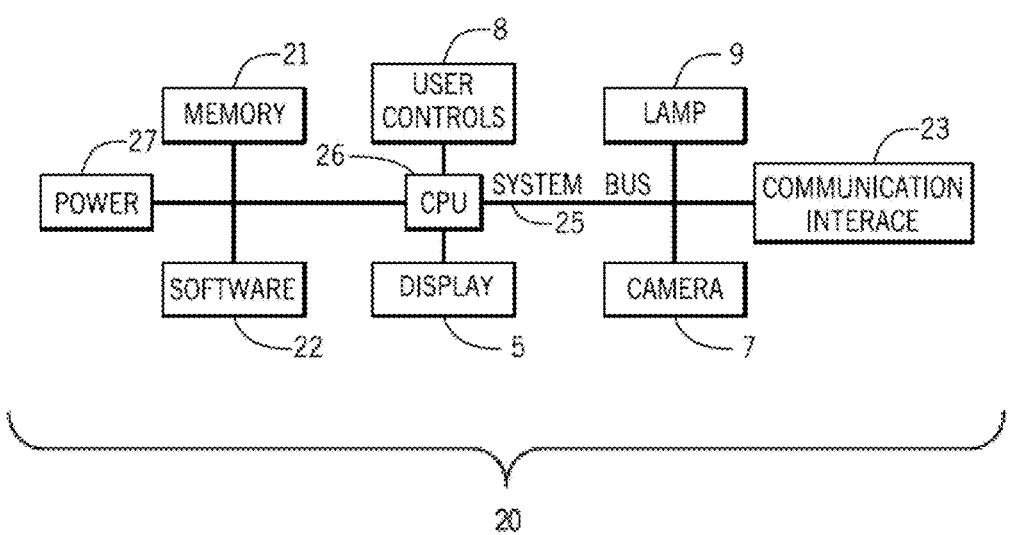
FIG. 2 is an illustrative topology for components of the mobile device of FIG. 1.

Referring now to FIG. 2, an illustrative topology 20 of the mobile device 10 is provided. The illustrative topology 20 depicts some of the components implemented in the mobile device 10. Included in the illustrative topology 20 is at least one central processing unit (CPU) 26. The central processing unit (CPU) 26 is connected to or in communication with other components through system bus 25. Illustrative other components include a power supply 27, memory 21, software 22, user controls 8, a display 5, a camera 7 (can be front or rear facing on mobile device 10), a lamp 9, and a communication interface 23.

The CPU 26 may be an ARM or other processor. The power supply 27 may be from a battery or a source of direct current (DC), such as a transformer coupled to a conventional alternating current (AC) outlet. User controls 8 may be a home button 6 and an on/off switch 3 shown in FIG. 1. Display 5 may include at least one of LCD, LED, OLED, AMOLED, IPS and other technologies. Lamp 9 may be a light emitting diode (LED).

The communication interface 23 may include a wired interface and/or a wireless interface. The wireless interface may include a wireless service processor. Illustrative wireless interfaces may make use of a protocol such as cellular, Bluetooth, Wi-Fi, near field technology (NFC), ZigBee, or other technology. Communication services provided over the wireless communication interface may include Wi-Fi, Bluetooth, Ethernet, DSL, LTE, PCS, 2G, 3G, 4G, LAN, CDMA, TDMA, GSM, WDM and WLAN. The communication interface 23 may include an auditory channel. That is, the communication interface 23 may include a microphone for receiving voice commands, and may further include a speaker. In some embodiments, the speaker may provide an auditory signal when a barcode has been read. The communication interface 23 may further include a status light or other such visual indicators.

The communication interface 23 provides for, among other things, voice communications as well as data communications. The data communications may be used to provide for communication of software and data (such as at least one image; results of analyses, and other such types of data). Communication through the communication interface 23 may be bi-directional or in a single direction.

The mobile device 10 may include additional components such as sensors. Illustrative sensors may include an accelerometer that provides for orientation information and a GPS sensor that provides for location information. The mobile device may also include peripheral interface and communication ports.

As discussed herein, the term "software" 22 generally refers to machine-executable instructions that provide for the implementation of the methods of this disclosure that are explained below. The machine-executable instructions may be stored on non-transitory machine-readable media such as memory 21. Illustrative methods that may be implemented to actuate the mobile device hardware may include instructions for operation of the camera 7, the lamp 9, communications through the communication interface 23, and other aspects of this disclosure as discussed further below. In some of the illustrative embodiments discussed herein, the software 22 provides for detecting and decoding barcodes within an image. However, it should be noted that the term "software" might describe sets of instructions to perform a great variety of functions.

The memory 21 may include multiple forms of memory. For example, the memory 21 may include non-volatile random access memory (NVRAM) and/or volatile random access memory (RAM). Generally, the non-volatile random access memory (NVRAM) is useful for storing software 22 as well as data generated by or needed for operation of the software 22 such as rules, configurations and similar data. The memory 21 may include read only memory (ROM). The read only memory (ROM) may be used to store firmware that provides instruction sets necessary for basic operation of the components within the topology 20.

The camera 7 may include any appropriate sensor and at least one optical element such as a lens. Generally, the camera 7 may include those components as needed to record (also referred to as "capture") images of items such as a barcode and further include photodetectors, amplifiers, transistors, and processing hardware and power management hardware. The lamp 9 may include any appropriate source of illumination. Illustrative components for the lamp 9 include at least one light emitting diode (LED).

Although the illustrative mobile device 10 disclosed is a smartphone, the mobile device 10 is not limited to this embodiment and may include other devices. Accordingly, it is not required that the mobile device 10 incorporate all of the components of FIG. 2, and other components may be included. In order to provide some further context for the teachings herein, some terms used herein are now introduced.

As discussed herein, the term "barcode" generally refers to an optical machine-readable symbology that contains a representation of data. Generally, any given barcode is a representation of data that is related to the object to which it is attached. A barcode as discussed herein may include data that is arranged in a one-dimensional (1D) array, a two-dimensional (2D) array; and/or a 3D physical tag. Information may be conveyed in a given barcode according to arrangements of symbology, and may further convey information in a plurality of wavelengths and/or colors (i.e., varying groups of visible wavelengths).

Illustrative forms of one-dimensional (1D) barcodes include: Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; Post-Bar; POSTNET; RM4SCC/KIX; Telepen; and UPC., as well as others.

Illustrative forms of two-dimensional (2D) barcodes (also referred to as a "matrix code") include: Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; Hue-Code; InterCode; MaxiCode; MMCC; NexCode; Nintendo e-Reader; Dotcode; PDF417; QR code; ShotCode; SPAR-QCode; and others.

As discussed herein, a "light pipe" or "light tube" is a physical structure used for transporting of light for the purpose of illumination and is an example of an optical waveguide. A light pipe generally provides the transport of light to another location, minimizing the loss of light. A light pipe may include highly transmissive material, and may include reflective materials, collectors, reflectors, concentrators, at least one lens, and other components as deemed appropriate. An illustrative light pipe is an optical fiber. Light pipes, as discussed herein, may be formed of any suitable material. Illustrative materials include acrylic plastic, silicon glass, and other such materials. A light pipe may be hollow and open or closed to the external atmosphere. A light pipe can be configured to transmit only light of a particular color (or colors).

Generally, the following discussion provides an introduction to an aimer module, methods for use of the aimer module, aspects of some illustrative embodiments of the aimer module, and some detail on software that may be used in conjunction with the aimer module.

Broadly speaking, an aimer module for a mobile device and method of use is provided by this disclosure. The aimer module collimates diffuse light from a lamp on a mobile device for use in capturing a barcode image. The aimer module includes a means for receiving light from a lamp of the mobile device, and generating a light pattern on the surface containing a barcode. The receiving and generating means may include a grating or configuration of mirrors. Registration of the light pattern and the barcode in a scan area enhances the ability of the specialized software on the mobile device to read the barcode.

As used herein, the term "registration" means that a barcode and a light pattern generated by the aimer module on the surface containing the barcode are in the viewing angle of the camera. This viewing angle can change depending on the lens and the smartphone. In one illustrative example, the camera may use a cone type lens. In this example, if the barcode and the light pattern on the surface containing the barcode are both in the cone of viewing, there would be a registration of the light pattern and the barcode according to this disclosure. As explained in this disclosure, once the barcode and the light pattern generated by the aimer module on the surface containing the barcode are in "registration," the smartphone may capture the barcode image and decode the barcode as explained below.

Broadly speaking, there are at least three types of registration contemplated by this disclosure. These three types of registration correspond to three modes of operation of the aimer module contemplated by this disclosure. These three modes of operation are blind mode scanning, targeted mode scanning, and smartphone display mode scanning, otherwise referred to as display mode scanning. In addition, both blind mode scanning and targeted mode scanning may be used with or without display mode of operation. Hence, this disclosure provides for at least five modes of operation. These modes of operation are depicted in the Table 1 and are explained in greater detail below.

TABLE 1

Modes of operation of Smartphone or Other Mobile Device with Aimer Module

| Configuration | Blind Mode Operation | Targeted Mode Operation | Display Mode Operation |
| --- | --- | --- | --- |
| Blind Mode Configuration ON-Display Not Used | Blind Mode Blind | | |
| Blind Mode Configuration ON-Display Used | Blind Mode Targeted | | |
| Targeted MODE Configuration ON-Display Not Used | | Targeted Mode Blind | |
| Targeted MODE | | Targeted | |

TABLE 1-continued

Modes of operation of Smartphone or Other Mobile Device with Aimer Module

| Configuration | Blind Mode Operation | Targeted Mode Operation | Display Mode Operation |
|---|---|---|---|
| Configuration ON-Display Used | | Mode Targeted | |
| Blind Mode AND Targeted Mode Configurations OFF-Display Used | | | Display Mode |

In blind mode of operation, the light pattern on the surface containing the barcode can be anywhere in the cone of viewing. The user uses the light pattern generated by the aimer module of this disclosure as a pointer and points the light pattern at the surface containing the barcode. There is no need for the user to look through the display of the smartphone when operating the scanning features of this disclosure in blind mode. So long as the user aims the light pattern at the surface containing the barcode, such that the light pattern and barcode are both within the cone of viewing, there is a registration of the light pattern and the barcode in blind mode according to this disclosure. As indicated in Table 1, the user may employ blind mode operation with or without the use of the display. The most efficient manner of blind mode operation involves a blind mode blind operation without the use of the display. In this case, the user would simply look at and direct the light pattern generated by this disclosure at or around the barcode image in order to "register" the light pattern with the barcode image as previously explained. After registration, the barcode image is captured by activation of a mechanical trigger on the smartphone, an activation button on the display of the smartphone, or by lapse of a predetermined period of time after registration of the light pattern with the barcode image as explained below. However, in some cases of blind mode operation, the user may look through the display of the smartphone to assist in the guiding of the pattern of light at or about the barcode image. This mode of operation is known as blind mode targeted mode of operation since the display of the smartphone is used to "target" the pattern of light at or about the barcode image to generate the registration required for blind mode operation as taught by this disclosure.

In targeted mode of operation, the light pattern on the surface containing the barcode must hover over the barcode. As in blind mode, the user uses the light pattern generated by the aimer module of this disclosure as a pointer and points the light pattern at the surface containing the barcode. In targeted mode, the light pattern must hover over the barcode to be in registration unlike blind mode where registration may occur when the light pattern is shining outside the barcode but still within the cone of viewing. As the user aims the light pattern at the surface containing the barcode such that the light pattern is hovering over the barcode and within the cone of viewing, there is a registration of the light pattern and the barcode in targeted mode according to this disclosure. As indicated in Table 1, the user may employ targeted mode operation with or without the use of the display. The most efficient manner of targeted mode blind operation involves a targeted mode blind operation without the use of the display. In this case, the user would simply look at and "hover" the light pattern generated by this disclosure over the barcode image in order to "register" the light pattern with the barcode image as previously explained. After registration, the barcode image is captured by activation of a mechanical trigger on the smartphone, an activation button on the display of the smartphone, or by lapse of a predetermined period of time after registration of the light pattern with the barcode image as explained below. However, in some cases of targeted mode of operation, the user may look through the display of the smartphone to assist in the guiding of the pattern of light to hover over the barcode image. This mode of operation is known as targeted mode targeted mode of operation since the display of the smartphone is used to "target" the pattern of light to "hover" over the barcode image to generate the registration required for targeted mode operation as taught by this disclosure.

In display mode of operation, the user uses the display of the smartphone to point the camera lens at the image. So long as the user points the camera lens at the image such that the light pattern and barcode are both within the cone of viewing, there is a registration of the light pattern and the barcode in smartphone display mode according to this disclosure. The aimer module is not used when the smartphone is operating in display mode of operation. Instead of using the light pattern generated by the aimer module of this disclosure, the lamp of the smartphone is used conventionally to provide direct diffuse lighting for illuminating the barcode image in order that the smartphone can capture the barcode image.

Referring now to FIG. 3, aspects of the illustrative mobile device 10 are shown. In this example, the mobile device 10 is outfitted with an aimer module that in FIG. 3 is depicted as aimer accessory 30. Generally, the aimer accessory 30 is tightly coupled to the mobile device 10 using conventional techniques. For example, the aimer accessory 30 may be configured as an attachment piece for use in retrofitting of a given mobile device 10. Alternatively, the aimer accessory 30 may be integrated into a given mobile device 10. In embodiments in which the aimer accessory 30 is attached to the mobile device, the aimer accessory 30 may be attached by snap-fit connection as illustratively shown in FIGS. 23-26 and as explained below. In other embodiments, the aimer accessory 30 may be an accessory that is integrated into a protective case in which the mobile device 10 is stored. In other embodiments, the aimer accessory 30 may be an accessory that is permanently affixed to the mobile device 10. For example, the aimer accessory 30 may be glued to the mobile device 10. In some other embodiments, the aimer accessory 30 may be temporarily affixed to the mobile device 10. For example, the aimer accessory 30 may include an embedded magnet that is magnetically attracted to the housing of the mobile device 10. Some designs of the aimer accessory 30 provide for mechanical retention of the aimer accessory 30 on the mobile device 10 (for example, refer to FIG. 18). The aimer accessory 30 may also be referred to herein simply as the "aimer 30."

Figure 3A:
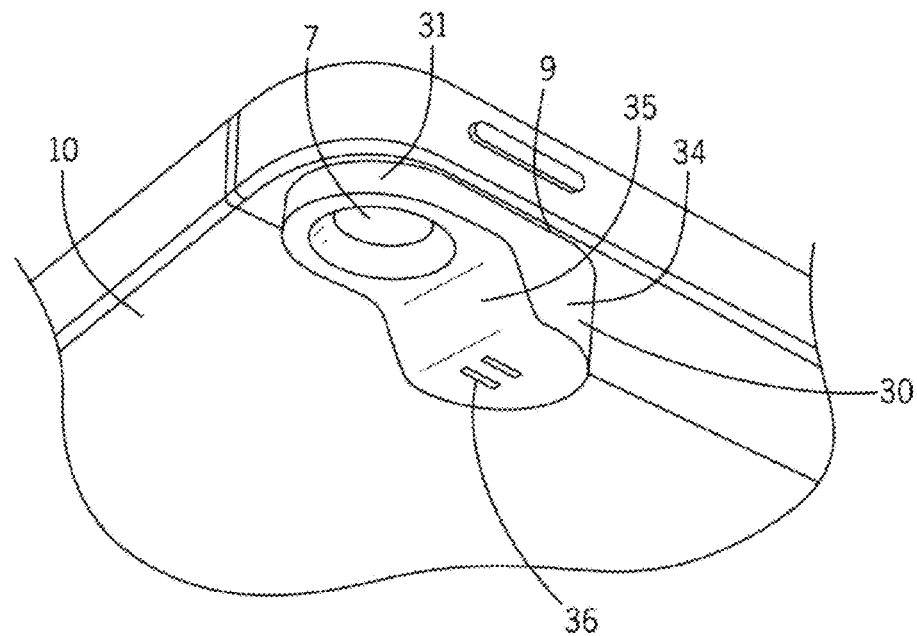
FIGS. 3A and 3B are collectively referred to herein as FIG. 3.
Figure 3B:
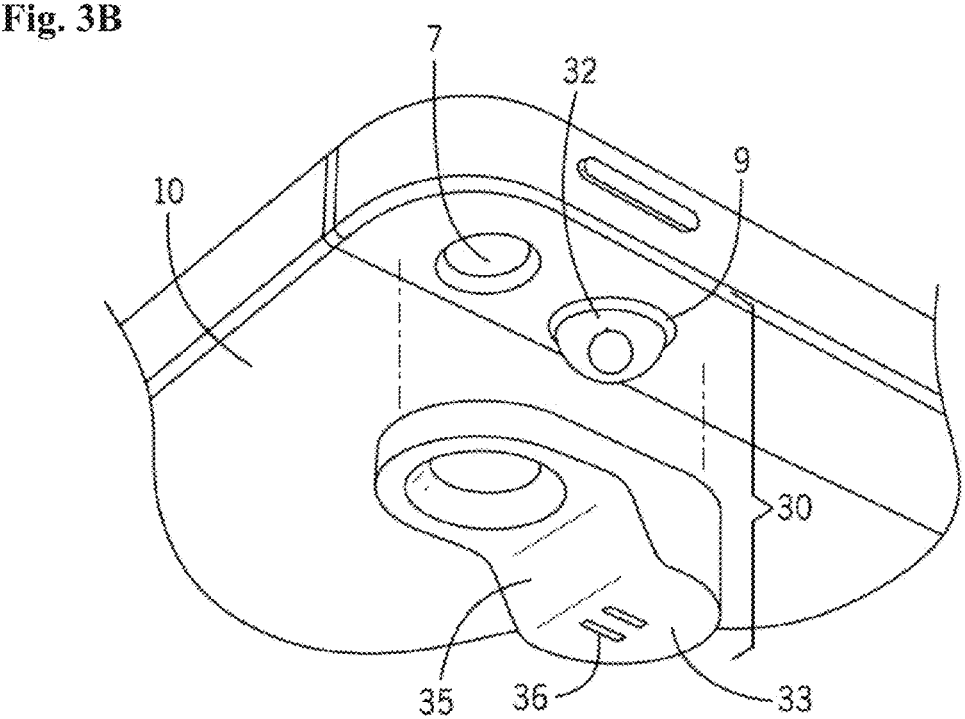
Figure 4A:
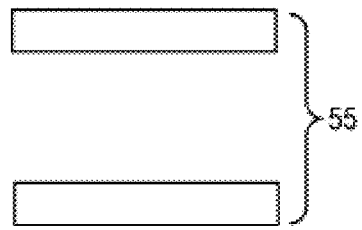
FIGS. 4A through 4E, collectively referred to herein as FIG. 4, are depictions of embodiments of possible light patterns produced by the mobile device and accessory depicted in FIG. 3.
Figure 4B:
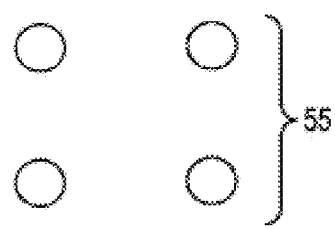
Figure 4C:
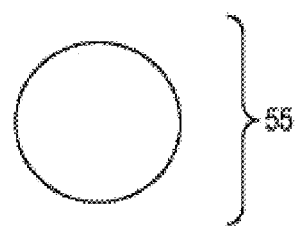
Figure 4D:
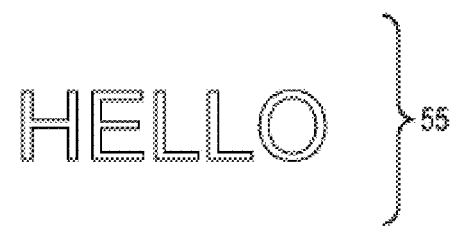
Figure 4E:
Figure 5A:
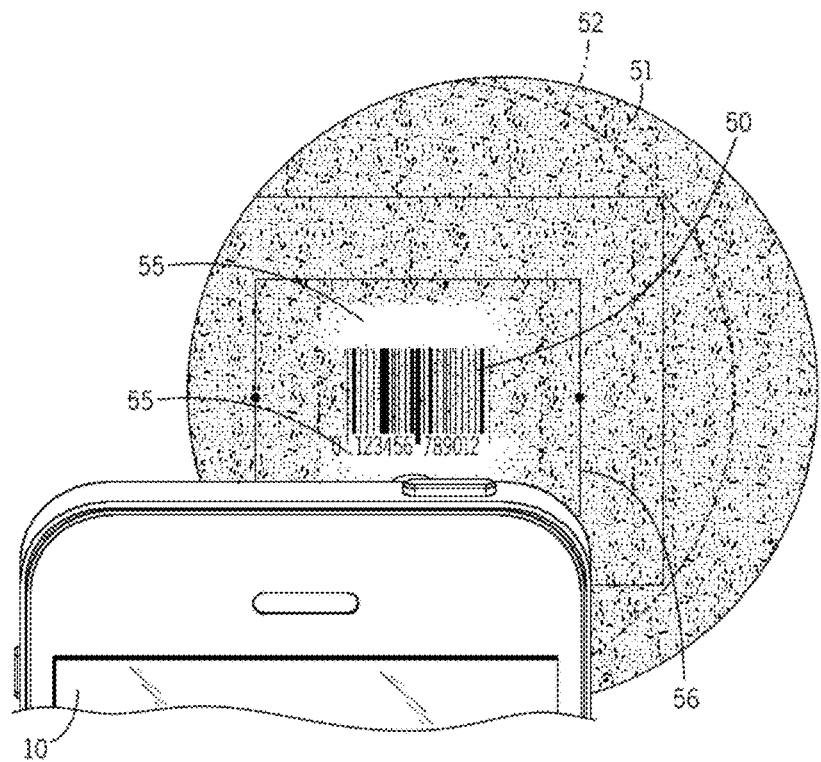
FIG. 5A-D are illustrations depicting light patterns generated by the aimer accessory of FIG. 3 in relation to a barcode.
Figure 5B:
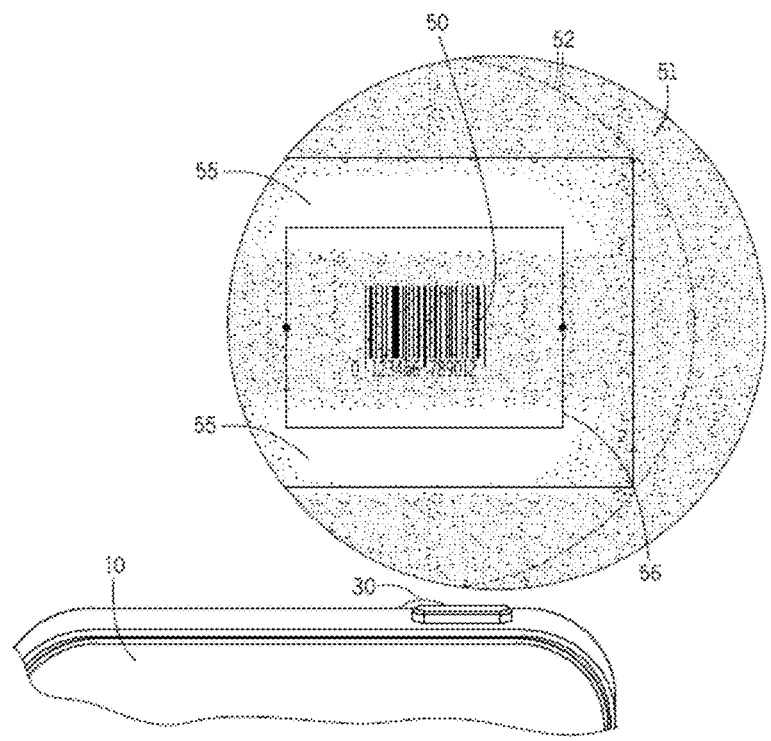
Figure 5C:
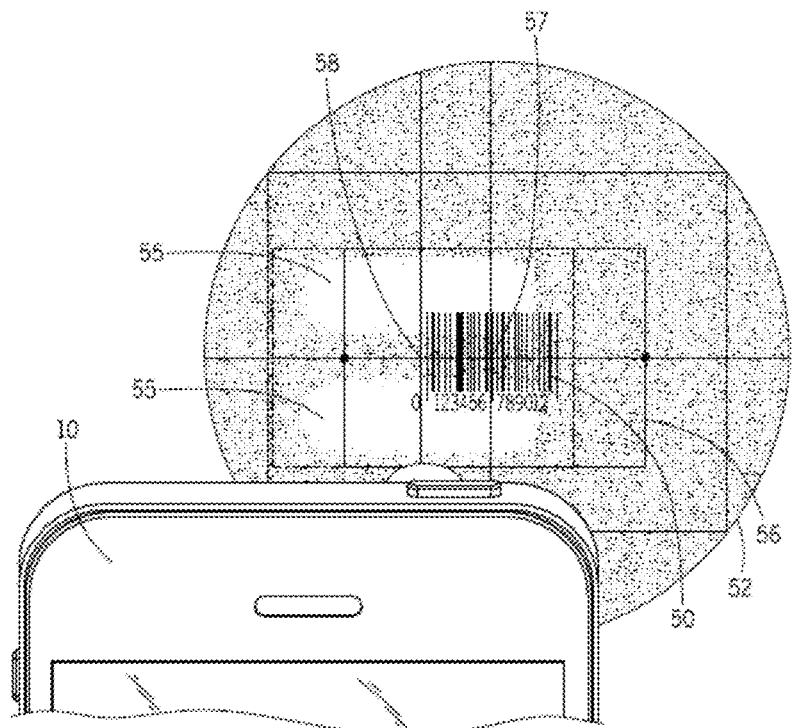
Figure 5D:
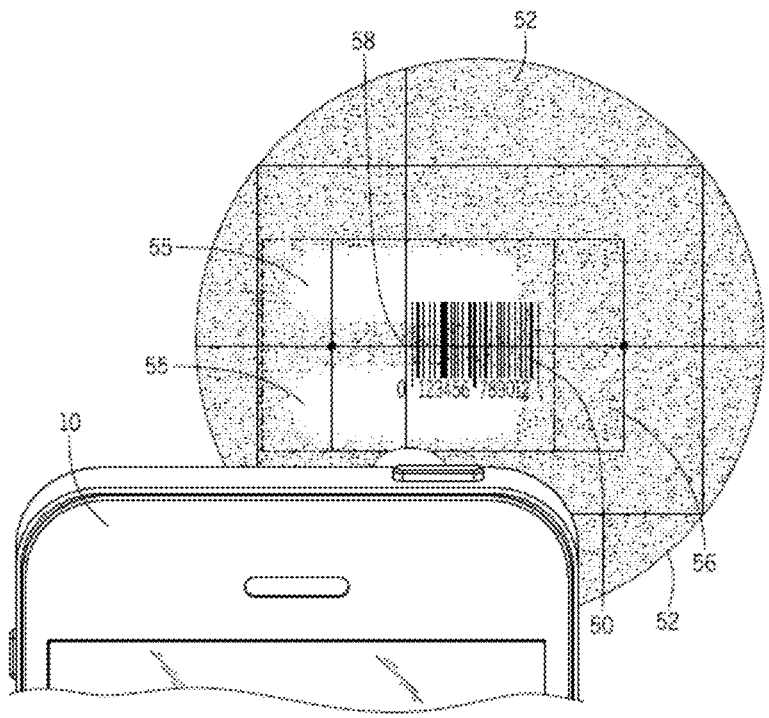
Figure 10:
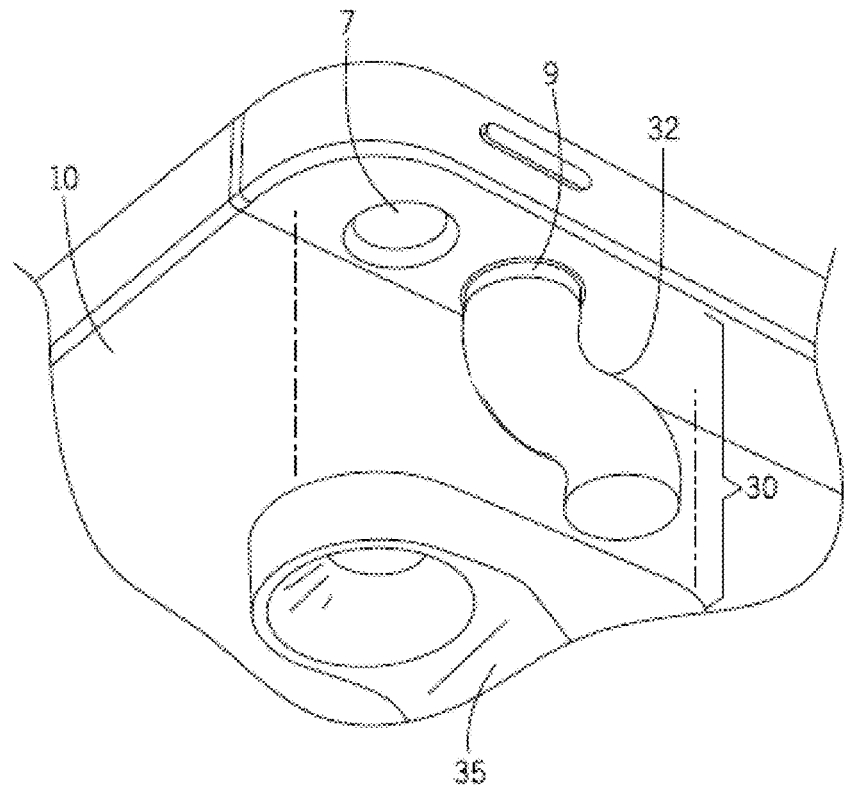
FIG. 10 is an exploded view of the aimer accessory of FIG. 9.

In the illustrative embodiment depicted in FIG. 3 (i.e., FIGS. 3A and 3B), the aimer accessory 30 includes a body 35. The body 35 includes a collector 31 that surrounds the lens and sensor associated with the camera 7. The body 35 further includes a collimator 34. The collimator 34 provides for collimation of light from the lamp 9. The distal portion 33 of the collimator 34 (see FIG. 3B) includes a grating 36. Generally, the grating 36 receives light from the lamp 9. The light may pass through at least one optical element 32. Then at least one optical element 32 may provide for focusing light from the lamp 9 and/or directing the light through the grating 36. In the example shown, at least one optical element 32 is disposed over the lamp 9. In some embodiments, at least one optical element 32 includes a light pipe. In the example shown in FIG. 3B, optical element 32 is shown as a hemispherical element. Illustrative embodiments with other configurations of the light pipe are shown in FIGS. 10 and 21. In the example shown in FIG. 3, the grating 36 illustratively includes two substantially parallel slits disposed in the distal portion 33 of the collimator 34. As explained below, some example patterns that may be disposed in the grating 36 include parallel slits, a substantially rectangular array of holes, a rectangular array of holes, and a pattern of an icon. Some resulting light patterns (also referred to as a "pattern of light") produced by the grating 36 are shown in FIG. 4. Generally, the grating 36 provides for casting a pattern of light 55 onto a sample for imaging. In the examples discussed herein, the sample includes various forms of barcodes.

In some embodiments, at least one mirror is used with or without the grating 36. In some other embodiments, at least one mirror is used with additional optical elements as deemed appropriate. This is explained further in connection with FIG. 20A-C.

Referring now to FIGS. 5 through 8, aspects of a process for imaging a barcode 50 with the aimer 30 are shown. In each of FIGS. 5 through 8, a user at some distance holds the mobile device 10 from the barcode 50. The software 22 (shown in FIG. 2) has been invoked and is causing the mobile device 10 to attempt imaging of the barcode 50.

In FIG. 5, an illustrative barcode 50 is shown. The illustrative barcode 50 is located within a field of view (FOV) 51. The field of view (FOV) 51 represents the entire area that is naturally visible to the camera 7 of the mobile device 10 (i.e., viewing angle of the camera). This is also what the user sees on the display of a camera when doing a display mode scan, as taught in the prior art. A shifted field of view (SFOV) 52 is also shown. The shifted field of view (SFOV) 52 is a subset of the field of view (FOV) 51 and is a result of processing by the specialized software 22. The shifted field of view (SFOV) 52 represents an area within the field of view (FOV) 51 that aligns with a light pattern 55 that is cast by the aimer accessory 30. This light pattern is what the user uses to do a blind scan or targeted scan according to this disclosure. A scan area 56 is maintained within the shifted field of view (SFOV) 52. Generally, the scan area 56 is a region of the shifted field of view (SFOV) 52 that is used by the software 22 to look for a barcode.

As shown in FIGS. 5A-D, the light pattern 55 correlates with the appearance of the grating 36 (see FIG. 3B). That is, referring back to FIGS. 3 and 4, it may be seen that the grating 36 illustratively includes two parallel slits from which light is emitted. In each of FIGS. 5 through 8, the light pattern 55 correlates with the two substantially parallel slits. Alternatively, the light pattern 55 may be any of the other patterns illustrated in FIG. 4, but also other shapes depending on the implementation of the grating 36.

Figure 6:
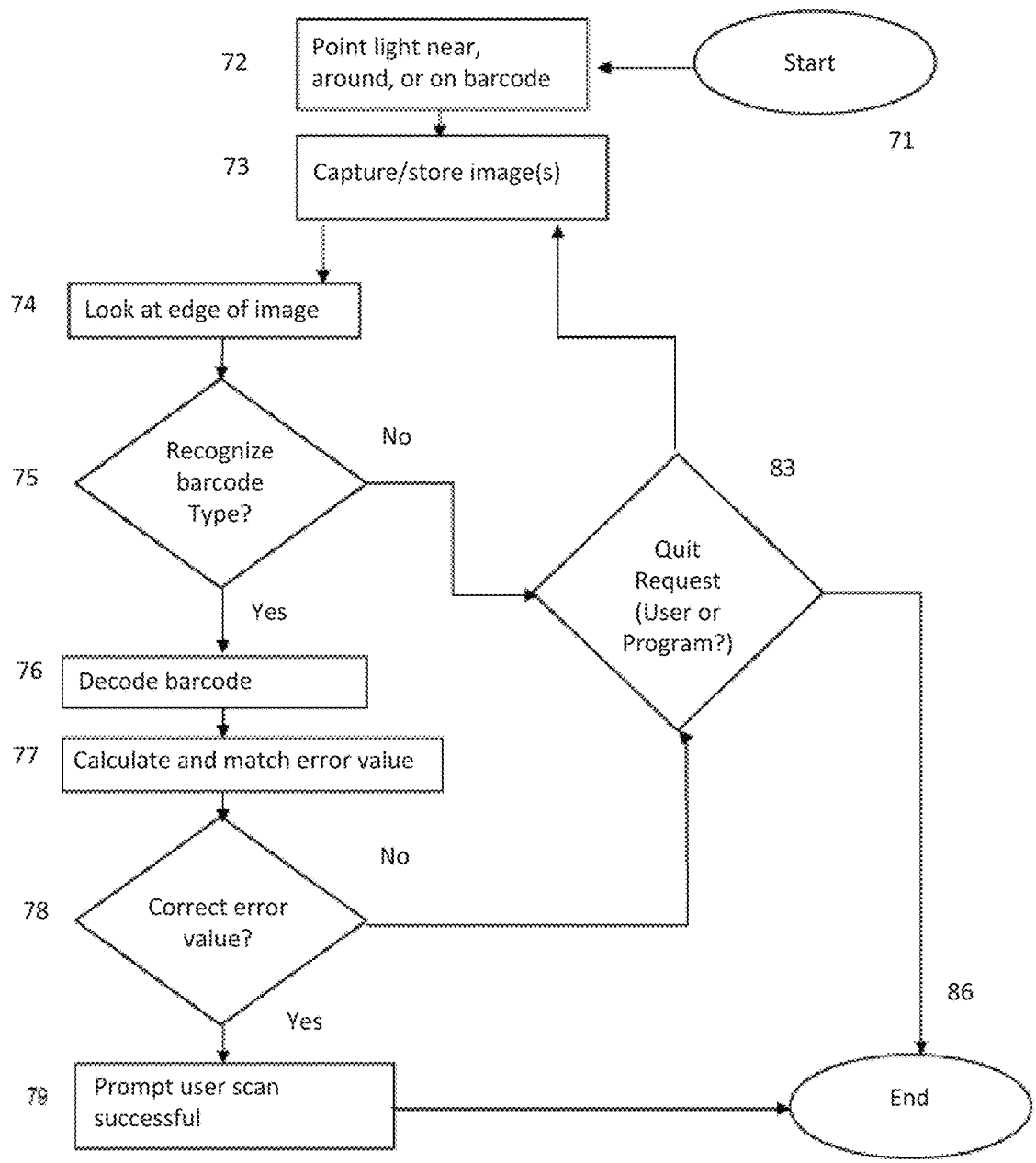
FIG. 6 depicts an illustrative method according to this disclosure for using the aimer module of this disclosure.

The software 22 makes use of the light pattern 55 cast by the aimer accessory 30. Generally, once the software 22 has received a command from the user to commence scanning, or a predetermined period of time has elapsed after registration of the light pattern and the barcode, the software 22 begins processing images collected from the camera 7 on a continuing basis. When the light pattern 55 is appropriately manifested within the scan area 56, the software 22 identifies a focal point 57 (shown in FIG. 5C). In this example, the focal point 57 is centered within the scan area 56. The software 22 recognizes the apparition of the barcode 50, and adjusts the focal point 57 to a start of the barcode 50. Once an adjusted focal point 58 has been determined, the software 22 will read the captured barcode 50. Once the captured barcode 50 has been read, the software 22 may store data in the memory 21 (shown in FIG. 2). In some implementations, the software 22 can be configured to turn the lamp 9 on or off, as appropriate, for the capturing of images with the camera 7, FIG. 6 depicts an illustrative method for using the aimer module of this disclosure. The process starts 71 by user selection of mode of operation—namely, blind mode blind mode operation, blind mode targeted mode operation, targeted mode blind mode operation, targeted mode targeted mode operation, or display mode operation. After selection of the operational mode, the user points 72 the light near, around, or on the barcode. In both blind mode blind mode operation and targeted mode blind mode operation, the user uses the light pattern generated by the aimer module of this disclosure as a pointer and points the light pattern at the surface containing the barcode. The light pattern generated by the aimer module guides the user on where to point the light pattern. In both blind mode targeted mode operation and targeted mode targeted mode operation, the user uses the display of the smartphone to point the light pattern generated by the aimer module of this disclosure at the surface containing the barcode. In display mode, the lamp of the smartphone is used conventionally to provide direct diffuse lighting for illuminating the barcode image in order that the smartphone can capture the barcode image.

The decoding software of this disclosure takes care of decoding the images of the barcode captured by the smartphone. In both blind mode blind mode operation and targeted mode blind mode operation, there is no need for the user to look through the display of the smartphone when operating the scanning features of this disclosure in blind or targeted mode. In blind mode targeted mode operation, targeted mode targeted mode operation, and display mode operation, the user will look through the display to point the light at the barcode.

Further, in blind mode blind mode operation and blind mode targeted mode, it is only necessary for the user to aim the light pattern generated by the aimer module at the surface containing the barcode such that the light pattern and barcode are both within the cone of viewing. This ensures registration of the light pattern and the barcode in blind mode according to this disclosure. In targeted mode blind mode operation and targeted mode targeted mode operation, it is necessary for the user to aim the light pattern at the surface containing the barcode such that the light pattern is hovering over the barcode and within the cone of viewing. This ensures registration of the light pattern and the barcode in targeted mode according to this disclosure. In display mode, the aimer module is not used when the smartphone is operating in display mode of operation. Instead of using the light pattern generated by the aimer module of this disclosure, the lamp of the smartphone is used conventionally to provide direct diffuse lighting for illuminating the barcode image in order that the smartphone can capture the barcode image.

A user may find the blind mode of operation most efficient when a surface contains only a single barcode. With a single barcode within the cone of vision, the specialized software of the mobile device, equipped with an aimer module of this disclosure, recognizes there is only one barcode to decode. The decoding software may invoke the scan any time during the process as previously explained. No further logic is needed. However, when a surface contains two or more barcodes, the software of the aimer module requires further logic to determine which barcode to decode. This disclosure provides this further logic within the targeted mode of operation by requiring the user to point the light pattern within the barcode desired for decoding and keep the light pattern over the barcode (i.e., hover over the barcode). The user then initiates a trigger to capture the image or the user hovers over the barcode for a predetermined period of time which may be set by the user. Illustratively, this period of time may be one-half second, but the exact time is a matter of design choice. It will be appreciated that a user may use the aimer module of this disclosure in targeted mode to also scan a surface containing a single barcode. However, because this mode of operation requires the user to hover the light pattern over the barcode, it may be a less efficient procedure for scanning a single barcode than scanning the barcode in blind mode of operation, but with multiple barcodes present in a given area on a page, it may be the desired method of reading the targeted barcode. With display mode, the software of the aimer module requires further logic to determine when the user has lined up the camera lens with the barcode through the display. This logic is illustratively provided by a trigger the user may initiate after the display indicates the camera lens is lined up with the barcode.

The smartphone captures 73 one or more images and typically stores them in memory 21 (FIG. 2) of the smartphone. The capture may be initiated by user activation of a mechanical trigger. Alternatively, the capture may be initiated by user activation of a button on the smartphone, such as an on-screen software button or a physical re-programmed button. In another example, the capture may be automatically initiated (e.g., software initiated) a predetermined period of time after registration of the light pattern and the barcode as explained in this disclosure. In either instance, software responsive to the initiation would begin the capture of a series of images. Typically, the camera may grab 25 or 30 frames of captured images a second. Some cameras may grab 60 frames a second. The number of frames of images captured by the camera is dependent on the camera. In either event, the captured images are stored in memory 21 (FIG. 2) of the smartphone.

Figure 7:
FIG. 7 depicts an example of a PDF417 barcode useful for understanding the method of FIG. 6.

Starting with one captured image, which may be the first image captured and stored in memory, the software of the aimer module will look 74 at an edge of the captured image. FIG. 7 depicts an example of a PDF417 barcode useful for understanding the method of FIG. 6. The beginning and the ending of the barcode, herein referred to as the edge of the barcode, contains a start character and a stop character. The start and stop characters are used by the software of the aimer module of this disclosure to identify the type of barcode (i.e., its symbology). Hence, and referring back to FIG. 6, aimer module software looks 74 at the edge of the captured image for the start and stop characters to identify the type of barcode.

The aimer module software then determines the symbology of the barcode. In this regard, the aimer module software will illustratively access a memory map of symbologies such as depicted in FIG. 8 to match the start and stop characters it has determined to the start and stop characters appearing in the table. If it finds a match, the aimer module software has identified the symbology of the barcode.

If the aimer module software does not recognize the barcode type whether because it has not identified a start and/or stop character or the start and/or stop characters it has identified do not match the start and stop characters in the memory map depicted in FIG. 8, the aimer module will determine 81 if it has another captured image of the barcode to further use in this process of decoding the captured barcode. If the aimer module software determines there are further images available for use in the process, the aimer module software will advance 80 to the next image and repeat steps 74 and 75. If the aimer module software determines there are no further images available for use in the process, the aimer module software prompts 84 the user that the scan failed and the process ends 86. This means that the user will need to begin the process over if the scan of the barcode remains of interest.

If the aimer module software recognizes the barcode type, the aimer module software decodes 76 the barcode and then calculates and matches 77 the check sum it has calculated with the check sum found in the pattern of the barcode. The aimer module software then determines 78 if the calculated error is correct (i.e., that the calculated check sum matches the check sum in the pattern of the barcode). If the calculated error value is not correct, the aimer module software will determine 83 if it has another captured image of the barcode to further use in this process of decoding the captured barcode. If the aimer module software determines there are further images available for use in the process, the aimer module software will advance 82 to the next image and repeat steps 76, 77, and 78. If the aimer module software determines there are no further images available for use in the process, the aimer module software prompts 84 the user that the scan failed and the process ends 86. This means that the user will need to begin the process over if the scan of the barcode remains of interest. If the aimer module software determines 78 that the calculated error is correct (i.e., that the calculated check sum matches the check sum in the pattern of the barcode), the aimer module software continues 79 the software program which can prompt the user that the scan was successful and the process ends 86. The notification can be an audible, a vibration, a display LED coloring or blinking, or any combination of these or other physical notifications.

Figure 9:
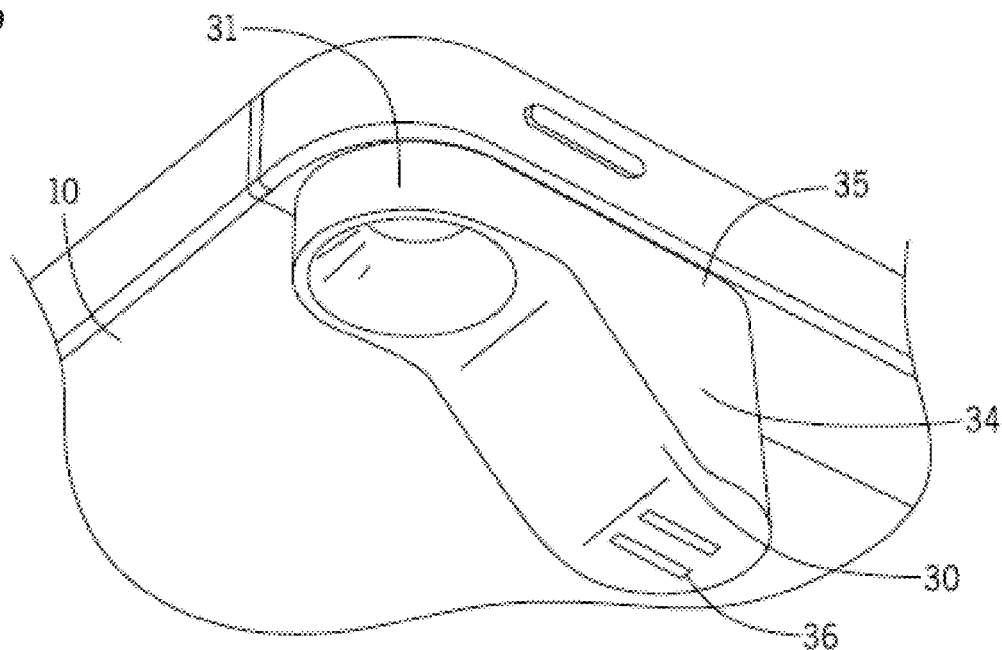
FIG. 9 depicts an alternative embodiment of an aimer accessory.

FIGS. 9 and 10 depict another embodiment of the aimer accessory 30. In this example, the aimer accessory 30 is configured to offset the optical path taken by the light that is emitted by the lamp 9. The offset provides for effectively redirecting light from the lamp 9 some distance from the camera 7. In this example, this is accomplished by using an optical element 32 that includes a light pipe (shown in FIG. 10). Generally, the light pipe includes substantially transmissive material. In this example, the light pipe also includes reflective surfaces that provide for internal reflection within the light pipe.

Figure 11:
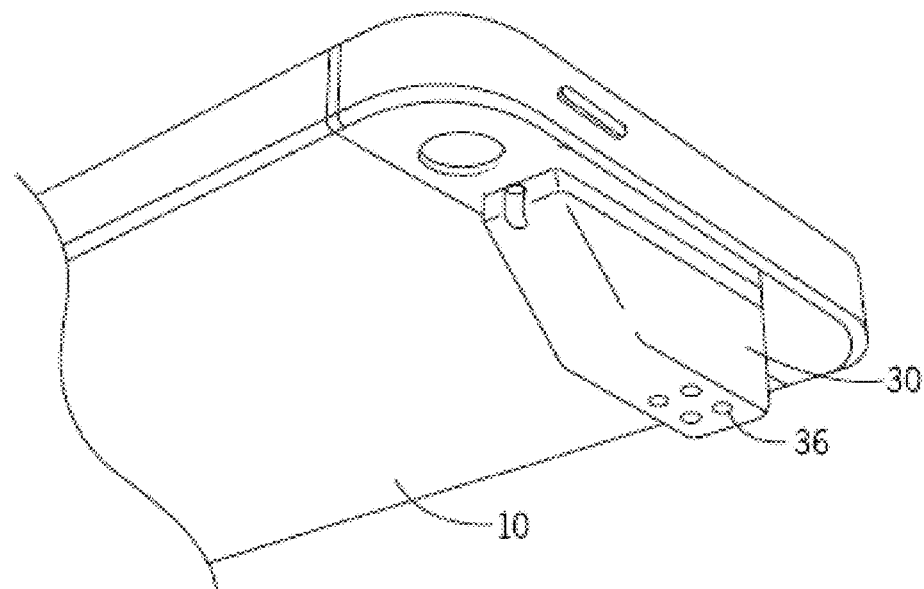
FIG. 11 depicts yet another embodiment of an aimer accessory of this disclosure.
Figure 12:
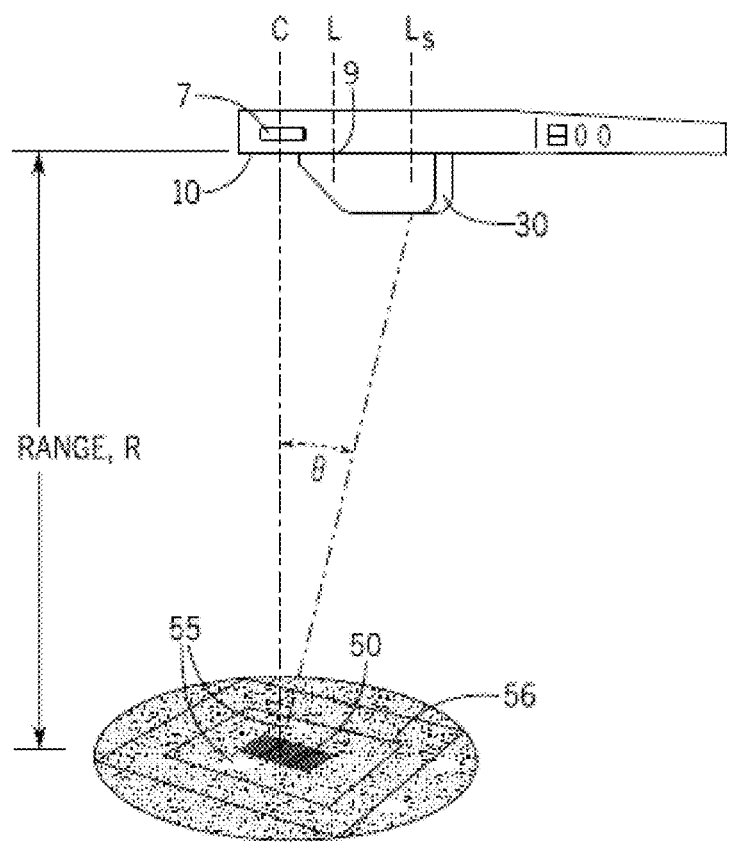
FIG. 12 depicts aspects of light patterns and relationships of the mobile device and aimer accessory of FIG. 11 with a barcode.

FIGS. 11 and 12 provide yet another embodiment of the aimer accessory 30. In this example, the aimer accessory 30 does not include a collector 31. However, this embodiment of the aimer accessory 30 does include an offset of the optical path taken by the light that is emitted by the lamp 9 (FIG. 1). Additionally, this embodiment of the aimer accessory 30 includes a grating 36 having an array of holes arranged in a substantially rectangular pattern.

Referring in particular to FIG. 12, aspects of the offset and the consequence are shown in greater detail. In the mobile device, the camera 7 is aligned with a camera axis, C. The lamp 9 is aligned with a light axis, L. By incorporation of an offset within the aimer accessory 30 as taught by this disclosure, light emitted from the aimer accessory 30 is redirected to a light shifted axis, LS. The resulting offset may be measured as the distance between the light shifted axis, LS, and the light axis, L. Accordingly, the offset angle, e, between the camera axis, C and the effective light axis (which is now shifted light axis, LS, instead of the light axis, L) is increased. That is, the effective range, R, is increased.

More specifically, a greater distance between the mobile device 10 and the plane where the scan area 56 and the light pattern 55 converge is realized.

Without the teachings of this disclosure, lamp 9 diffuses and emits light across a wide range of angles with respect to light axis, L. With this disclosure, the light from lamp 9 is collimated and redirected to the light shifted axis, LS, to improve the ability of the user to point the smartphone or mobile device's built-in camera at a barcode in order to capture and decode the barcode. Because the light is shifted, there is also less interference between the shifted light and the reflected image that is captured by the camera. This may in some circumstances allow the camera to capture a better quality image than with ambient light. While the effect of the offset is to increase the effective range, R, this increase was found to be negligible and to not significantly alter the advantages obtained by collimating the light and redirecting the collimated light to the light shifted axis, LS. The transformation of diffuse light from lamp 9 into a collimated beam of light according to this disclosure effectively serves to modify the lighting from lamp 9 into a flashlight. Advantageously, this "flashlight" allows for blind and targeted aiming of the mobile device at, and efficient scanning of, a barcode according to the teachings of this disclosure.

Moreover, ambient light may oftentimes be sufficient to allow for the capture of barcode images of a quality sufficient for decoding. An additional feature of this disclosure is that it provides additional lighting to the barcode surface which may improve the contrast of the dark and light barcodes and hence provide for capture of better quality barcode images.

Figure 13A:
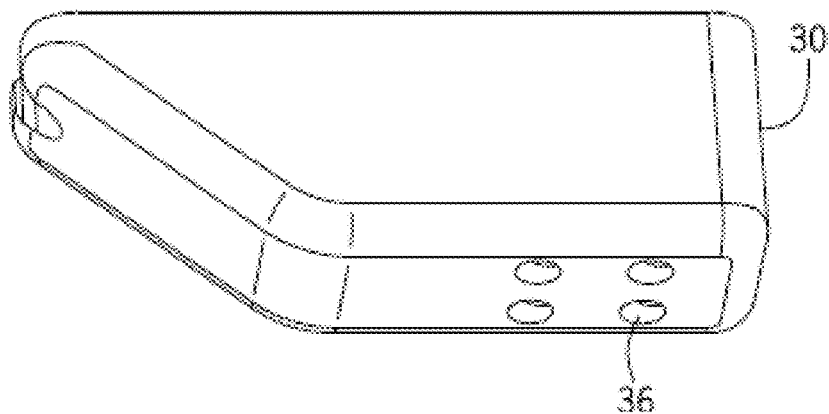
FIGS. 13A through 13C, collectively referred to herein as FIG. 13, are perspective diagrams depicting aspects of the aimer accessory depicted in FIG. 11.
Figure 13B:
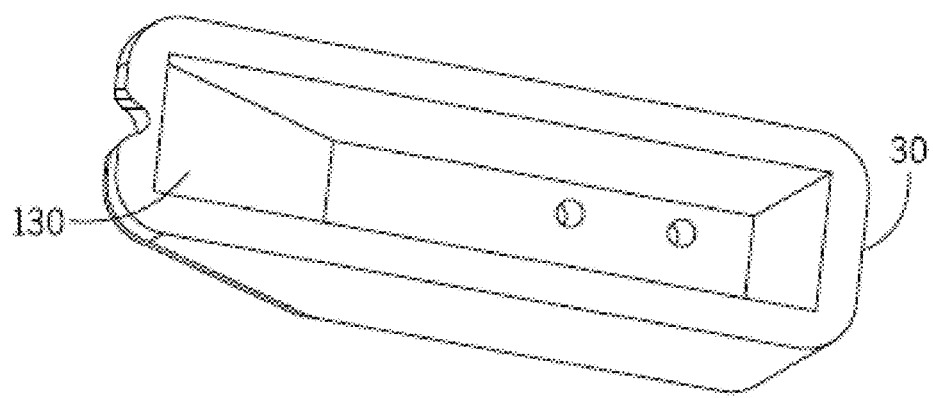
Figure 13C:
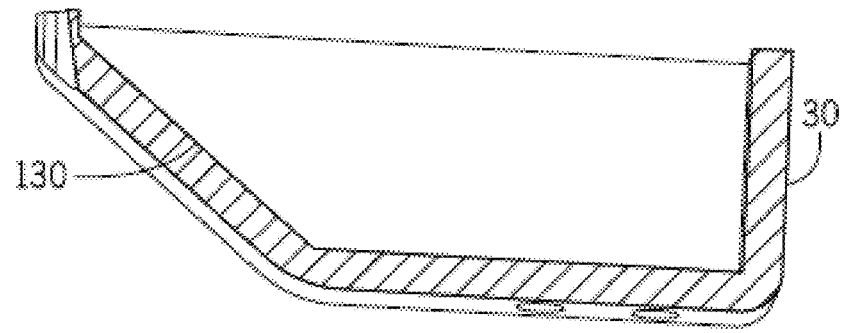

FIG. 13 depicts an embodiment of the aimer accessory 30 that does not include a collector 31 but provides an offset. FIG. 13A is a perspective view. FIG. 13B is a top down view, and shows an interior of the aimer accessory 30; it further shows a reflective surface 130 incorporated therein. At least another reflective surface (not shown) may be included to direct light through the grating 36. FIG. 13C is a cutaway view of the aimer accessory 30. This embodiment of the aimer accessory 30 is referred to as a "simple offset aimer."

Figure 14A:
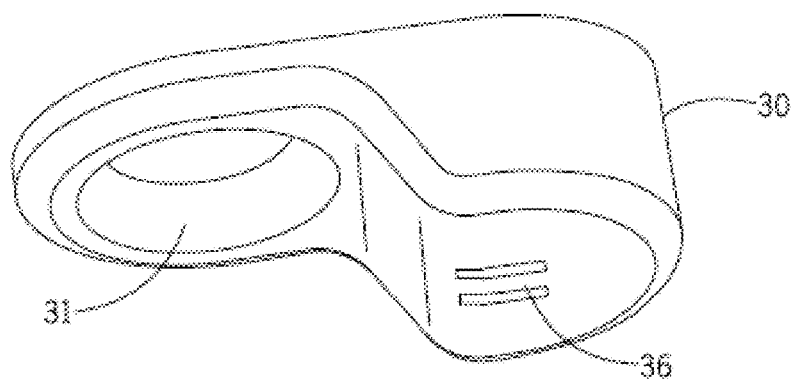
FIGS. 14A through 14C, collectively referred to herein as FIG. 14, are perspective diagrams depicting aspects of the aimer accessory depicted in FIG. 3.
Figure 14B:
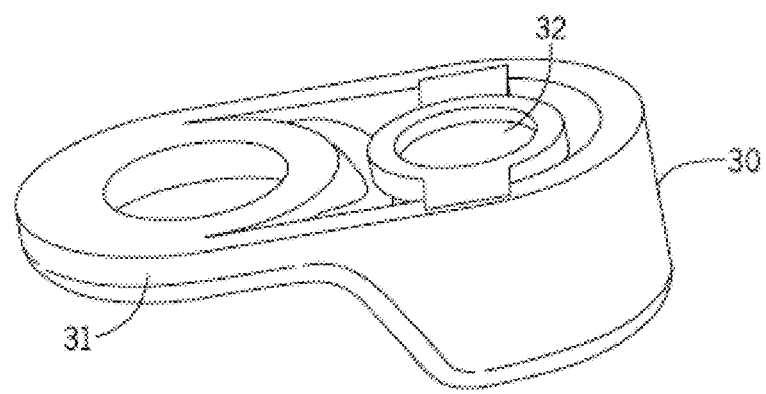
Figure 14C:
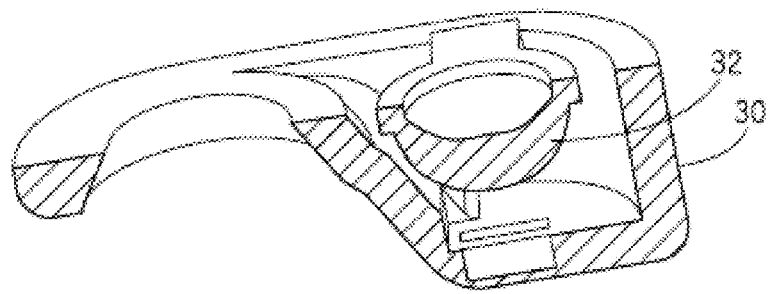

FIG. 14 depicts an embodiment of the aimer accessory 30 that includes the collector 31 and does not have an offset. FIG. 14A is a perspective view; FIG. 14B is a top down view. FIG. 14C is a cutaway view of the aimer accessory 30, and better shows the optical element 32. In this example, the optical element 32 is a lens. This embodiment of the aimer accessory 30 is referred to as a "basic aimer."

Figure 15A:
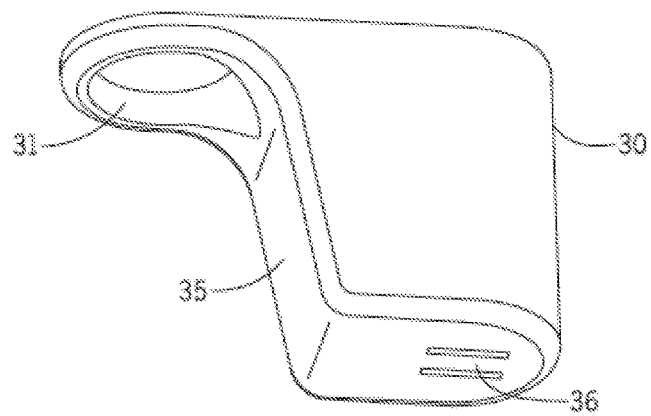
FIGS. 15A through 15C, collectively referred to herein as FIG. 15, are perspective diagrams depicting aspects of another embodiment of the aimer accessory.
Figure 15B:
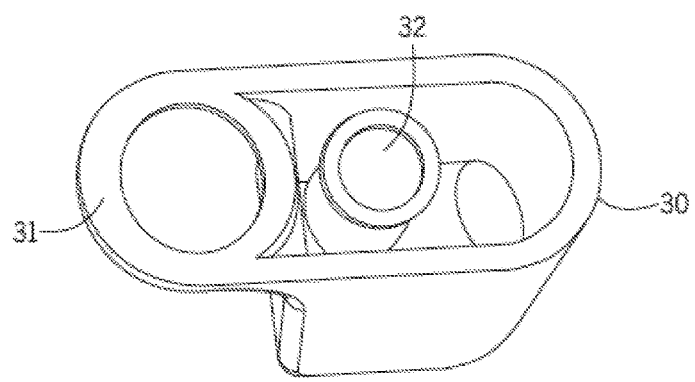
Figure 15C:
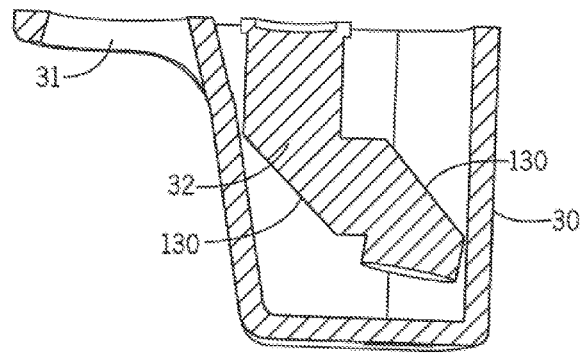

FIG. 15 depicts an embodiment of the aimer accessory 30 that includes the collector 31 and an offset. FIG. 15A is a perspective view; FIG. 15B is a top down view. FIG. 15C is a cutaway view of the aimer accessory 30, and better shows the optical element 32. In this example, the optical element 32 includes a lens disposed within a light pipe. The light pipe is comparatively elongated (with reference to FIG. 16). However, it is not necessary that the light pipe extend completely to the grating 36 in the distal portion 33. This embodiment of the aimer accessory 30 is referred to as an "elongated offset aimer."

Figure 16A:
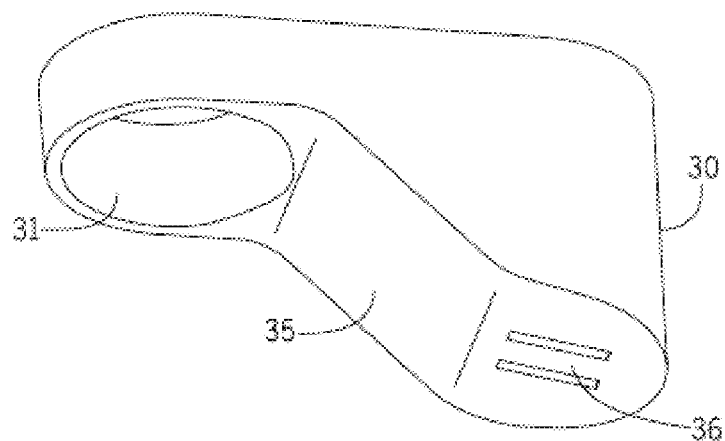
FIGS. 16A through 16C, collectively referred to herein as FIG. 16, are perspective diagrams depicting aspects of the aimer accessory depicted in FIG. 9.
Figure 16B:
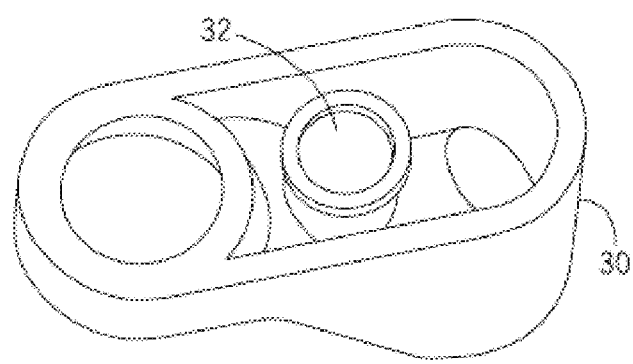
Figure 16C:
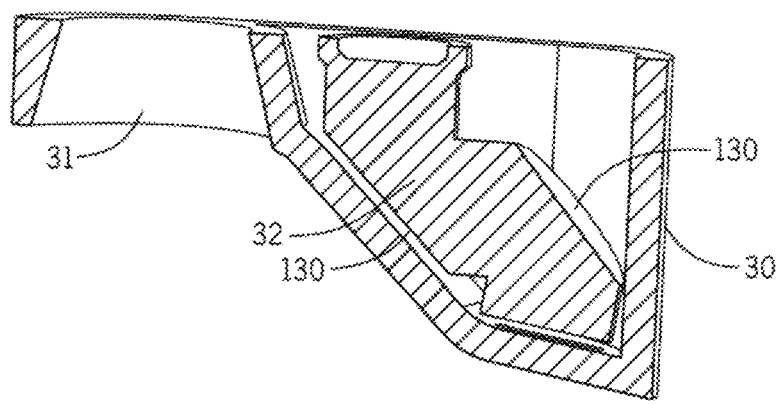

FIG. 16 depicts an embodiment of the aimer accessory 30 that includes the collector 31 and an offset. FIG. 16A is a perspective view; FIG. 16B is a top down view. FIG. 16C is a cutaway view of the aimer accessory 30, and better shows the optical element 32. In this example, the optical element 32 includes a lens disposed within a light pipe. The light pipe is comparatively shortened (with reference to FIG. 15). Accordingly, this embodiment of the aimer accessory 30 is referred to as a "standard offset aimer."

Figure 17A:
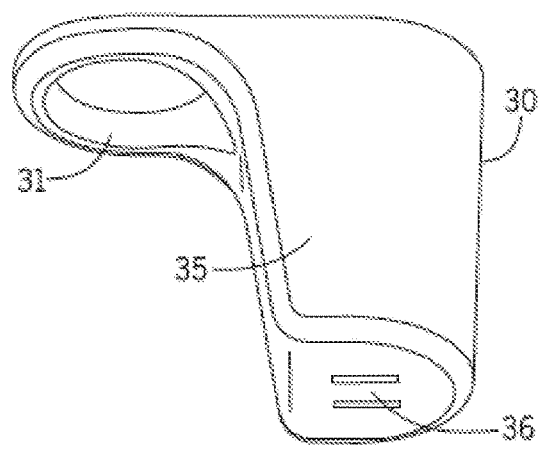
FIGS. 17A through 17C, collectively referred to herein as FIG. 17, are perspective diagrams depicting aspects of another embodiment of the aimer accessory.
Figure 17B:
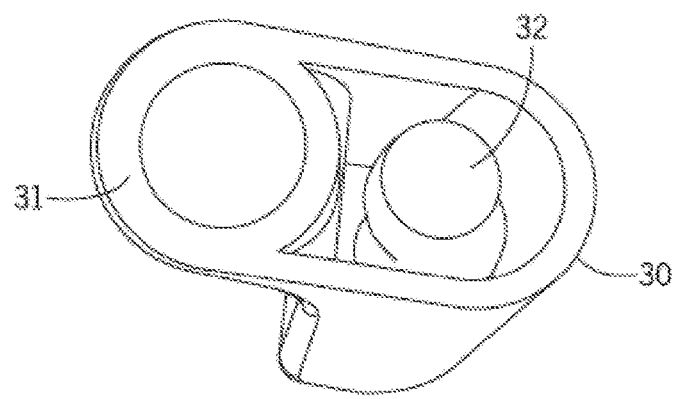
Figure 17C:
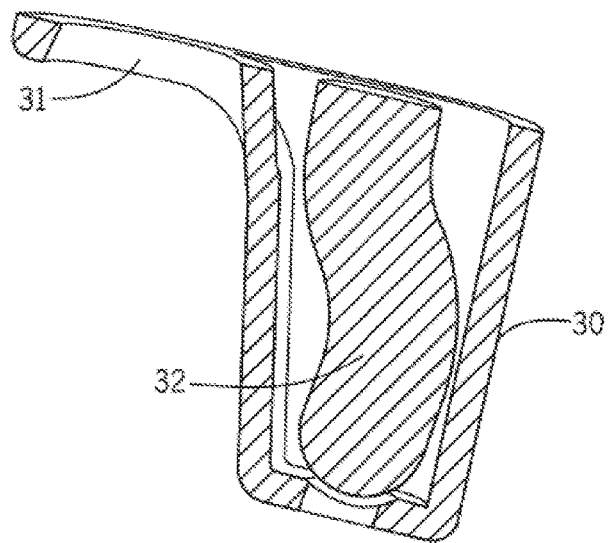

FIG. 17 depicts an embodiment of the aimer accessory 30 that includes the collector 31 and an offset. FIG. 17A is a perspective view; FIG. 17B is a top down view. FIG. 17C is a cutaway view of the aimer accessory 30, and better shows the optical element 32. In this example, the optical element 32 includes a lens disposed within a light pipe. The light pipe is of a continuous tube shape and includes a lens disposed at the distal end. Accordingly, this embodiment of the aimer accessory 30 is referred to as a "tube offset aimer."

Figure 18A:
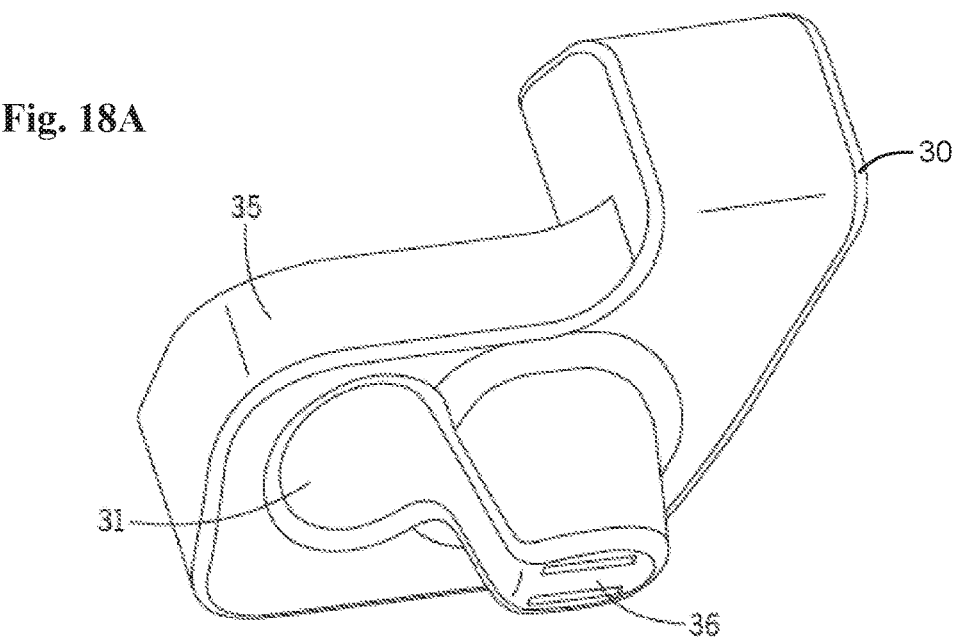
FIGS. 18A through 18B, collectively referred to herein as FIG. 18, are perspective diagrams depicting aspects of another embodiment of the aimer accessory.
Figure 18B:
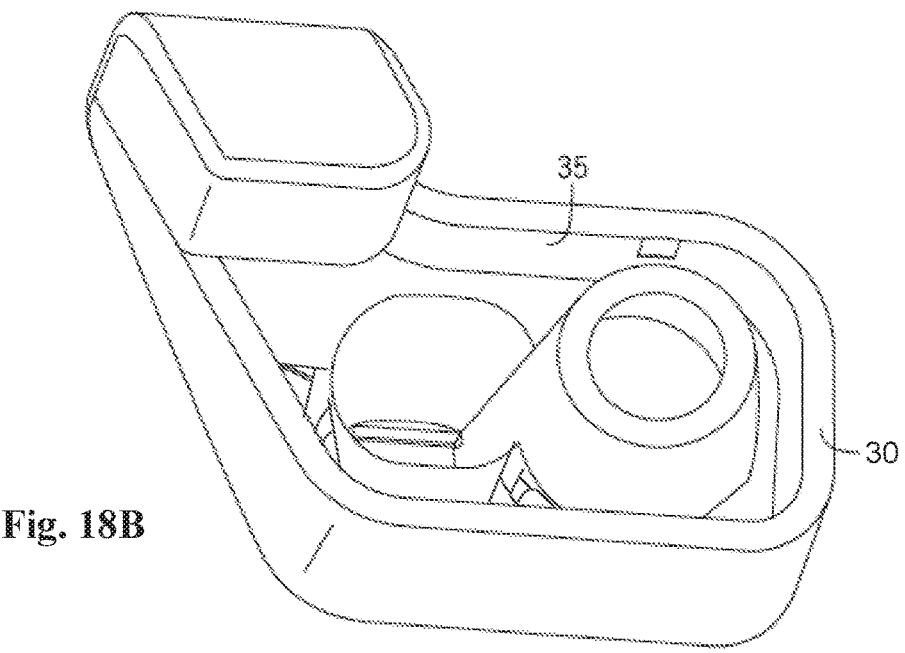

FIG. 18 depicts an embodiment of the aimer accessory 30 that includes the collector 31, with no offset and a substantial body 35. FIG. 18A is a perspective view; FIG. 18B is a top down view. In this example, the body 35 proves form fitting onto the mobile device 10. That is, in this embodiment of the aimer accessory 30, the body 35 has been configured to closely follow a particular configuration of the mobile device 10. Accordingly, this embodiment of the aimer accessory 30 is referred to as a "fitted aimer."

Figure 19:
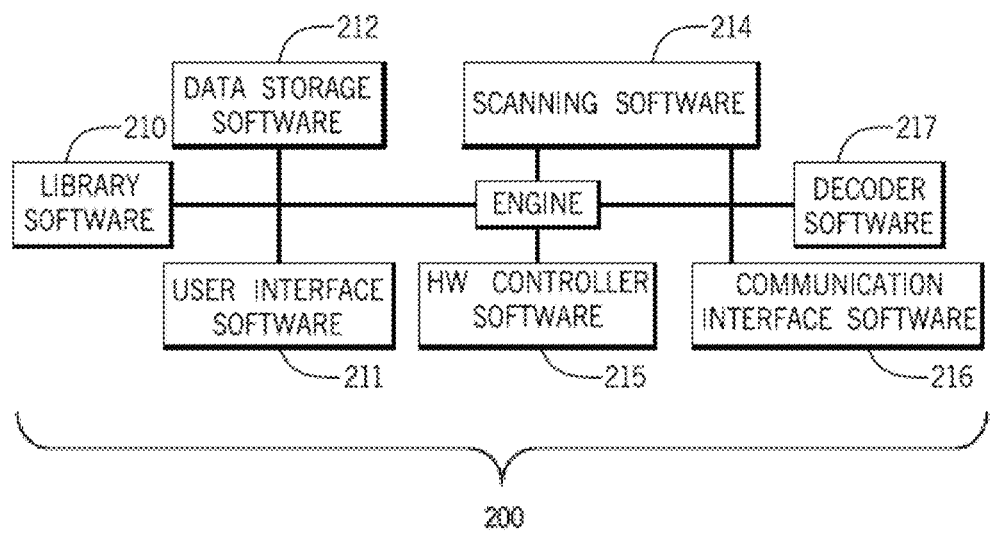
FIG. 19 depicts illustrative components of software useful for reading barcodes with the aimer accessory.

FIG. 19 shows an instance of a barcode reader software 200 for providing some of the functionality herein described. The instance includes an engine 201, a scanning software 214, a decoder software 217, a data storage software 212, a library software 210, a user interface software, a hardware controller software 215, and a communication interface software 216.

The scanning software 214 includes the executable instructions for performing the scanning functions of registration and capturing a barcode image as described in FIG. 6. The scanning software 214 will receive data from the camera 7 and evaluate the received data for presence of a barcode. The evaluation may include identification of the shifted field of view (SFOV) 52, the scan area 56, and searching for presence of the barcode 50 that is in registration with the light pattern 55. When the scanning software 214 has identified the appropriate requirements for data collection, the scanning software 214 will capture the barcode 50.

The decoder software includes the executable instructions for transforming the barcode image data represented by the electrical signals into an encoded ASCII character data string.

The data storage software 212 includes the executable instructions for storing and retrieving captured barcode images and other data in a memory. The library software 210 includes the executable instructions for storing and retrieving information such as symbology type from a library registry within the memory. Additionally, the library registry may also include information regarding a variety of aimer accessories 30. For example, a user may wish to exchange aimer accessories 30 while in the field, like to exchange a tube offset aimer of FIG. 17 for the basic aimer of FIG. 14. Accordingly, the user may remove a first aimer accessory 30 (e.g., the tube offset aimer) from a mobile device 10 and place a second aimer accessory 30 (e.g., the basic aimer) onto the mobile device. When this occurs, the user may communicate the second aimer accessory type to the engine software 201 using the graphical user interface rendered by the user interface software 211. The engine software 201 may then employ the library software 210 to reference data stored in the library registry regarding the second aimer accessory 30 for use in configuring the smartphone and software accordingly. Alternatively, the hardware controller software 215 may detect the attachment of the second aimer accessory 30 and prompt the engine software 201 to cause the user interface software 211 to render on the display a selection of settings for aimer accessories useable with the smartphone. In the specific example, the settings would include the settings for the tube offset aimer and the settings for the basic aimer. On user selection of the setting for the basic aimer, the scanning software 214 will then adjust scanning functions accordingly.

In another embodiment, the instance of a barcode reader software 200 may recognize a specific aimer module shape and if recognized for a specific timeframe while hovering over a specific barcode for a programmed amount of time (~500 msec or 1 sec), then this triggers a barcode scan and initiates a decode of the barcode data.

The user interface software includes the executable instructions for displaying a graphical user interface on the display for configuring the instance of the barcode reader software 200 and for rendering images, such as an image of the barcode on the display of the smartphone. For example, user interface software 211 may generate text, alert information, auditory signals, alarms, warnings, pictures, graphics, or other types of output. In some embodiments, output of the interface software 211 may be used to invoke other functions. For example, output of the interface software 211 may be sent via communication interface software 216 to a printer, or it may be sent to a smartphone to initiate a phone call, or sent to any computing device to perform some other function.

The hardware controller software 215 includes the executable instructions for controlling the hardware of the smartphone such as controlling the camera lens to bring a barcode image into focus, energizing the lamp, controlling the display to render images, controlling the speaker of the smart phone to prompt a user, and so on.

The communication interface function 216 includes the executable instructions for communicating data to or from a remote device. The communicating to a remote device may include conducting a query of a remote source, such as a database, for more comprehensive information. The query may be received by the communication interface function 216 from the user through the user interface software 211. Similarly, a remote user may communicate information over the communication interface 216 to the smartphone. Thus, for example, a smartphone may be remotely programmed with software updates and updates to the database, such as the table of symbologies. Programming may occur over-the-air. Alternatively, the smart phone may be tethered to a remote device via a communication cable to provide such remote programming or bi-directional communication between the smart phone and the remote device. The remote device may be a computing device, for example, another smart phone, a desktop computer, or server, including a cloud server, capable of communicating with the smart phone that is operating according this disclosure.

The engine 201 includes the executable instructions that coordinate the operation of the foregoing and other programs on the smartphone.

The software 200 described in connection with FIG. 19 may be provided to a mobile device by a specialized application. For example, a mobile application including the foregoing functionalities for performing this disclosure is typically downloaded to a smartphone, but also may be preloaded. Alternatively, the software may be functionality embedded inside the operating system.

By virtue of the registration process of the light pattern 55 of this disclosure with a barcode 50 on a target as explained in this disclosure, an appropriately equipped mobile device 10 is capable of automatic scanning and reading of barcodes. That is, the mobile device 10 that is so equipped does not require human intervention to carefully focus the camera through the display 5. The user need not look through the view finder projected on the display to focus the image to be captured by the mobile device. Instead, in blind mode blind mode operation and target mode blind mode operation, the user need only point the collimated light that is generated according to this disclosure at the barcode. Accordingly, the teachings herein provide for enablement of "blind" and "targeted" blind mode scanning. That is, the blind or targeted scanning according to this disclosure permits a user to read a barcode without viewing and focusing of the device camera through use of the display 5 (shown in FIG. 1). More specifically, the user only needs to "aim" or "point" the mobile device using the aimer module at the barcode and the mobile device will read the barcode. Of course, this disclosure also provides for blind mode targeted mode and targeted mode targeted mode where the display of the smartphone is used by the user to assist in lining up the pattern of light with the barcode image as taught by this disclosure. In addition, this disclosure also provides for a scanning operation performed in display mode where the aimer module of this disclosure is not used in the scanning operation; rather, diffuse lighting from the conventional smartphone is used to illuminate a barcode in order to capture the barcode image using conventional scanning techniques.

In some embodiments, the software 22 of the code reader 200 depicted in FIG. 19 may be developed on a remote computer, such as a personal computer. The software 22 may then be downloaded to the mobile device.

Figure 20A:
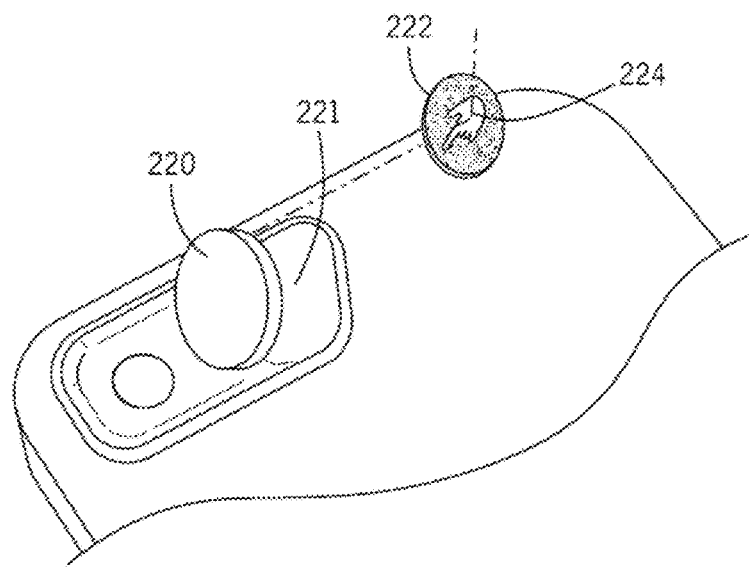
FIGS. 20A, 20B, and 20C, collectively referred to herein as FIG. 20, are perspective drawings of alternative embodiments of this disclosure indicating possible shapes for the light source.
Figure 20B:
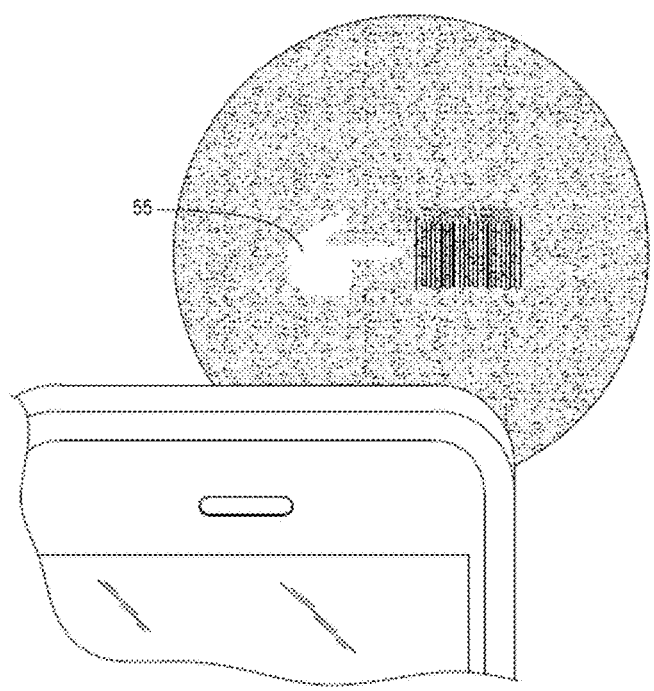
Figure 20C:
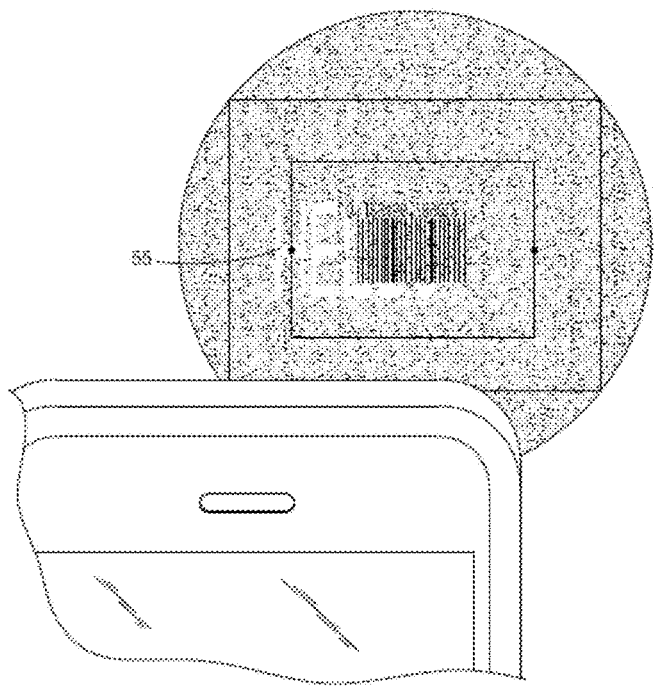

FIG. 20A is a perspective drawing of yet another alternative embodiment of this disclosure. In this embodiment, a pair of mirrors 220, 222 are used to redirect light away from the axis of the optical path of light emitted from lamp 221 and to a target. In particular, mirror 220 changes the direction of the optical path of light emitted from lamp 221 from light axis, L to a first light shifted axis, LS and directed to mirror 222. Mirror 222 redirects the reflected beam of light to a second light shifted axis, LS to the target. In this example, the reflective surface of mirror 222 is in the shape of a hand pointing a finger so that the beam of light reflected from mirror 222 to the target includes this image. FIG. 20B depicts the illumination of the barcode target with the image contained in the pattern of light 55, namely collimated light in the shape of a hand pointing a finger. A user may line up the finger of collimated light to an edge of the barcode whereupon the barcode may be captured and processed as explained above. FIG. 20C shows an alternative embodiment of FIG. 20A wherein the reflective surface of mirror 222 is in the shape of the reversed spelling of the word "HELLO" (spelled "OLLEH").

FIG. 21 depicts illustrative embodiments of light pipes that may be used with the aimer accessory 30. Each light pipe redirects the optical path of light from light axis, L to a light shifted axis, LS as shown wherein the barcode is easily captured and processed.

Figure 22:
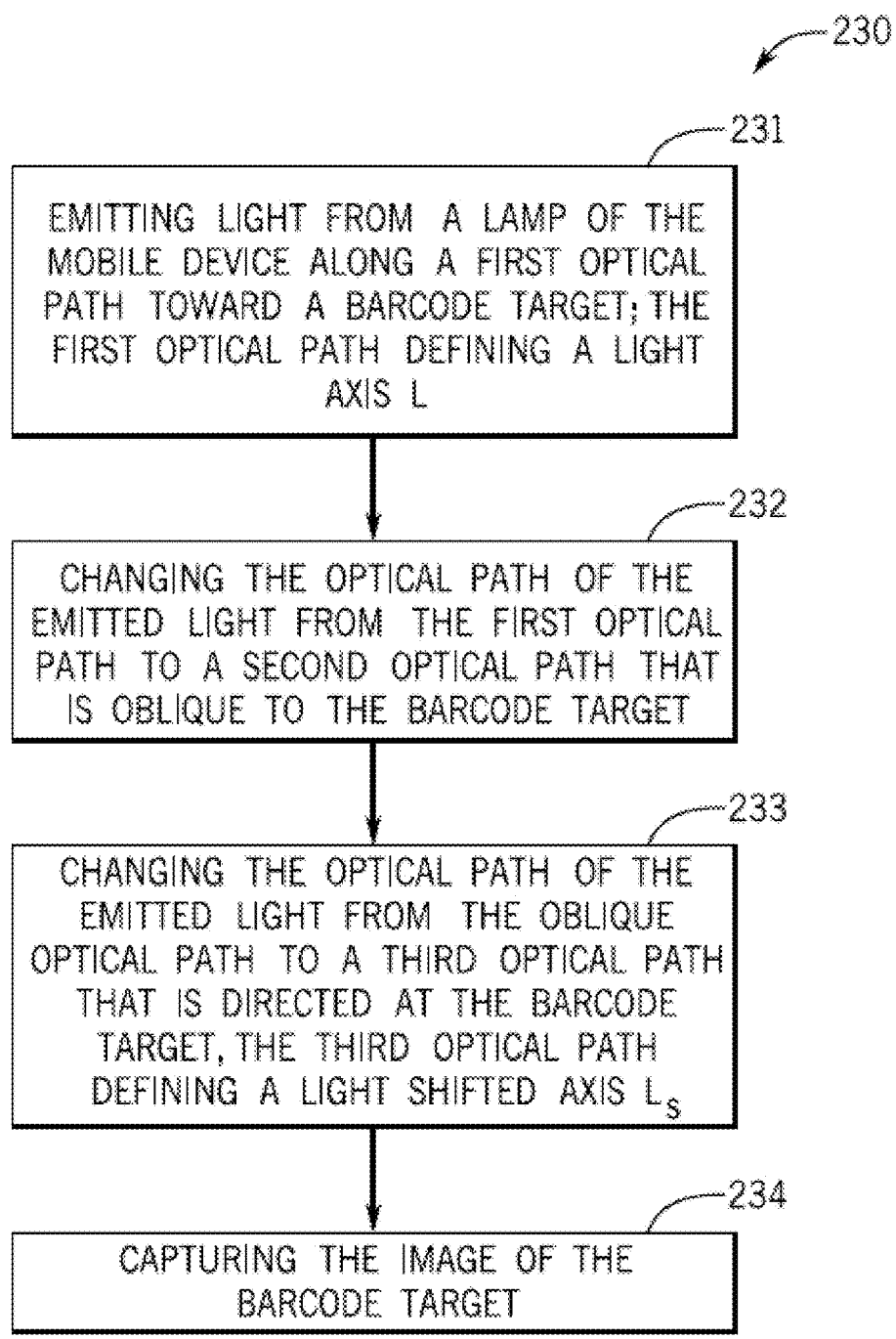
FIG. 22 depicts an illustrative method according to this disclosure for adjusting the decoding position of the software decoder to align with the shape and usage of the light pattern.
Figure 23:
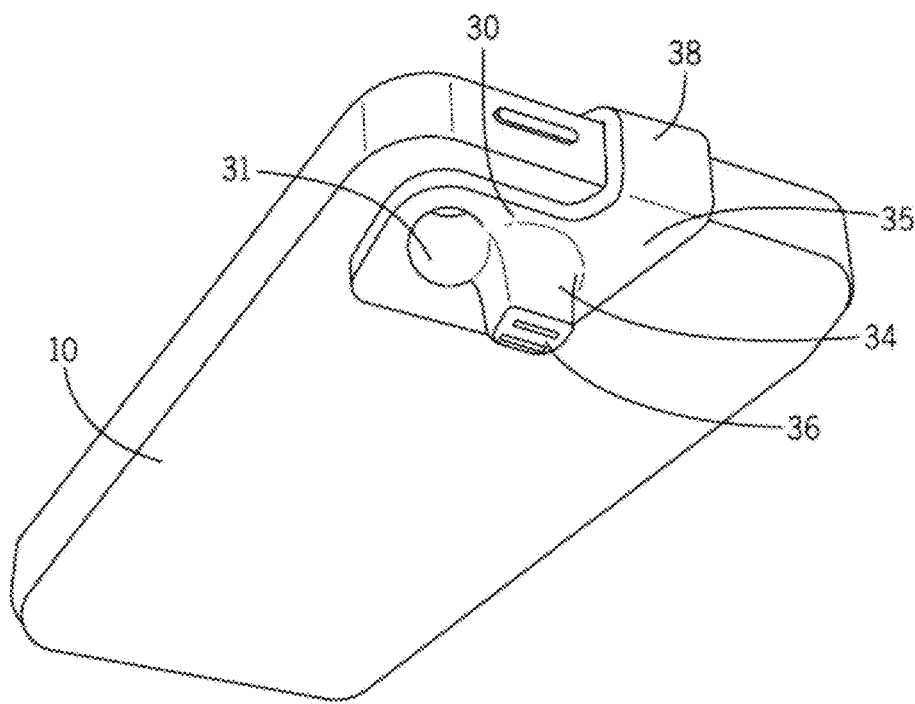
FIGS. 23-26 depict perspective drawings of an illustrative aimer accessory according to this disclosure.
Figure 24:
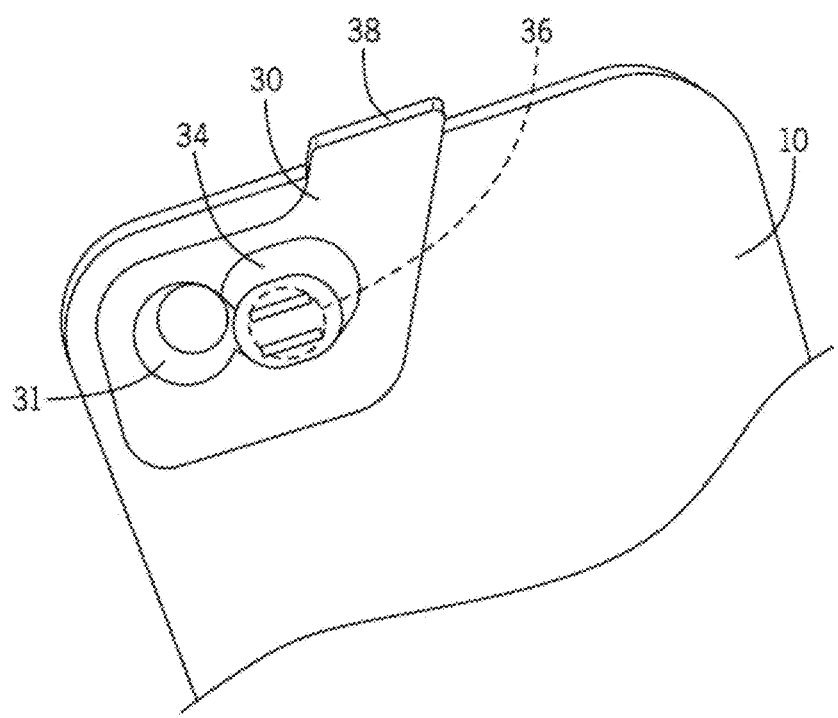
Figure 25:
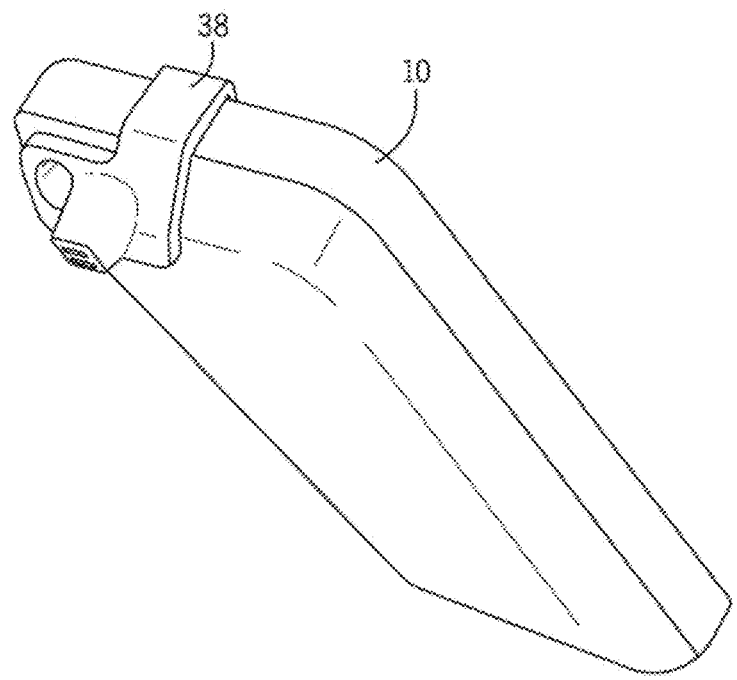
Figure 26:
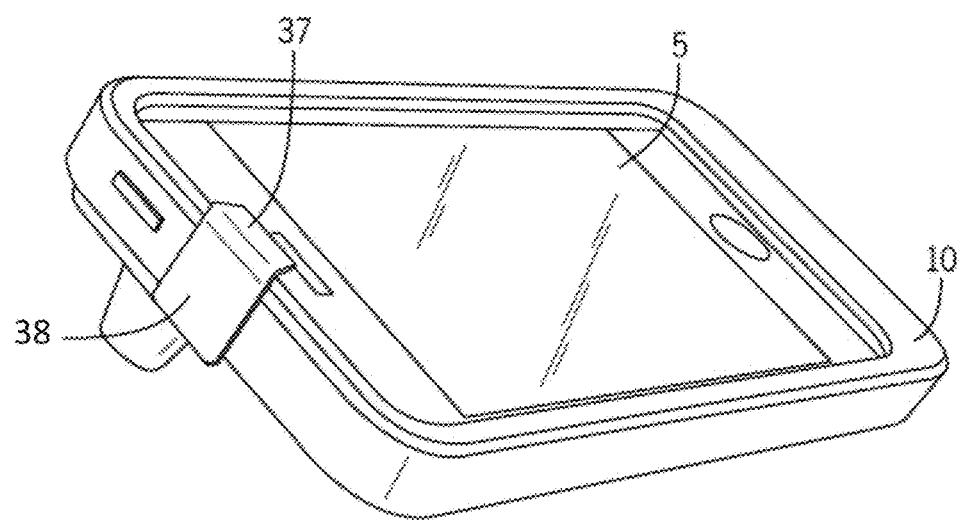

FIG. 22 depicts an illustrative method for aimer scanning 230 (e.g., blind mode blind mode operation, blind mode targeted mode operation, targeted mode blind mode operation, and targeted mode targeted mode operation). According to the method, light is emitted 231 from a lamp of the mobile device along a first optical path toward a barcode target. The first optical path defines a light axis, L. The optical path of the emitted light is then changed 232 from the light axis, L, to a second optical path that is oblique to the barcode target. The optical path of the emitted light is then changed again 233 from the oblique optical path to a third optical path that is directed at the barcode target. The third optical path defines a light shifted axis, LS. Finally, the image of the barcode target is captured 234 by the mobile device.

Referring now to FIGS. 23 through 26, aspects of an additional embodiment of the aimer accessory 30 are shown. In the example shown, the aimer accessory 30 includes a retainer 38. Generally, the retainer 38 provides for coupling of the aimer module body onto the mobile device 10 or to an external protective case surrounding mobile device 10. In the example shown, the retainer 38 includes an arm that extends upward and over the top of the mobile device 10 and terminates with a clip 37 (see FIG. 26) on the front of the mobile device 10. Accordingly, by cooperation of the retainer 38 with the clip 37 and the opposing body 35, this embodiment of the aimer accessory 30 may be effectively clipped onto the mobile device 10. Accordingly, this embodiment of the aimer 30 is referred to as a "clip-on aimer."

In various embodiments, the retainer 38 provides a clamping force to the mobile device 10 or to an external protective case surrounding mobile device 10. In some embodiments, the clamping force is realized by having opposing retainers 38. Opposing retainers 38 may be realized by having one retainer configured for retention on a left side of the mobile device 10 or protective case with the opposing retainer 38 configured for retention on a right side of the mobile device 10 or protective case (not shown). In some embodiments, the retainer 38 includes the detents, nipples, ridges or other features as may be known in the art to assist with retention and registration or alignment with mobile device 10.

In some embodiments, such as the one shown in FIGS. 23 through 26, the clip-on aimer is further stabilized by having portions that conform to the shape of the mobile device 10 or protective case for mobile device 10. For example, the clip-on aimer includes a deep-well collector 31 that conforms to the shape of the mobile device 10 or to the protective case surrounding mobile device 10. Additionally in this embodiment, the clip-on aimer includes a body 35 to conform to curved surfaces of the mobile device 10.

Figure 27:
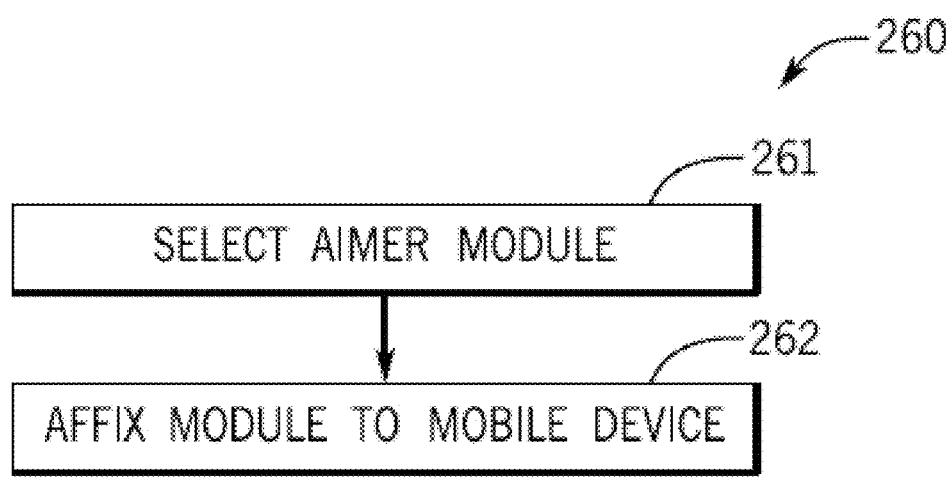
FIG. 27 depicts an illustrative method for retrofit of a mobile device with the aimer accessory of this disclosure.
Figure 28:
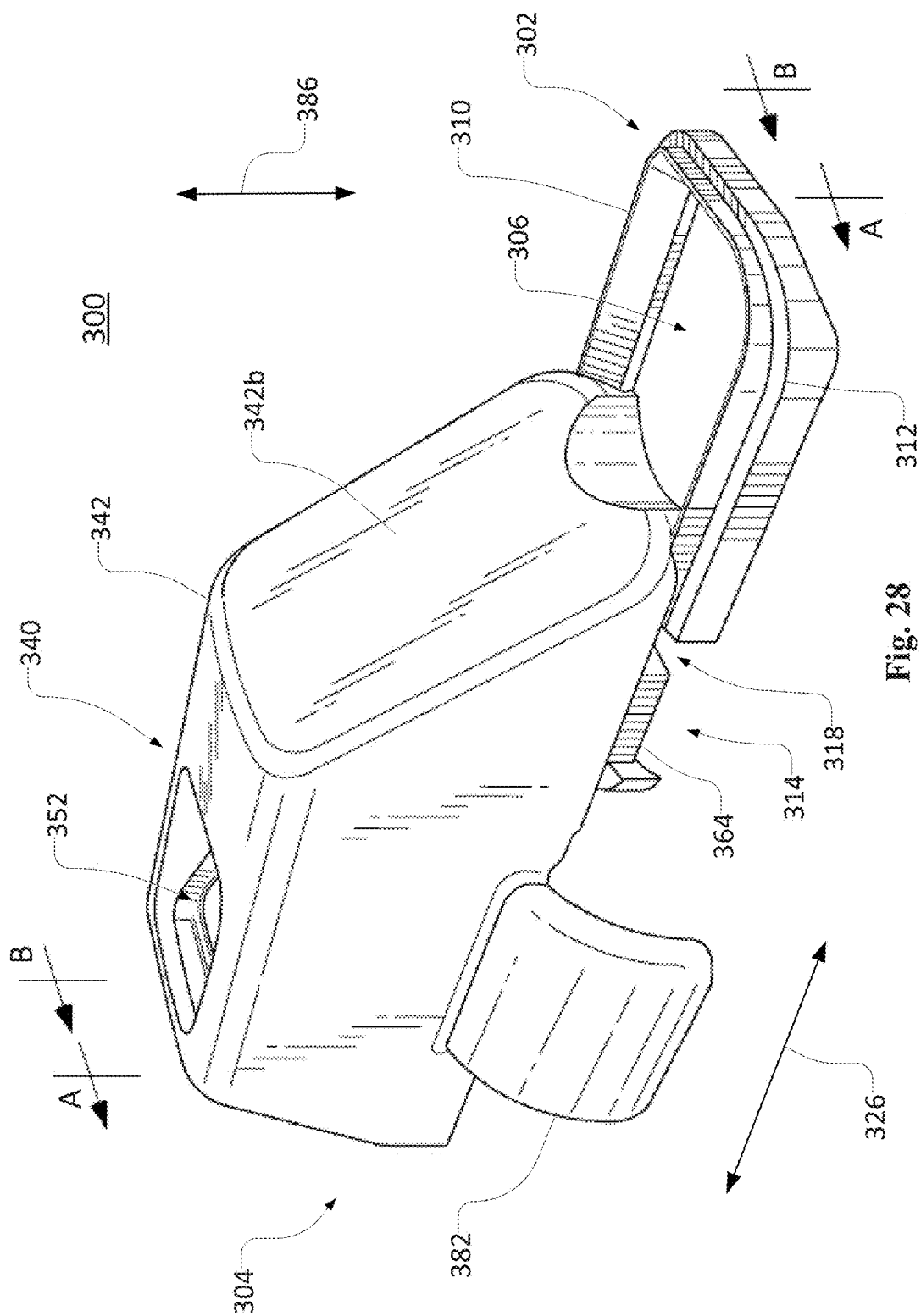
FIG. 28 is a top, left, rear perspective view of an attachment assembly for an aimer accessory according to this disclosure.

FIG. 27 depicts an illustrative method for retrofit of a mobile device with the aimer accessory of this disclosure The method for modification of the mobile device 260 includes selecting an aimer accessory 261. The aimer accessory selected may include any one of the aimer accessories as discussed herein, a combination thereof, or an aimer accessory that includes other features than those disclosed herein. After completing the selection of the aimer accessory 261, the user performs affixing of the aimer accessory 262. Affixing of the aimer accessory 262 generally calls for one of temporarily affixing or permanently affixing the aimer accessory to the mobile device 10 or to the protective case surrounding mobile device 10.

An aimer accessory according to this disclosure can be secured to a mobile device, or a case for a mobile device, in various ways. In some embodiments, an aimer accessory (e.g., the aimer accessory 30) can be secured directly to a mobile device or to a case using adhesives, adhesive strips (e.g., double-sided tapes), magnetic devices, fasteners (e.g., screws), and so on. In some embodiments, a clip-like tab such as the retainer 38 (see, e.g., FIGS. 25 and 26) can be used to physically engage a mobile device or case in order to secure the aimer accessory in place.

In some embodiments, an aimer accessory can be formed from an attachment base and an attachment body that are configured to be removably secured together. With this type of arrangement, the attachment base can be secured to a mobile device or case (e.g., using adhesives, adhesive strips, magnetic devices, fasteners, and so on) independently of the attachment body. The attachment body, which can be configured to include an optical device such as a light pipe or arrangement of mirrors, can then be secured to the attachment base for use with the mobile device. This can be useful, for example, in order to allow for reliable and repeatable orientation of the attachment body—and the included optical device—relative to a camera or light source of the mobile device, without necessarily requiring a permanent engagement between the attachment body and the mobile device or case.

Specific examples of this type of arrangement are discussed below in the context of direct attachment to a mobile device and in the context of attachment to a mobile device via attachment to a case for the mobile device. It will be understood, however, that other arrangements are possible and that the principles discussed below (e.g., securing an attachment body with an optical element to a mobile device or case via attachment of the attachment body to an attachment base) can be applied to other embodiments, including various embodiments discussed above (e.g., the various arrangements of the aimer accessory 30 illustrated in FIGS. 3A, 3B, 9-18B, and 23-26). Likewise, aspects of the example arrangements of the aimer accessory 30 discussed above can be implemented with the aimer accessories discussed below, including as substitutes for aspects of the aimer accessories discussed below (e.g., substitution of a light pipe as discussed above for a mirror arrangement as discussed below), or as supplementary aspects of the aimer accessories below.

An aimer accessory 300 for a mobile device is illustrated in FIGS. 28-33. Generally, the aimer accessory 300 includes an attachment base 302 configured for attachment to a mobile device or to a case for the mobile device (not shown in FIGS. 28-33). The aimer accessory 300 also generally includes an attachment body 304 that is configured to be removably secured to the attachment base 302 and can include one or more optical devices (e.g., mirror arrangements or light pipes). In this way, for example, when the attachment base 302 is secured to a mobile device or a case, the attachment body 304 can be temporarily disposed for use with a camera of the mobile device by securing the attachment body 304 to the attachment base 302.

Figure 29:
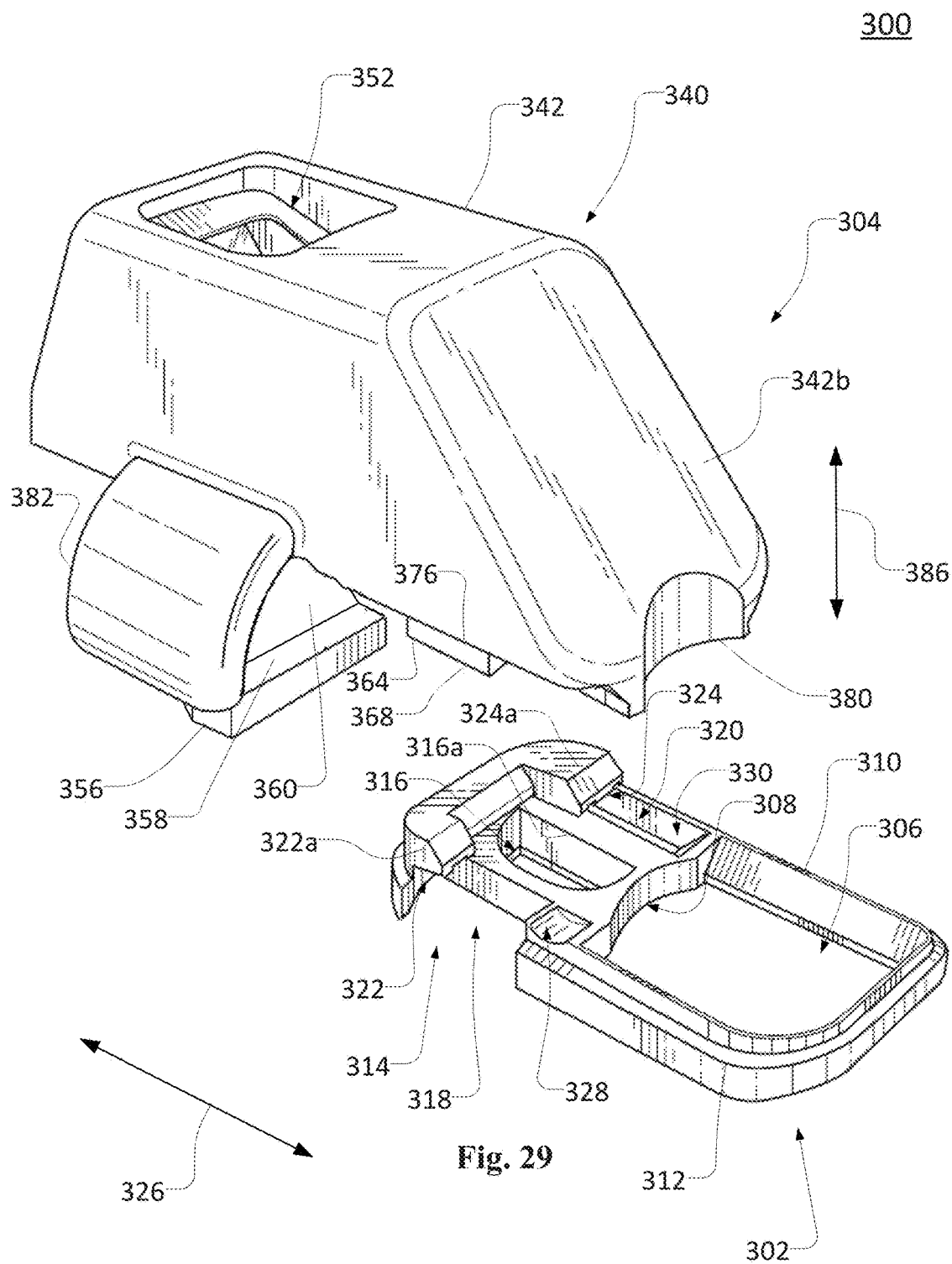
FIG. 29 is an exploded, top, left, rear perspective view of the attachment assembly of FIG. 28.
Figure 30:
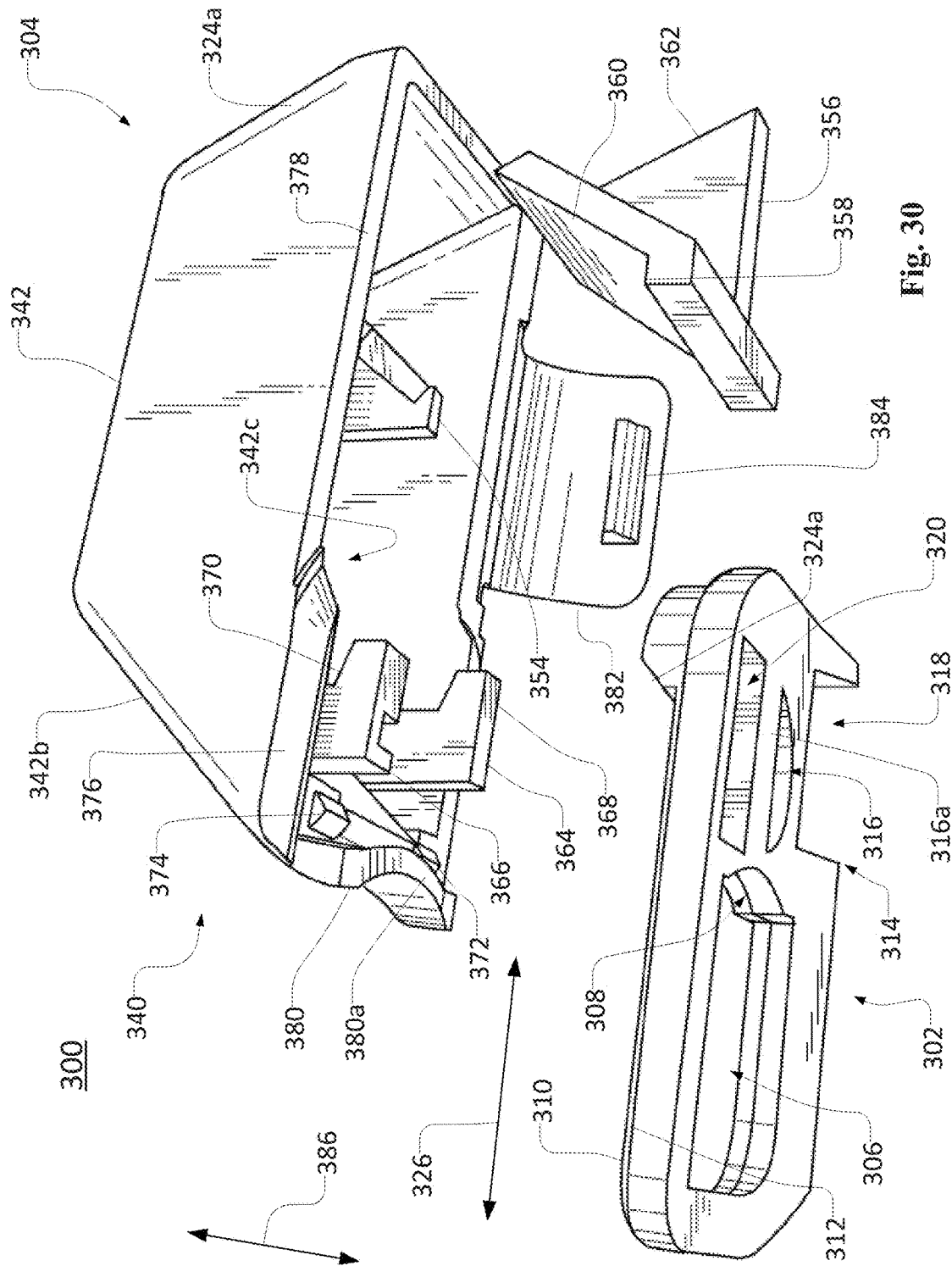
FIG. 30 is an exploded, bottom, left, front perspective view of the attachment assembly of FIG. 28.

In the embodiment illustrated, the attachment base 302 is formed as a single-piece body that includes a relatively large camera opening 306 configured for alignment with a camera of a mobile device (not shown in FIGS. 28-33). The camera opening 306 is generally rectangular, but also includes a rounded indent 308 at one end. A raised lip 310 partly surrounds the camera opening 306 and is in turn partly surrounded by a shoulder 312. As illustrated in FIGS. 29 and 30 in particular, the shoulder 312 further extends around most of the perimeter of the attachment base 302, interrupted by a side opening 314 on the attachment base 302.

The attachment base 302 also includes a light-source opening 316. Generally, the light-source opening 316 is disposed relative to the camera opening 306 so that when the camera opening 306 is aligned with a camera or camera lens of a mobile device, the light-source opening 316 is also appropriately aligned with a light source of the mobile device (e.g., a light source such as the optical element 32 illustrated in FIG. 3B). In the embodiment illustrated, the light-source opening 316 is generally adjacent to the camera opening 306, although other configurations are possible.

In some embodiments, a light-source opening on an attachment base can be shaped to partly mask a light source on a mobile device. This can be useful, for example, if a light source on a mobile device is expected to be overly bright, or if a light source on a mobile device includes multiple light-emitting elements (e.g., LEDs), some of which it may be desirable to mask. In the embodiment illustrated, the light-source opening 316 is configured as a generally semi-circular or semi-ovular opening with one wall 316a of the light-source opening 316 configured as a solid blocking feature. This can be useful, for example, for use with light sources that include a white-light LED and a yellow-light LED, in order to block light from the yellow-light LED while allowing light from the white-light LED to pass through the attachment base 302 into the attachment body 304.

The attachment base 302 can also generally include structures to assist in removably securing the attachment body 304 to the attachment base 302. In the embodiment illustrated, for example, the attachment base 302 includes a set of attachment openings 318 and 320, each of which includes a respective overhang 322 and 324 formed by partially angled features 322a and 324a on an upper portion the attachment base 302. In the embodiment illustrated, the ends of the attachment openings 318 and 320 are offset from each other along a length direction 326, as are the ends of the overhangs 322 and 324 and the features 322a and 324a. In other embodiments, however, other configurations are possible.

Each of the attachment openings 318 and 320 is also generally adjacent to a respective indent 328 and 330, which are disposed on an opposite side of the respective attachment openings 318 and 320 from the respective overhangs 322 and 324. In the embodiment illustrated, the indent 328 is configured as a rounded indent spaced apart from the attachment opening 318 and the indent 330 is configured as a rounded indent extending into an edge of the attachment opening 320. In other embodiments, however, other configurations are possible.

Still referring to FIGS. 28-33, the attachment body 304, which is generally configured for removable attachment to the attachment base 302, includes a housing portion 340 generally formed as a single-piece shell 342 that is configured to enclose and support part or all of an optical device. For example, the shell 342 can be configured to enclose and support a mirror assembly or a light pipe for use with a light source on a relevant mobile device.

Figure 31:
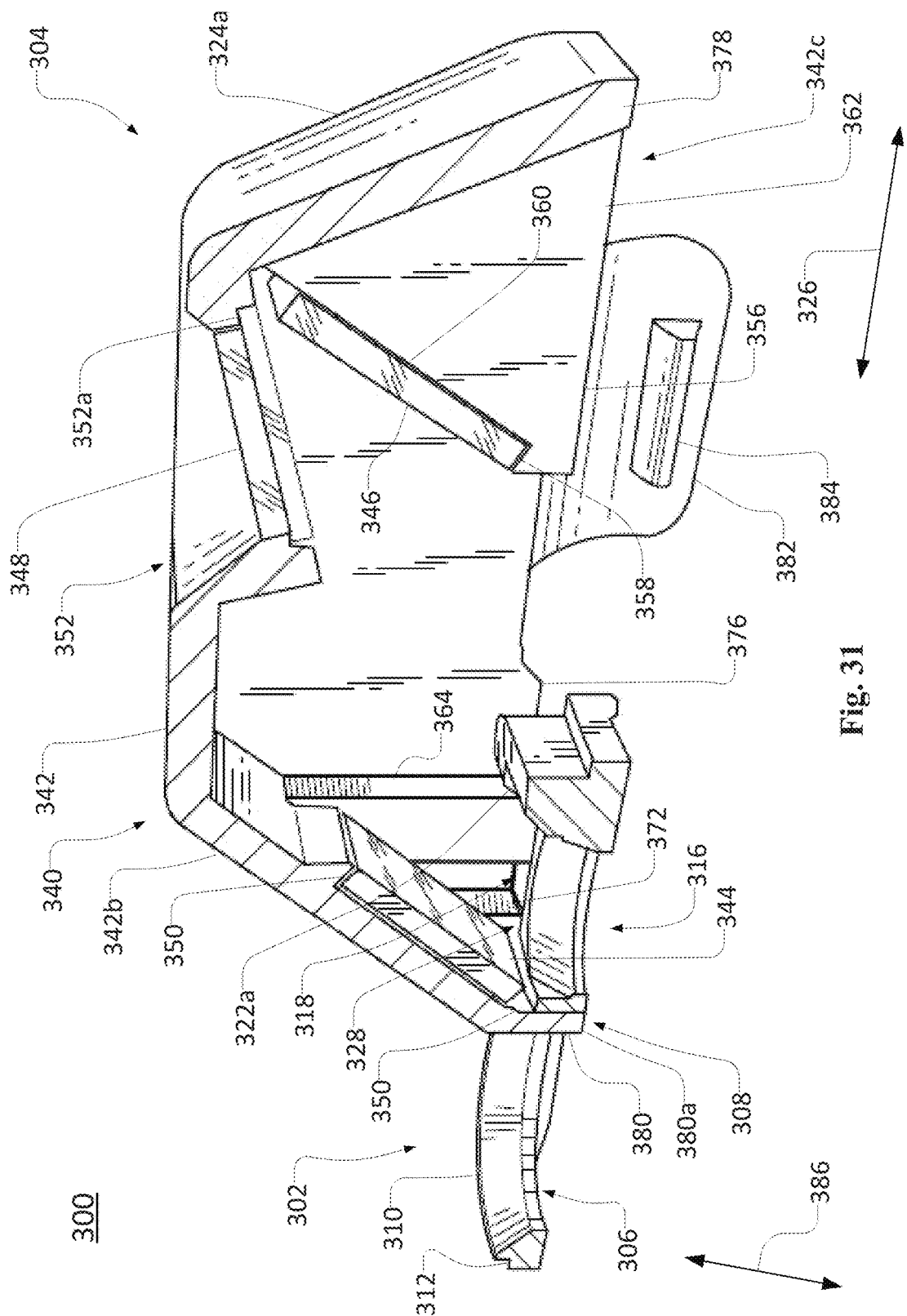
FIG. 31 is a perspective sectional view of the attachment assembly of FIG. 28, taken along plane A-A of FIG. 28.
Figure 32:
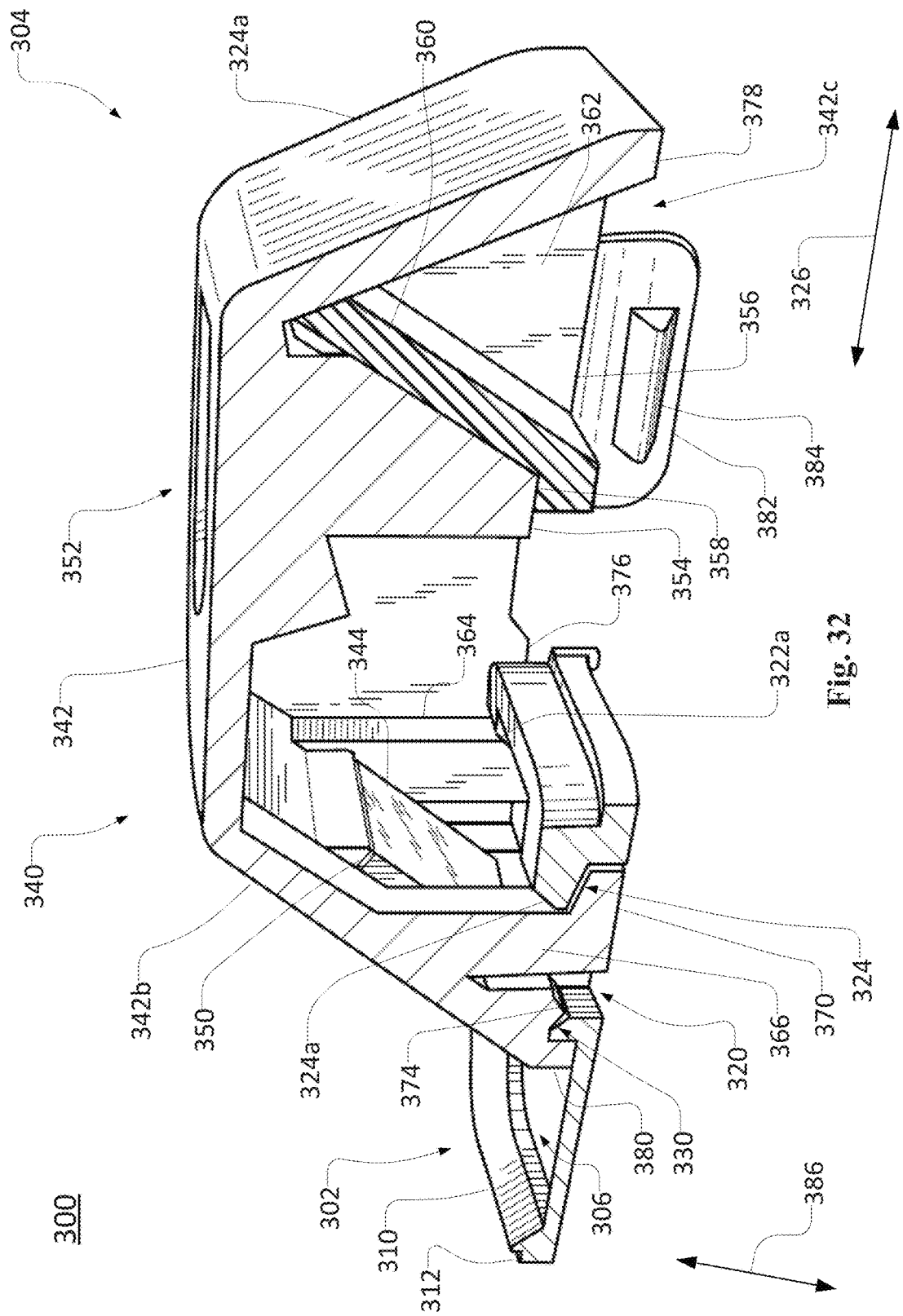
FIG. 32 is a perspective sectional view of the attachment assembly of FIG. 28, taken along plane B-B of FIG. 28.
Figure 33:
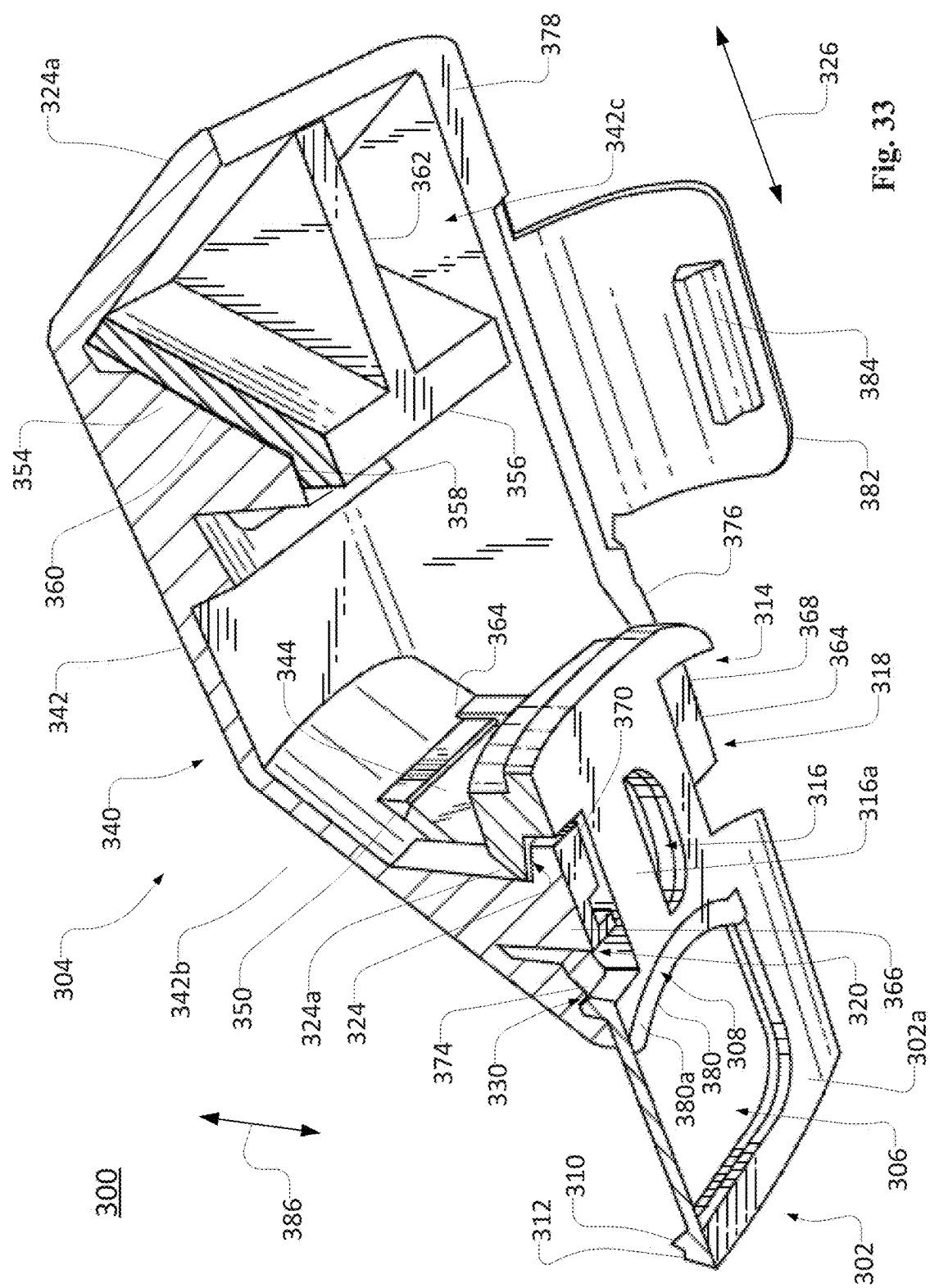
FIG. 33 is another perspective sectional view of the attachment assembly of FIG. 28, taken along plan B-B of FIG. 28.

In the embodiment illustrated, the shell 342 is configured to enclose an optical device configured as a mirror assembly including mirrors 344 and 346 and lens 348 (see FIGS. 31-33). To this end, the shell 342 includes internal shelves 350 and a lens opening 352 surrounded by an internal shoulder 352a, which can generally support and align the mirror 344 and the lens 348, respectively. Further, the shell 342 includes internal struts 354 configured to support and align an insert 356. The insert 356 includes a shelf 358 and support surface 360 for the mirror 346, as well as an angled support rib 362 extending away from the support surface 360.

As illustrated in FIGS. 32 and 33 in particular, the insert 356 can be inserted into the shell 342 until the shelf 358 engages respective ends of the struts 354 and the support rib 362 engages an interior surface of an end wall 342a of the shell 342. The insert 356 can then be secured in place in various ways, including with adhesives, with a press-fit engagement, with detents or similar other features (not shown) and so on. In this way, for example, the mirror 346 can be appropriately aligned with the mirror 344 and the lens 348 (or other optical elements) without requiring excessively complex internal geometry or assembly procedures for the shell 342.

Generally, the shell 342 can be configured for relatively low-profile attachment to a mobile device or case, and can include various features to facilitate use of the attachment body 304 with a camera of a mobile device. For example, a wall 342b of the shell 342 that is to be disposed generally adjacent to a field of view of a camera can be configured with an angled geometry so that interference with camera operation by the shell 342 can be minimized. The angled geometry of the wall 342b can also, for example, help to appropriately support one or more components of an optical device within the shell 342, such as the mirror 344 (e.g., as discussed above).

The attachment body 304 can also generally include features for removably securing the attachment body 304 to the attachment base 302. In the embodiment illustrated, for example, the attachment body 304 includes a set of attachment arms 364 and 366 extending out of a main opening 342c of the shell 342. The free end of each of the attachment arms 364 and 366 includes a respective protrusion 368 and 370, each of which can generally be configured with a complimentary (e.g., complimentarily angled) geometry to a corresponding one of the overhangs 322 and 324 on the attachment base 302.

In the embodiment illustrated, the ends of the protrusions 368 and 370 are offset from each other along the length direction 326, as are the ends of the attachment arms 364 and 366 generally. This arrangement can be similar to the offset arrangement for the attachment openings 318 and 320 and the overhangs 322 and 324, as discussed above. In other embodiments, however, other configurations are possible.

The attachment body 304 can also include features for engaging the indents 328 and 330 of the attachment base 302. In the embodiment illustrated, for example, each of the attachment arms 364 and 366 is disposed near, but spaced apart from, respective detents 372 and 374 (see FIG. 30, in particular). Generally, each of the detents 372 and 374 can exhibit a complimentary geometry to a corresponding one of the indents 328 and 330, so that the detents 372 and 374 can be seated appropriately within the indents 328 and 330 when the attachment body 304 is secured to the attachment base 302.

The attachment body 304 can also include various other features. In the embodiment illustrated, for example, the shell 342 includes an extended lower portion 376 that extends generally below a remainder of the shell 342 (e.g., a peripheral lower surface 378 of the shell 342), as well as an attachment lip 380 extending generally below the remainder of the extended lower portion 376. Generally, the attachment lip 380 can include a complimentary (e.g., complimentarily curved) geometry as the indent 308 in the camera opening 306 of the attachment base 302. In other embodiments, however, other configurations are possible.

In the embodiment illustrated, the attachment body 304 also includes an attachment tab 382, which can help to secure the attachment body 304 directly to a mobile device or case. In the embodiment illustrated, the attachment tab 382 exhibits a generally curved profile extending away from and below the shell 342, with an elongated detent 384 near a free end of the attachment tab 382 to engage a corresponding groove on a case or other object.

As illustrated in particular in FIGS. 31-33, the features described above can facilitate a user removably securing the attachment body 304 to the attachment base 302 with relative ease and rapidity. Generally, to attach the attachment body 304 to the attachment base, the attachment arms 364 and 366 can be aligned with and inserted into the attachment openings 318 and 320, and the attachment lip 380 can be aligned with and inserted into the camera opening 306. The attachment body 304 can then be slid along the length direction 326 until the protrusions 368 and 370 are seated in the overhangs 322 and 324 (and against the underside angled features 322*a* and 324*a*), the detents 372 and 374 are seated in the indents 328 and 330, and the attachment lip 380 is seated in the indent 308 of the camera opening 306.

As also noted above, the attachment openings 318 and 320 are offset from each other along the length direction 326, as are the protrusions 368 and 370 and the attachment arms 364 and 366. This arrangement can result in a relatively stable connection between the attachment body 304 and the attachment base 302, due to contact points between the protrusion 368 and the angled feature 322*a* being offset from contact points between the protrusion 370 and the angled feature 324*a* along both the length and the width of the assembly.

Other relative offsets of various features can also be useful. For example, as illustrated in FIG. 33 in particular, when the attachment body 304 and the attachment base 302 are firmly (and removably) secured together, bottom surfaces 364*a* and 366*a* of the attachment arms 364 and 366 are offset along a height direction 386 from a bottom surface 302*a* of the attachment base 302. This can be useful, for example, in order to prevent the attachment arms 364 and 366 from sliding along, and potentially scratching, a surface against which the bottom surface 302*a* of the attachment base 302 is seated (e.g., a surface of a mobile device (not shown in FIG. 33)).

In some aspects, a lack of offsets between different parts of the aimer accessory 300 can also provide useful stability. For example, as illustrated in FIGS. 31 and 33 in particular, when the attachment body 304 and the attachment base 302 are firmly secured together, a bottom surface 380*a* of the attachment lip 380 of the shell 342 can be generally flush with the bottom surface 302*a* of the attachment base 302. Accordingly, the attachment lip 380 can engage with a surface against which the bottom surface 302*a* of the attachment base 302 is seated (e.g., a surface of a mobile device (not shown in FIG. 31)) in order to further stabilize the attachment body 304 and the aimer accessory 300 generally.

With the attachment body 304 and the attachment base 302 assembled as illustrated, the camera opening 306 of the attachment base 302 is left generally open, while the light-source opening 316 of the attachment base 302 is fully enclosed (at least on one side of the attachment base 302) by the shell 342 of the attachment body 304. Further, the light-source opening 316 is generally aligned with one or more components of the optical device of the attachment body 304 (e.g., with the first mirror 344 within the shell 342). Accordingly, the assembled aimer accessory 300 can be used with a camera of a mobile device to capture images via the camera opening 306. Further, due to the enclosure of the light-source opening 316 by the shell 342, the assembled aimer accessory 300 can be used both to route light from a light source of the mobile device through the optical device of the attachment body 304, and to otherwise generally occlude the light source to prevent unwanted illumination of external objects.

In order to use the aimer accessory 300 with a mobile device having a camera and a light source, the aimer accessory 300 can be secured in place relative to the mobile device with the camera opening 306 aligned with the camera, and with the light-source opening 316 aligned with the light source. In some embodiments, this alignment can be obtained through the use of a case configured to engage the attachment base 302.

Figure 35:
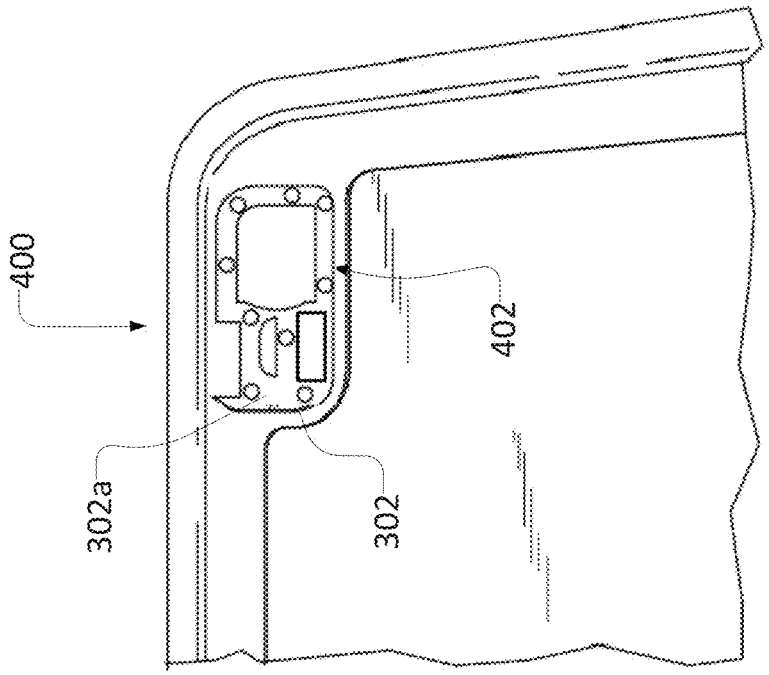
FIG. 35 is a front elevation view of the insert of FIG. 34 engaged with the case of FIG. 34.
Figure 34:
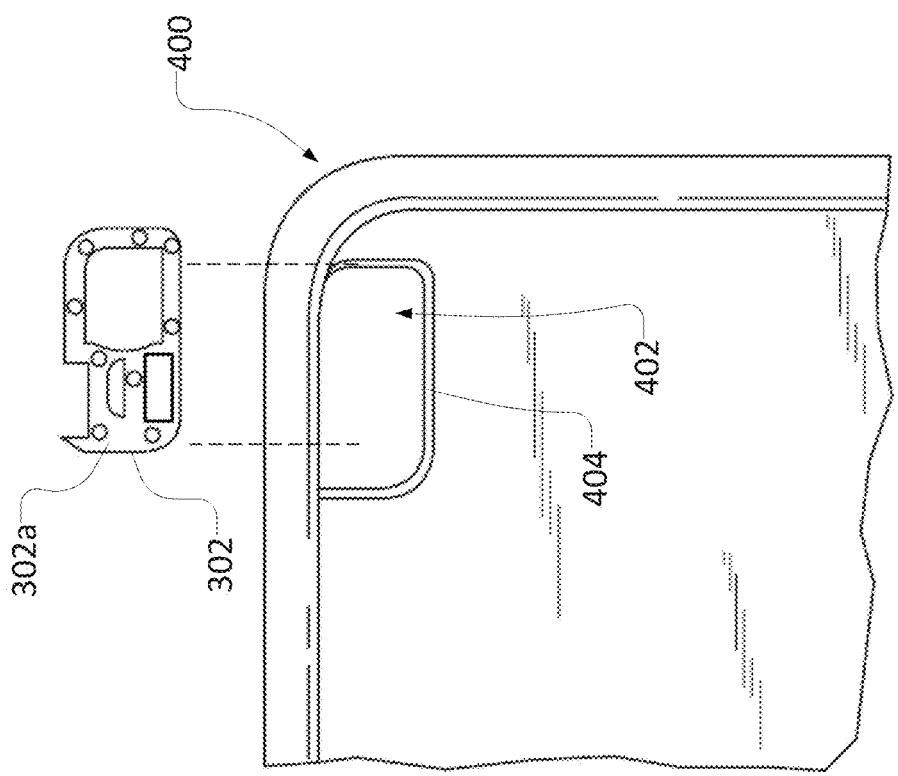
FIG. 34 is a front elevation view of an insert for the attachment assembly of FIG. 28 and part of a case for a mobile device.

As illustrated in FIG. 34, for example, a case 400 for use with the aimer accessory 300 and a mobile device (not shown in FIG. 34) can include a camera opening 402 that is generally configured to align with a camera and a light-source of the mobile device when the mobile device is inserted into the case 400. The camera opening 402 exhibits a generally complimentary peripheral profile as the attachment base 302, with an internal shoulder 404 that is generally complimentary to the shoulder 312 of the attachment base 302 (see, e.g., FIG. 29). Accordingly, as illustrated in FIG. 35, the attachment base 302 can be inserted into the inside of the case 400, in alignment with the camera opening 402, so that engagement of the shoulder 312 with the shoulder 404 prevents the attachment base 302 from being removed from the case 400 via the camera opening 402.

Figure 36:
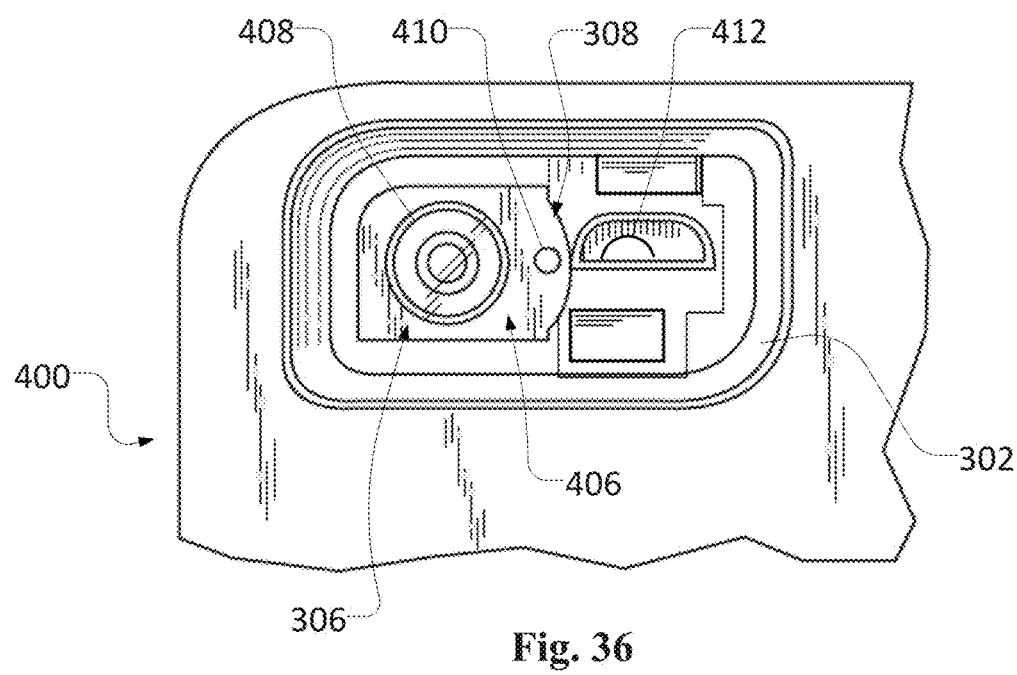
FIG. 36 is a rear elevation view of the insert of FIG. 34 engaged with the case of FIG. 34, with a mobile device inserted into the case.

As illustrated in FIG. 36, when a mobile device 406 is then inserted into the case 400, the mobile device 406 can seat against the bottom surface 302*a* of the attachment base 302 (see also FIGS. 29 and 35), thereby cooperating with the shoulder 404 to secure the attachment base 302 within the case 400 and in alignment with the camera opening 402. As also illustrated in FIG. 36, with the attachment base 302 and the mobile device 406 thus inserted into the case 400, a camera lens 408 of the mobile device 406 can be aligned with the camera opening 306 in the attachment base 302 so that the attachment base 302 generally does not obstruct image capture with the camera lens 408.

Further, in the embodiment illustrated, the indent 308 in the camera opening 306 is aligned with a microphone 410 (or other similarly located feature) on the mobile device 406, so that the microphone (or other feature) can still be used (e.g., for noise-cancellation purposes) even with the attachment base 302 in place. Also in the embodiment illustrated, the light-source opening 316 is generally aligned with a light source 412 of the mobile device 406, but with the blocking feature formed by the wall 316*a* of the light-source opening 316 partially occluding the light source 412 (e.g., a yellow-colored portion thereof). Accordingly, when the attachment body 304 is secured to the attachment base 302, some but not all of the light from the light source 412 can pass into the shell 342 for manipulation by the optical device therein (e.g., the assembly of the lens 348 and the mirrors 344 and 346).

Figure 37:
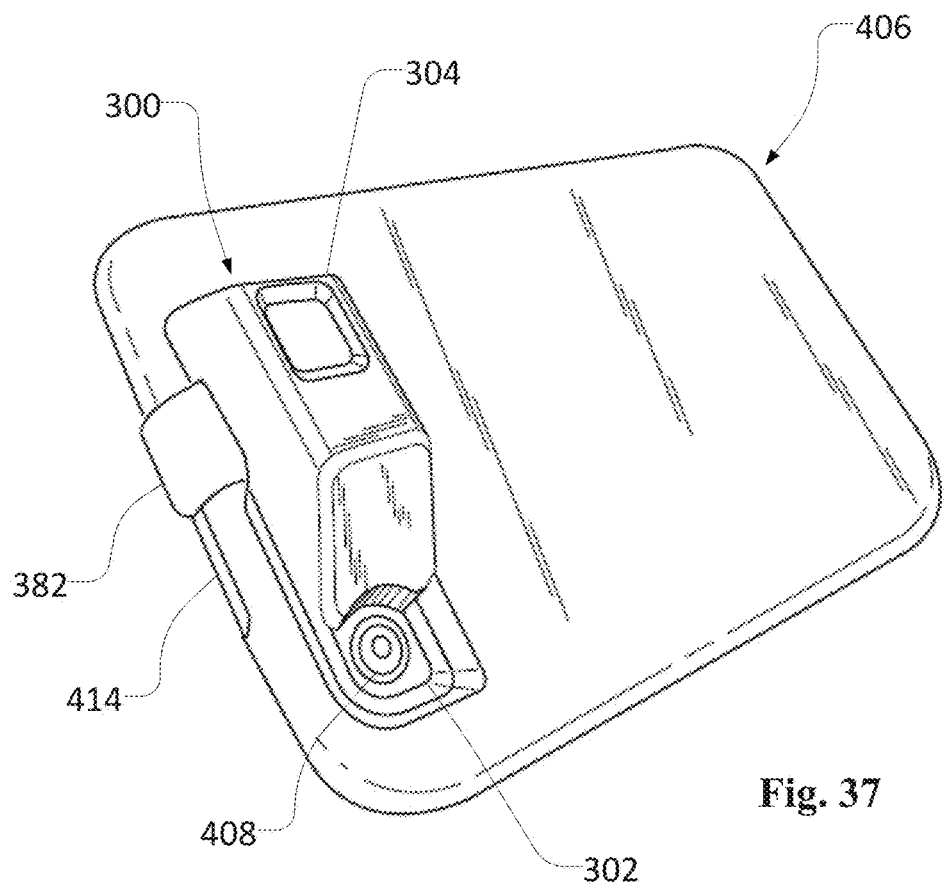
FIG. 37 is a top, left, rear perspective view of the attachment assembly of FIG. 28 secured to the case of FIG. 34 for use with the mobile device of FIG. 36.

As illustrated in FIG. 37, once the mobile device 406 and the attachment base 302 have been secured in the case 400, the attachment body 304 can be removably secured to the attachment base 302 (e.g., as described above) for use with the camera lens 408 and the light source 412 of the mobile device 406. As also illustrated in FIG. 37, to further secure the attachment body 304 relative to the mobile device 406, the attachment tab 382 of the attachment body 304 can be disposed to wrap onto a side (e.g., the top side) of the case 400, with the detent 384 (see, e.g., FIG. 33) engaging a groove 414 on the case 400.

In other embodiments, other configurations are possible, including variations on the features discussed above. For example, in some embodiments, one or more attachment arms can be provided on an attachment base rather than on an attachment body, and one or more corresponding attachment openings can be provided on the attachment body rather than on the attachment base. Similarly, for example, one or more features similar to the detents 372 and 374 can be provided on an attachment base rather than on an attachment body, and one or more corresponding indents can be provided on the attachment body rather than on the attachment base. In some embodiments, an attachment base can be configured to entirely occlude a light source of a mobile device.

In other embodiments, an attachment base can also (or alternatively) be configured to attach in different ways to a case (or mobile device). For example, an attachment base can be configured to attach to the exterior of a case rather than through engagement with an internal shoulder of the case.

Figure 38:
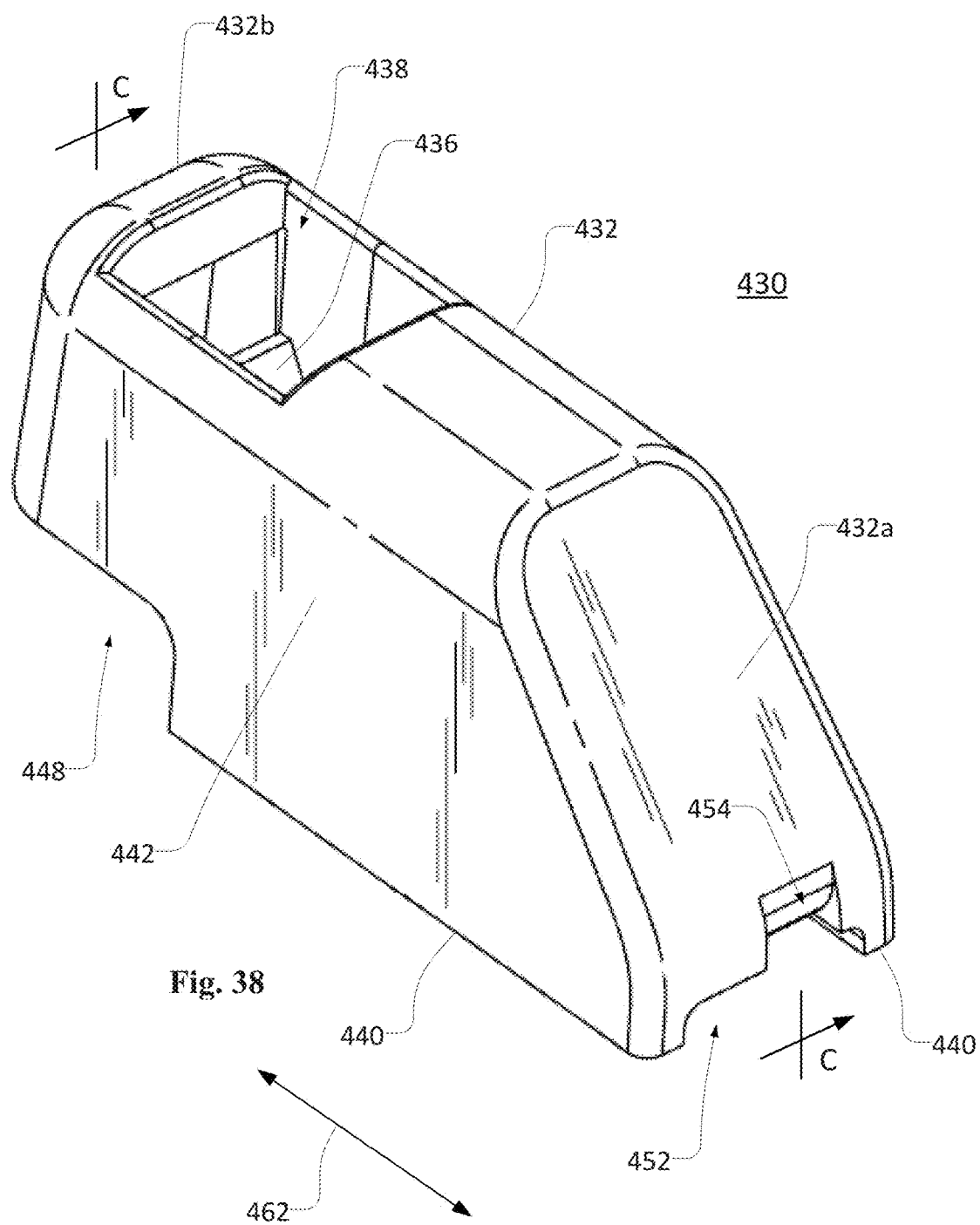
FIG. 38 is a top, left, rear perspective view of an attachment body according to this disclosure.
Figure 39:
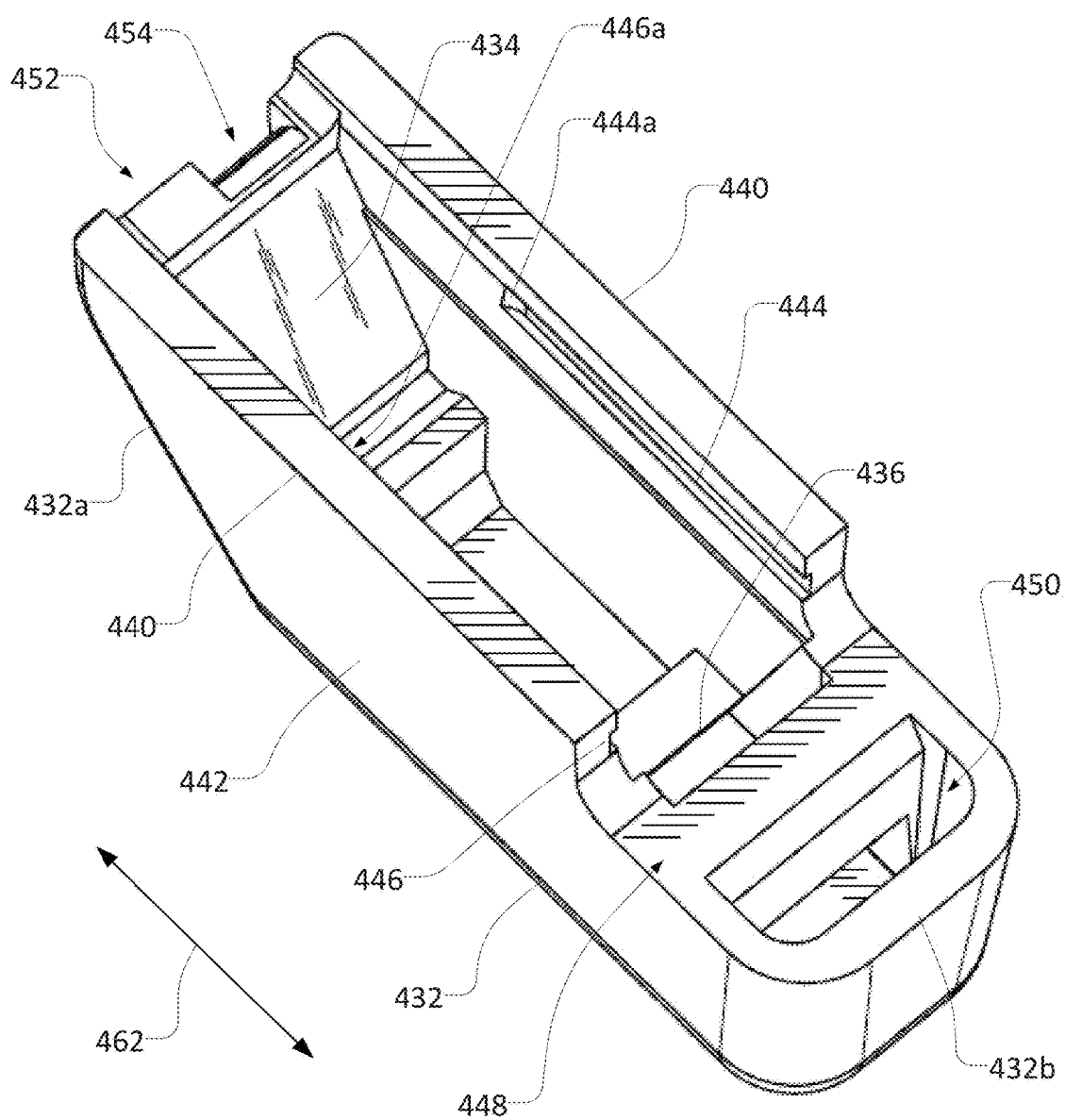
FIG. 39 is a top, right, front perspective view of the attachment body of FIG. 38.

An attachment body 430 for another aimer accessory is illustrated in FIGS. 38 and 39. Similarly to the attachment body 304, the attachment body 430 can generally include one or more optical devices (e.g., mirror arrangements) and is configured to be removably secured to an attachment base (as discussed below) that can in turn be secured to a mobile device with a camera (not shown in FIGS. 38 and 39).

In the embodiment illustrated, the attachment body 430 includes a housing portion generally formed as a single-piece shell 432 that is configured to enclose and support part or all of one or more optical devices. For example, the shell 432 can be configured to enclose and support a mirror assembly or a light pipe for use with a light source on a relevant mobile device.

Also in the embodiment illustrated, the shell 432 is configured to enclose an optical device configured as a mirror assembly with various mirrors (not shown) and a lens (not shown). Accordingly, the shell 432 includes internal support surfaces 434 and 436 to support various mirrors (not shown), as well as a lens opening 438 configured to receive a lens (not shown). The lens and mirrors (not shown) can be secured within the shell 432 in various ways, including through the use of adhesives, press-fit engagement, and so on.

Generally, the shell 432 can be configured for relatively low-profile attachment to a mobile device or case, and can include various features to facilitate use of the attachment body 304 with a camera of a mobile device. For example, a wall 432a of the shell 432 that is to be disposed generally adjacent to a field of view of a camera can be configured with an angled geometry so that interference with camera operation by the shell 432 can be minimized. The angled geometry of the wall 432a can also, for example, help to appropriately support one or more components of an optical device, such as a mirror, within the shell 432.

The attachment body 430 can also generally include features for removably securing the attachment body 430 to an attachment base (e.g., an attachment base as discussed below). For example, the shell 432 can include a pair of support legs 440 extending downwardly from a main body 442 of the shell 432, with a set of internal grooves 444 and 446. In the embodiment illustrated, the grooves 444 and 446 extend partly along the length of the support legs 440 from an area below an overhang 448 at one end of the support legs 440 to tapered ends 444a and 446a of the respective grooves 444 and 446.

The attachment body 430 can also include various other features. In the embodiment illustrated, for example, the shell 432 includes a rounded opening 452 at a bottom end of the wall 432a, and a inwardly curving channel 454 extending along part of the wall 432a to the opening 452. The shell 432 also includes an internal recess 450 extending into the interior of the shell 432 from within the overhang 448.

Figure 40:
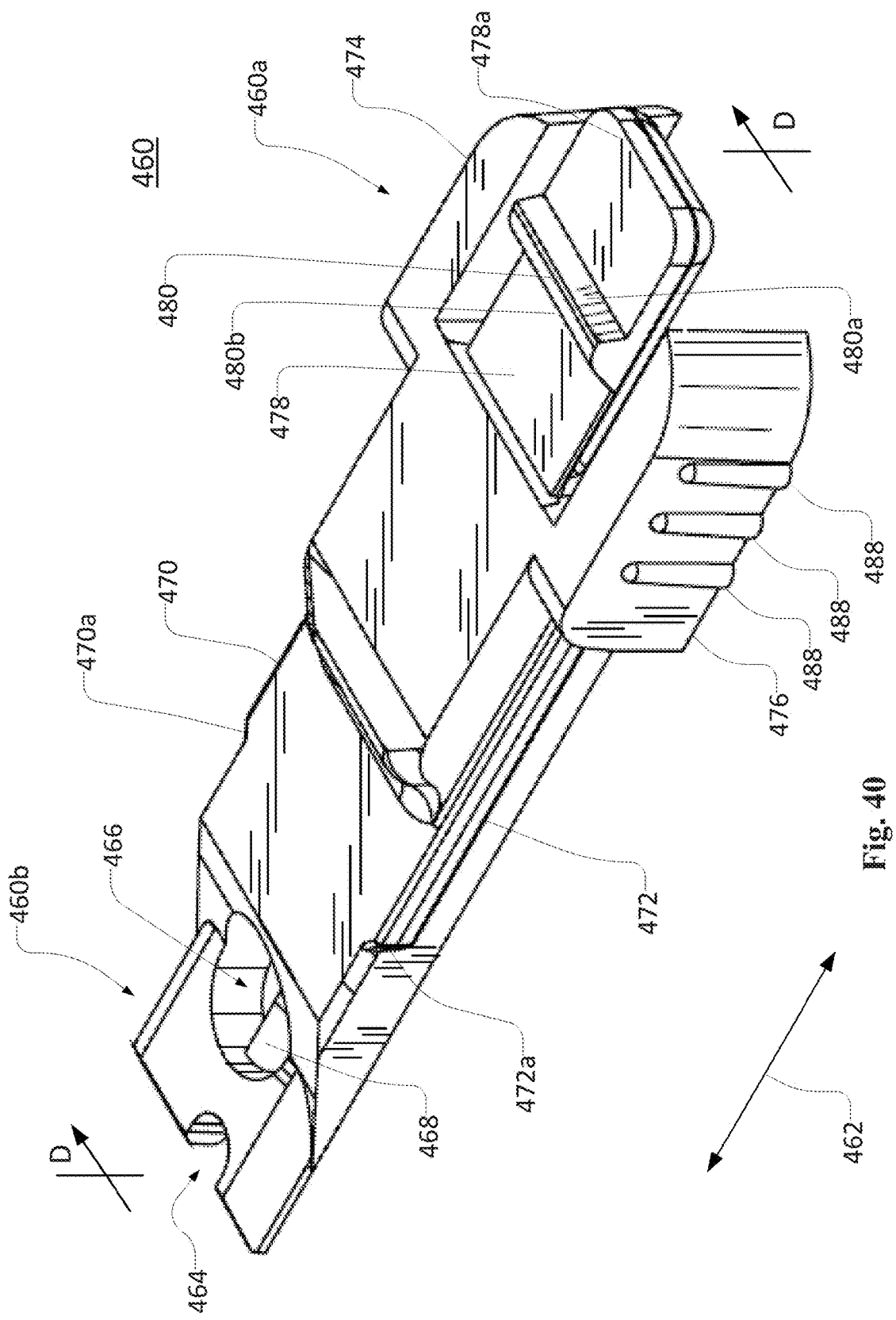
FIG. 40 is a bottom, right, rear perspective view of an attachment base according to this disclosure.
Figure 41:
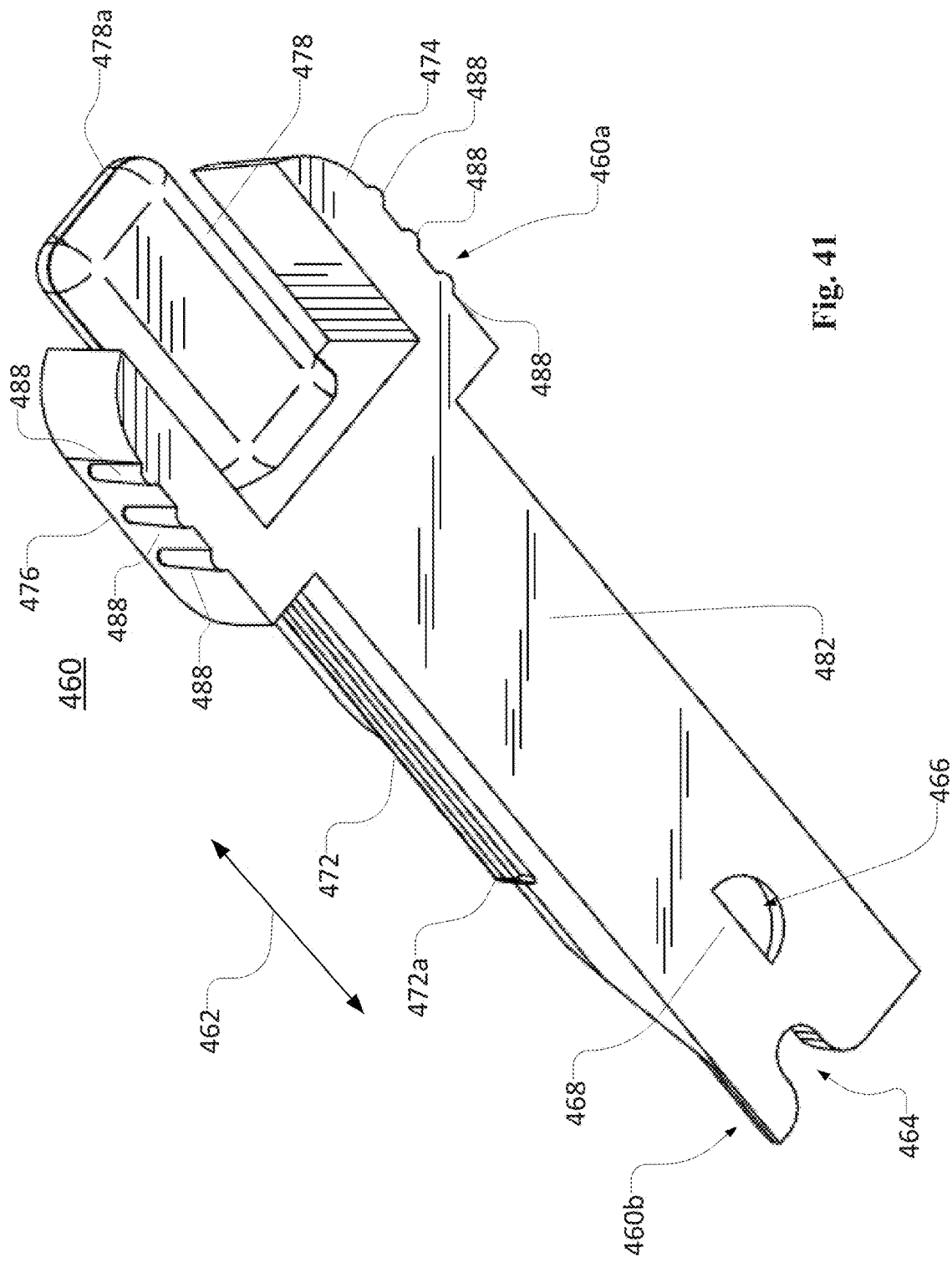
FIG. 41 is a bottom, right, front perspective view of the attachment base of FIG. 40.

An attachment base 460 for use with the attachment body 430 is illustrated in FIGS. 40 and 41. In the embodiment illustrated, the attachment base 460 is formed as a single-piece body that generally tapers in height along a length direction 462 from a raised end 460a to a lower-profile end 460b. A generally rounded opening 464 is provided at the lower-profile end 460b, as is a light-source opening 466. In the embodiment illustrated, the light-source opening 466 is configured as a generally circular or ovular opening with a generally semi-circular or semi-ovular blocking feature 468 occluding approximately half of the light-source opening 466. As such, as illustrated in FIG. 41, the light-source opening 466 present a generally semi-circular or semi-ovular aperture for admission of light (e.g., from a light source of a mobile device).

The attachment base 460 can also generally include structures to assist in removably securing the attachment body 430 to the attachment base 460. In the embodiment illustrated, for example, the attachment base 460 includes a set of attachment rails 470 and 472, a pair of grip arms 474 and 476, and a cantilevered locking tab 478. The attachment rails 470 and 472 generally extend along part of the length of the attachment base 460 between respective end walls of the grip arms 474 and 476 and respective tapered ends 470a and 472a of the attachment rails 470 and 472. The grip arms 474 and 476 are configured to be generally rigid and include respective sets of raised grip features 488, which can assist a user in manually positioning or otherwise holding the attachment base 460. The locking tab 478 extends generally between the grip arms 474 and 476 and is configured to be elastically deformable relative to the remainder of the attachment base 460 (e.g., relative to the grip arms 474 and 476) when the locking tab 478 is manually subjected to force at or near a free end 478a. An upper surface of the locking tab 478 includes a detent 480, with a flattened locking wall 480a and a sloped and rounded entrance wall 480b.

As illustrated in FIG. 41 in particular, the attachment base 460 includes a generally flat bottom surface 482. As such, for example, the attachment base 460 can be secured directly to a flat surface of a mobile device (or case) using adhesives or adhesive strips (e.g., double-sided tape) or other attachment mechanisms (e.g., magnets). In other embodiments, other configurations are possible. For example, the attachment base 460 can be provided with a shoulder similar to the shoulder 312 of the attachment base 302 (see, e.g., FIG. 29) so that the attachment base 460 can engage a case for a mobile device.

Figure 42:
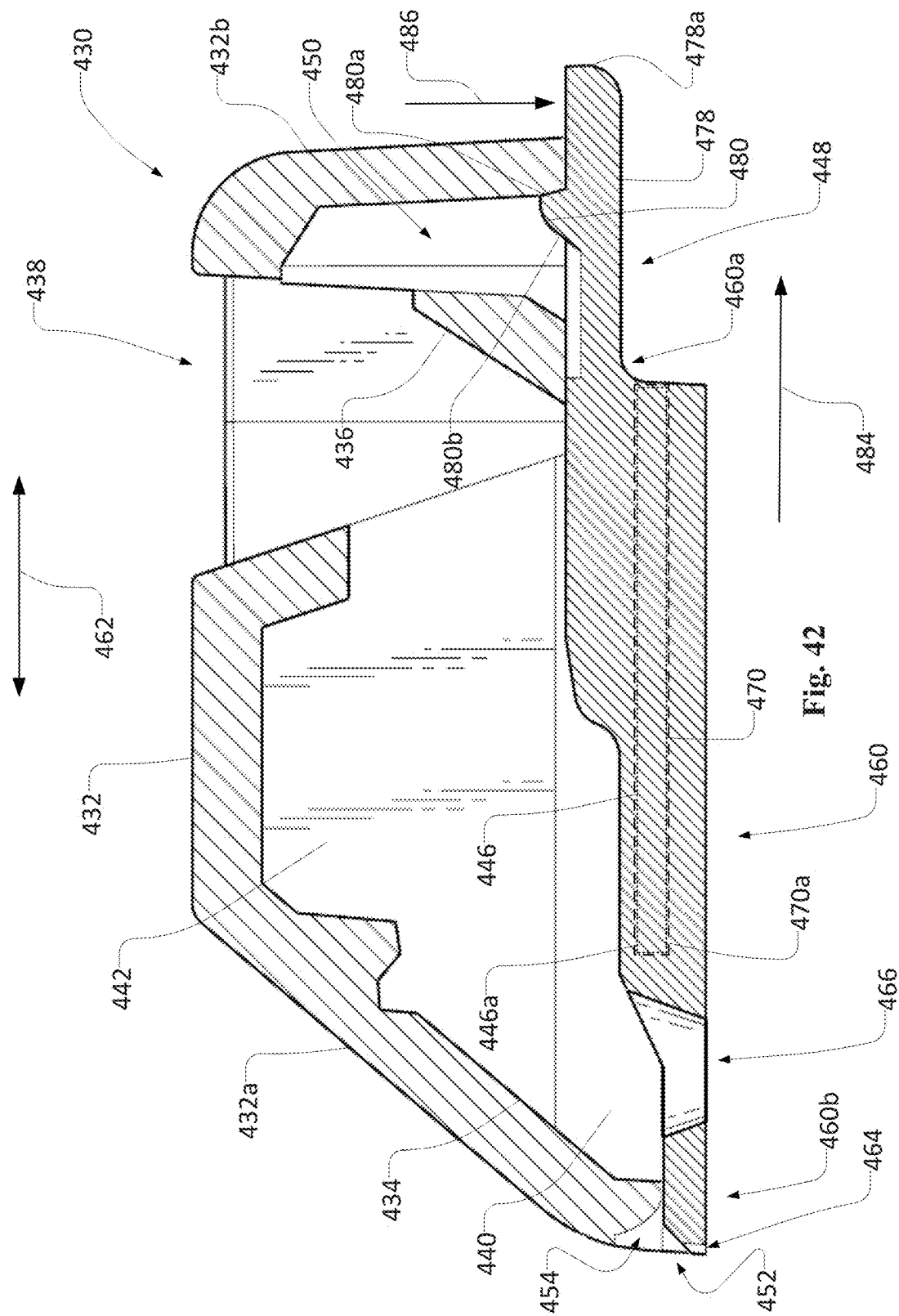
FIG. 42 is a side sectional view of the attachment body of FIG. 38 removably secured to the attachment base of FIG. 40, taken along plane C-C of FIG. 38 and plane D-D of FIG. 39, respectively.

Referring in particular to FIG. 42, in preparation for securing the attachment body 430 to the attachment base 460, the lower-profile end 460b of the attachment base 460 can be aligned with the overhang 448 on the attachment body 430 (or vice versa), with the attachment rails 470 and 472 (only the attachment rail 470 is shown, in dotted relief, in FIG. 42) generally aligned with the grooves 444 and 446 (only the groove 446 is shown, in dotted relief, in FIG. 42). The attachment body 430 can then be moved relative to the attachment base 460, as indicated by arrow 484, in order to move the attachment rails 470 and 472 into the respective grooves 444 and 446.

As the attachment rails 470 and 472 are moved farther into the grooves 444 and 446, the detent 480 on the locking tab 478 can come into contact with a rear wall 432b of the shell 432. With continued movement of the attachment body 430 in the direction of the arrow 484, the angled profile of the entrance wall 480b of the detent and the movement of the attachment body 430 relative to the attachment base 460 can then deflect the locking tab 478 downward (e.g., as indicated by arrow 486). With further relative movement of the attachment body 430 and the attachment base 460, the detent 480 can clear the wall 432b, such that the locking tab 478 is released from the noted deflection and the detent 480 can move into the recess 450 in the shell 432. The locking wall 480a of the lock can then seat against an interior surface of the wall 432b to generally prevent disconnection of the attachment body 430 from the attachment base 460 by movement of the attachment body 430 opposite the direction of arrow 484.

In some embodiments, the attachment rails 470 and 472 and the grooves 444 and 446 can be dimensioned so that the detent 480 clears the wall 432b substantially simultaneously with the tapered ends 470a and 472a of the attachment rails 470 and 472 reaching the tapered ends 444a and 446a of the grooves 444 and 446. Accordingly, the detent 480, the wall 432b, the grooves 444 and 446, and the attachment rails 470 and 472 can collectively and snugly secure the attachment body 430 to the attachment base 460.

To remove the attachment body 430 from the attachment base 460, the locking tab 478 can be deformed downward (e.g., with manual force applied at the free end 478a) until the detent 480 clears the wall 432b. The attachment rails 470 and 472 can then be slid free of the grooves 444 and 446 and the attachment body 430 generally separated from the attachment base 460.

As also illustrated in FIG. 42, when the attachment body 430 is fully secured to the attachment base 460, the light-source opening 466 of the attachment base 460 is generally aligned with the internal support surface 434 of the attachment body 430. Accordingly, light passing into the attachment body 430 via the light-source opening 466 can generally fall on a mirror (not shown) or other optical device disposed on the support surface 434. Further, the lower-profile end 460b of the attachment base 430 generally extends into the opening 452 in the shell 432, with the rounded opening 464 of the attachment base 460 being generally aligned with the channel 454 in the shell 432.

Figure 43:
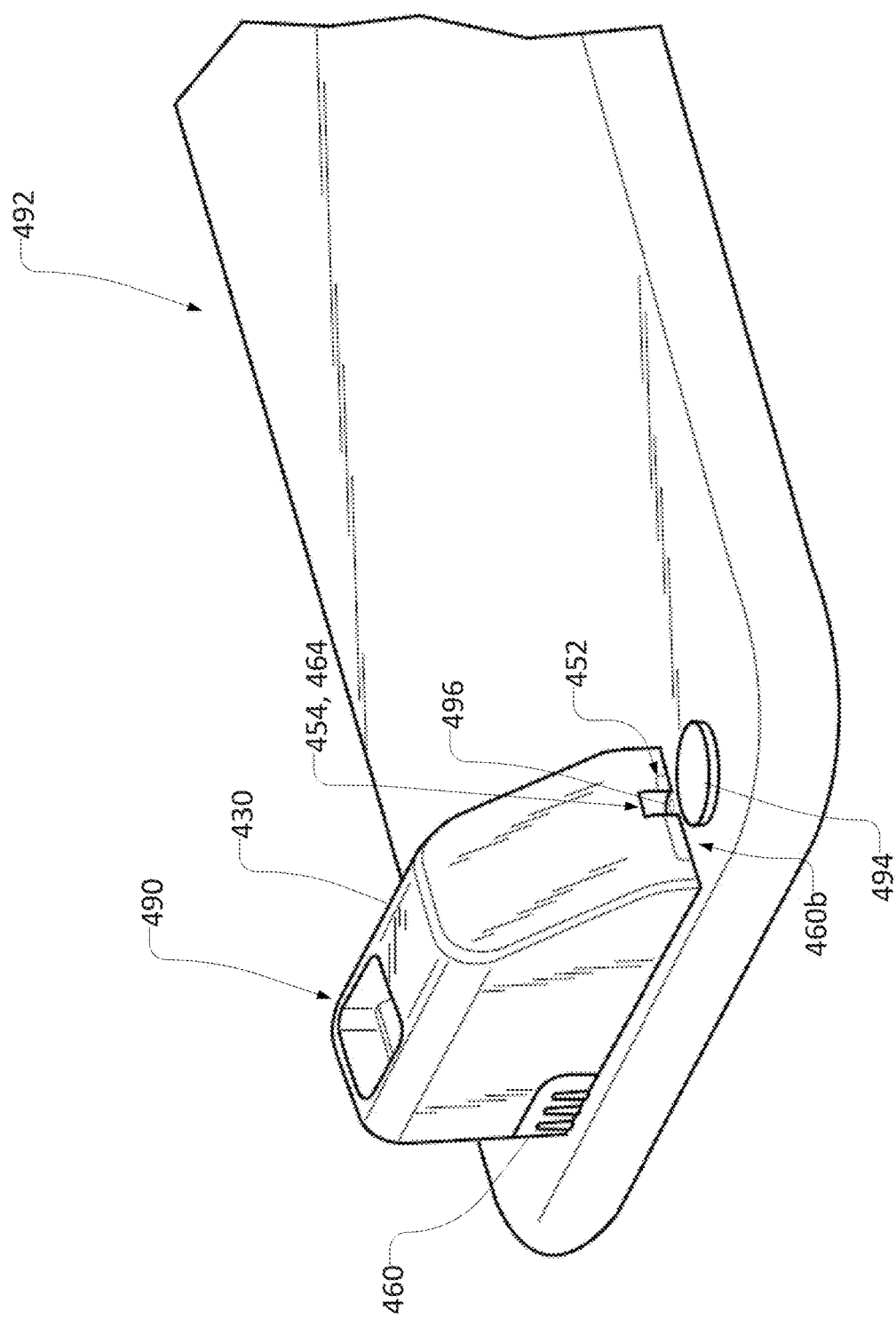
FIG. 43 is a top, left, rear perspective view of the attachment body of FIG. 38 engaged with the attachment base of FIG. 40, with the attachment base engaged for use with a mobile device.

FIG. 43 illustrates an aimer accessory 490 formed from the attachment body 430 and the attachment base 460, as installed for use with a mobile device 492 that includes a camera lens 494 and a microphone 496 (e.g., for noise-cancellation functionality). Generally, the attachment base 460 can be installed on the mobile device 492 (e.g., using an adhesive strip (not shown)) so that the lower-profile end 460b of the attachment base 460 is adjacent to, but does not overlap, the camera lens 494 and so that the opening 464 is generally aligned with the microphone 496. The attachment body 430 can then be secured to the attachment base 460 (e.g., as described above), with the opening 452 providing clearance for the camera lens 494 as the attachment body 430 is slid onto the attachment base. With the attachment body 430 thus secured, the aimer accessory 490 generally encloses completely a light source (not shown) of the mobile device 492, so that light from the light source is prevented from illuminating surrounding objects except by passing through the attachment body 430. Further, despite this generally complete enclosure with regard to the light source, the alignment of the channel 454 with the opening 464 still allows for the microphone 496 to remain exposed for operation.

As also noted above, different arrangements are possible for an optical device included in an aimer accessory according to this disclosure. In some embodiments, an optical device can include one or more mirrors (or other features, such as other reflecting surfaces, for changing the path of light rays) as well as a mask (or other feature) to help create a particular pattern of light on a relevant target. As illustrated in FIG. 44A, for example, an optical device 500 according to some embodiments of the invention includes a pair of mirrors 502 and 504 arranged to direct light from a light source 506 generally along an offset optical axis 508. In order to provide a pattern on a relevant target, a mask can be provided, such as a generally non-reflective mask 510 disposed on the mirror 504. In the embodiment illustrated in FIG. 44B, the mask 510 includes four oval (e.g. elliptical or circular) openings 512, such that only light from the light source 506 that is incident on the openings 512 can pass through the mask 510 to be reflected from the mirror 504. Correspondingly, when light from the optical device 500 reaches a target 514 it will form a pattern of ovals (e.g., including the ovals 516 and 518), as may be useful to help a user align a camera with a barcode.

In the embodiment illustrated in FIG. 44A, the mirrors 502 and 504 are generally planar mirrors. In some embodiments, non-planar mirrors can be used. As illustrated in FIG. 45, for example, an optical device 530 is configured similarly to the optical device 500, with a pair of mirrors 532 and 534 arranged to direct light from a light source 536, through the optical device 530, to a target 538. Similarly to the mask 510 (see FIG. 44A), a mask 540 is provided on the mirror 534 in order to help project a pattern of ovals (e.g., as represented by the ovals 542 and 544) onto the target 538. In contrast to the optical device 500, however, the mirror 532 of the optical device 530 is configured as parabolic mirror. As illustrated by relatively light paths 546, for example, this parabolic configuration of the mirror 532 can help to collimate light from the light source 536 and thereby produce a pattern of smaller and more intensely lit ovals (e.g., including the ovals 542 and 544) arranged around an optical axis 548.

In the embodiments illustrated in FIGS. 44A and 45, the masks 510 and 540 are disposed on the respective mirrors 504 and 534. In some embodiments, a mask (or other similar feature) can be disposed at other locations within an optical device. In the embodiment illustrated in FIG. 46, for example, an optical device 550 is configured similarly to the optical device 530 (see FIG. 45), with a parabolic mirror 552 and a planar mirror 554 arranged to direct light from a light source 556, through the optical device 550, to a target 558. In contrast to the optical device 530, however, the optical device 550 includes a mask 560 that is disposed between the mirrors 552 and 554, but is not disposed directly on either of the mirrors 552 and 554. As illustrated by the light paths 562 and by the ovals 564 and 566, this configuration can result in a similar illumination of the target 558 as can be provided by the optical device 530 for the target 538 (see FIG. 45).

Figure 47:
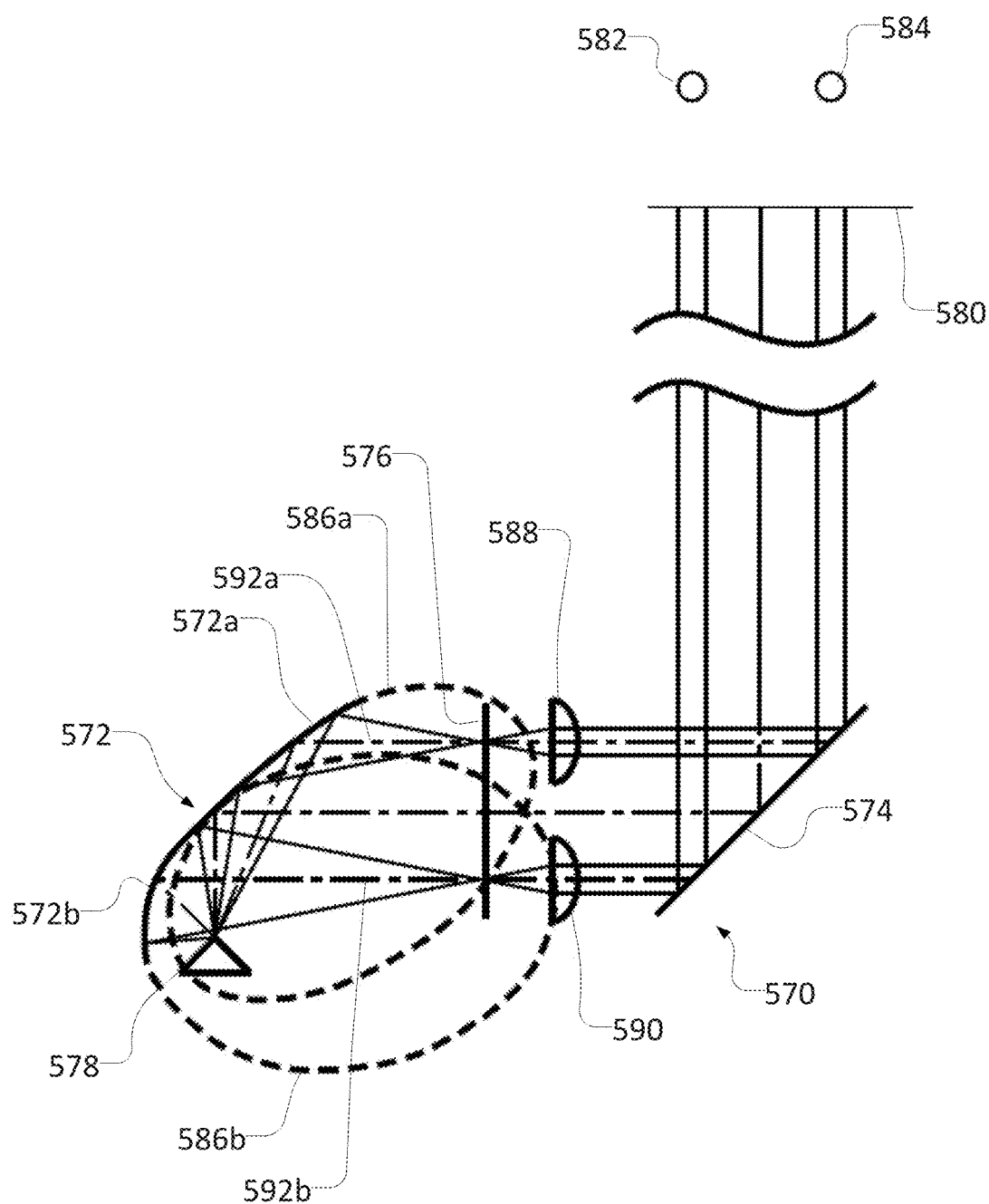
FIG. 47 is a schematic view of yet another optical device for projecting a pattern onto a target according to this disclosure.

In some embodiments, other configurations of mirrors (or other reflecting surfaces) can be used. As illustrated in FIG. 47, for example, an optical device 570 includes a pair of mirrors 572 and 574, and a mask 576 disposed between the mirrors 572 and 574. The mirror 572 is configured with a plurality of (e.g., four) elliptical segments, such as elliptical segments 572a and 572b, which can result in light from a light source 578 being divided for travel through a mask 576 along multiple optical axes (e.g., optical axes 592a and 592b). In the embodiment illustrated, each of the elliptical segments of the mirror 572 (e.g., including the elliptical segments 572a and 572b) is configured and arranged such the respective focal points of ellipses defined by the elliptical segments (e.g., ellipses 586a and 586b defined by the segments 572a and 572b) are generally coincident with the light source 578 and with at least one respective opening in the mask 576. In the embodiment illustrated, the optical device 570 further includes a set of lenses (e.g., including the lenses 588 and 590) disposed between the mask 576 and the mirror 574, to collimate the light that passes through the mask 576. With this configuration, for example, light from the light source 578 can be projected onto a target 580 with a relatively bright and focused pattern (e.g., as represented by the ovals 582 and 584).

In some embodiments, an optical device can use features or components other than mirrors to direct light. As illustrated in FIG. 48A, for example, an optical device 600 is configured similarly to the optical device 530 (see FIG. 45), in order to project a pattern (e.g., a pattern including ovals 602 and 604) on a target 606. In contrast to the optical device 530, however, the optical device 600 includes a transparent body 608 with reflecting surfaces 610 and 612 that serve to redirect light from a light source 614, along an optical axis 616, to the target 606. In the embodiment illustrated, the reflective surface 610 is generally planar, and the reflecting surface 612 is generally parabolic in order to collimate light from the light source 614. Further, rather than (or in addition to) the optical device 600 including a mask, the reflecting surface 612 is configured with four ovular reflective spots 618 (see FIG. 48B) surrounded by non- (or less) reflective material, in order to reflect light onto the target 606 with a particular pattern (e.g., as represented by the ovals 602 and 604).

In other embodiments, other configurations are possible. As illustrated in FIG. 49, for example, an optical device 620 is generally configured similarly to the optical device 600, with a transparent body 622 with reflecting surfaces 624 and 626 to direct light from a light source 628 onto a target 630 with a particular pattern (e.g., as represented by the ovals 632 and 634) onto the target 630. In the optical device 620, however, the reflecting surface 624 nearest to the light source 628 is configured as a generally planar reflecting surface (e.g., rather than a parabolic reflecting surface). Correspondingly, the optical device 620 includes a lens 636 disposed between the light source 628 and the reflecting surface 624, in order to collimate light from the light source 628 for passage through the transparent body 622 and projection onto the target 630.

It will be understood that many variations on the embodiments discussed above may be possible, including variations combining elements of multiple of the embodiments together, variations substituting elements from one embodiment for elements of another embodiment, and variations rearranging elements of one or more embodiments. For example, with regard to the optical devices illustrated in FIGS. 44A through 49, it may be possible to include collimating elements (e.g., parabolic mirrors or reflecting surfaces, lenses, and so on) before a mask, after a mask, or both before and after a mask, relative to the path of light from a light source to a target. Likewise, in some embodiments, one or more masks can be disposed at various locations within the relevant optical device than those specifically illustrated, one or more mirrors can be used in combination with one or more transparent bodies and reflecting surfaces, projection patterns other than patterns of ovals can be used, and so on.

There is thus disclosed an aimer module, aimer accessory and method for a mobile device. In some embodiments, the aimer module collimates diffuse light from a lamp on a mobile device for use in capturing a barcode image. The aimer module includes a means for receiving light from a lamp of the mobile device, and a means for generating a light pattern on the surface containing a barcode. The receiving means and the generating means may include a grating and/or configuration of mirrors. Registration of the light pattern and the barcode in a scan area enhances the ability of the specialized software on the mobile device to read the barcode.

In one embodiment, an aimer module for a mobile device is provided. The aimer module includes a grating configured to receive light from a lamp of the mobile device and to generate a light pattern on the surface containing a barcode. Registration of the light pattern and the barcode in a scan area enhances the ability of the specialized software on the mobile device to read the barcode.

An optical element for receiving light from the lamp and providing the light to the grating may be included. The optical element may further include at least one of a lens, a reflective surface, a light pipe and an optical fiber. A collector may be included that is configured for collecting light incident upon the camera.

The grating may include at least one of a pair of substantially parallel slits and a substantially rectangular array of holes. The aimer accessory may be configured to offset light from the lamp away from the camera, and may be configured to extend an optical range for reading the barcode. The aimer accessory may be configured as one of a simple offset aimer, a basic aimer, an elongated offset aimer, a standard offset aimer, or a tube offset aimer.

The aimer accessory may be configured for reading a barcode including in a format that is one of: Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; as well as others.

The aimer accessory may be configured for reading a barcode including a format that is one of: Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; SPARQCode; as well as others.

In another embodiment, a mobile device configured for blind or targeted scanning of a barcode is provided. The mobile device includes an aimer module affixed to the mobile device. The aimer module includes a grating configured to receive light from a lamp of the mobile device and to generate a light pattern on the surface containing a barcode. Registration of the light pattern and the barcode either in a scan area illuminated by the aimer module or in the near vicinity of the light pattern enhances the capability of a camera of the mobile device to read the barcode.

The mobile device may include one of a smartphone, a tablet computer, or other special purpose device. Blind and targeted scanning may enable reliable readout of the barcode without use of a display. The light pattern may include parallel lines, a single line, a square or rectangle, an image outline, a single or an array of dots, an arrow, a set of crosshairs, or other shapes or images.

The mobile device may include a computer program product that consists of machine executable instructions stored on non-transitory machine readable media, with the instructions configured for performing the functions depicted in FIG. 19.

According to a method of this disclosure, light is emitted from a lamp of the mobile device along a first optical path toward a barcode target. The first optical path defines a light axis L. The optical path of the emitted light is then changed from the first optical path to a second optical path that is oblique to the barcode target. The optical path of the emitted light is then changed again from the oblique optical path to a third optical path that is directed at the barcode target. The third optical path defines a light shifted axis L. Finally, the mobile device captures the image of the barcode target.

In some embodiments, an aimer accessory for a mobile device is provided. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

The accessory may further include an optical element for receiving light from the lamp and providing the light to the grating. The optical element may include at least one of a lens, a reflective surface, a light pipe and an optical fiber. The accessory may further include a collector configured for collecting light incident upon the camera. The grating may include at least one of a pair of substantially parallel slits and a substantially rectangular array of holes.

The accessory may be configured to offset light from the lamp away from the camera. The offset may be configured to extend an optical range for reading the barcode. The accessory may be configured as one of a simple offset aimer, a basic aimer, an elongated offset aimer, a standard offset aimer, a tube offset aimer, and a fitted aimer.

The body of the accessory may further include a retainer for retaining the accessory on the mobile device. The retainer may terminate in a clip. The accessory may be configured as a clip-on accessory.

The accessory may be configured for reading a barcode including a format that is one of: Codabar; Code 25, non-interleaved 2 of 5; Code 25 interleaved 2 of 5; Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; and, U.P.C.

The accessory may be configured for reading a barcode comprising a format that is one of: Aztec Code; Code 1; ColorCode; Color Construct Code; CrontoSign; CyberCode; d-touch; DataGlyphs; DataGlyphs; Data Matrix; Datastrip Code; digital paper; EZcode; High Capacity Color; High Capacity Color Barcode; HueCode; InterCode; MaxiCode; MMCC; NexCode; Nintendo e-Reader#Dot code; PDF417; Qode; QR code; ShotCode; and, SPARQCode. The accessory may be configured for reading a barcode comprising a plurality of colors.

In another illustrative embodiment, a mobile device configured for either blind or targeted scanning of a barcode is provided. The mobile device includes a body configured for being clipped onto the mobile device. The body includes a collimator terminating with a grating disposed in a distal portion thereof. The grating is configured to receive light from a lamp of the mobile device and to generate a light pattern on the surface containing the barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

The mobile device may include one of a smart phone, a tablet computer and a special purpose device.

The either blind or targeted scanning enables reliable readout of the barcode without use of a display. The light pattern may include at least one of substantially parallel lines, an array of dots, and a set of crosshairs. Combinations of slits and holes may be used. A variety of orientations may be provided, and geometric patterns may be used as well.

In another illustrative embodiment, a method for configuring a mobile device for scanning a barcode is provided. The method includes selecting an aimer accessory for the mobile device. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. The aimer accessory is affixed to the mobile device. The method may further include detecting the light pattern and the barcode in a viewing angle of a camera of the mobile device and capturing the image of the barcode target. The method may further include detecting the light pattern as hovering over the barcode in a viewing angle of a camera of the mobile device and capturing the image of the barcode target.

The aimer accessory and the code reader application may be employed on a variety of mobile devices. Generally, it is only required that the mobile device include a camera, a lamp, and appropriate components for operation thereof. Examples of other mobile devices include tablet computers, as well as special purpose devices such as handheld units used for taking field inventory of assets, a dedicated barcode reader, and other such devices.

The grating may generate a variety of light patterns. For example, a set of dots, a single line, a square or rectangle, and crosshairs may be used. Combinations of slits and holes may be used. A variety of orientations may be provided, and geometric patterns may be used as well. In some embodiments, the grating is configured with regard for a particular type, or symbology, of barcode that will be read. For example, a substantially rectangular array of holes may be useful for registration with a substantially rectangular barcode, such as a PDF417 barcode.

In addition, a variety of techniques may be employed for barcode recognition. Use of horizontal bars, parallel lines, dots, crosshairs, and other such aiming patterns may be used to assist with barcode recognition.

An appropriately equipped aimer accessory may provide for re-concentrating light that would otherwise be dispersed.

Software may be downloaded onto or provided with the mobile device of this disclosure that produces a software-produced button on the display of the mobile device. In addition, initiation or triggering of a scan by the mobile device may be performed by programmatically re-mapping of one of the mobile device buttons for such use, or triggered externally using Wi-Fi, NFC, or other technology.

The software may further provide user feedback on "good" or "bad" images, or decode of a symbology, via user prompts such as an audible sound from the mobile device, a vibration from the mobile device, an activity on the display, such as blinking of the screen, a color change, a movement of an image displayed, etc. Additionally, the feedback may be wirelessly transmitted to a remote location for action, recording, etc.

The aimer module and accessory of this disclosure may further assist in battery conservation and power management since images may be captured more efficiently according to this disclosure.

In some embodiments, an aimer accessory can be formed to include an attachment base and an attachment body that can be removably secured to the attachment base. The attachment base can be configured to be secured to a mobile device or case through alignment with a case opening, adhesives, magnets, or other attachment mechanisms. The attachment body can include an optical device, such as a mirror arrangement, light pipe, or grating, and can be configured to be removably secured to the attachment base. In this way, for example, the attachment body can be removably secured to the mobile device or case so that the optical device of the attachment body can be used with a camera or light source of the mobile device.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean, unless otherwise limited or defined, that there are one or more of the elements. Similarly, the adjective "another," when used to introduce an element, is intended to mean one or more elements. The terms "including", "comprising," "having" and variations thereof are intended to be inclusive such that there may be additional elements other than the listed elements. Similarly, unless otherwise limited or defined, the phrases "at least one of A, B, and C," "one or more of A, B, and C," and the like, are meant to indicate A, or B, or C, or any combination of A, B, and/or C, including, potentially, single or multiple instances of each of A, B, and/or C.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An attachment assembly for use with one or more of a mobile device with a camera and a case for the mobile device, with the case including a first camera opening configured to align with the camera when the mobile device is inserted into the case, and with the case including a first shoulder at least partly surrounding the first camera opening, the attachment assembly comprising:

an attachment base configured to be secured to at least one of the mobile device and the case; and
an attachment body including at least one optical device for use with the camera and configured to be removably secured to the attachment base;
the attachment base removably securing the attachment body to the at least one of the mobile device and the case when the attachment body is removably secured to the attachment base and the attachment base is secured to the at least one of the mobile device and the case; and
the attachment base including:
  a second camera opening; and
  a second shoulder at least partly surrounding the second camera opening;
  the second shoulder engaging the first shoulder to align the second camera opening with the camera when the attachment base is secured to the case.

2. The attachment assembly according to claim 1, wherein the second shoulder is disposed inside of the case when the attachment base is secured to the case, with the first shoulder preventing removal of the attachment base from the case via the first camera opening.

3. The attachment assembly according to claim 1, with the mobile device including a light source, wherein the attachment base includes a light-source opening, the light-source opening being aligned with the light source when the attachment base is secured to the at least one of the mobile device and the case.

4. The attachment assembly according to claim 3, wherein the attachment base includes a blocking feature adjacent to the light-source opening, the blocking feature preventing passage of light from at least part of the light source into the attachment body.

5. The attachment assembly according to claim 1, wherein one of the attachment base and the attachment body includes at least one attachment opening with at least one overhang;
wherein another of the attachment base and the attachment body includes at least one attachment arm with at least one protrusion; and
wherein, with at least part of the at least one attachment arm disposed within the at least one attachment opening, the at least one protrusion engages the at least one overhang to removably secure the attachment body to the attachment base.

6. The attachment assembly according to claim 5, wherein the at least one attachment opening includes a first attachment opening with a first overhang and a second attachment opening with a second overhang;
wherein the at least one attachment arm includes a first attachment arm with a first protrusion and a second attachment arm with a second protrusion; and
wherein the first protrusion engages the first overhang and the second protrusion engages the second overhang to removably secure the attachment body to the attachment base.

7. The attachment assembly according to claim 6, wherein the first attachment arm is spaced apart from the second attachment arm relative to a direction extending along a width of the attachment body; and
wherein a free end of the first protrusion is spaced apart from a free end of the second protrusion relative to a direction extending along a length of the attachment body.

8. The attachment assembly according to claim 5, wherein the one of the attachment base and the attachment body that includes the at least one attachment opening with at least one overhang further includes at least one indent;

wherein the other of the attachment base and the attachment body includes at least one detent; and wherein, when the at least one protrusion engages the at least one overhang, the at least one detent engages the at least one indent to further removably secure the attachment body to the attachment base.

9. The attachment assembly according to claim 8, wherein the at least one indent is disposed on an opposite side of the at least one attachment opening from the at least one overhang.

10. The attachment assembly according to claim 5, wherein the mobile device seats against an inward-facing surface of the attachment base; and wherein, when the attachment body is removably secured to the attachment base, a free end of the at least one attachment arm is offset from the inward-facing surface and the mobile device.

11. The attachment assembly according to claim 1, wherein the attachment base includes a camera opening configured to be aligned with the camera when the attachment base is secured to the at least one of the mobile device and the case; and wherein the attachment body includes an attachment lip configured to extend at least partly into the camera opening when the attachment body is removably secured to the attachment base.

12. The attachment assembly according to claim 1, wherein the attachment body further includes an attachment tab configured to engage at least one of a front of the case, a front of the mobile device, a side of the case, and a side of the mobile device to further secure the attachment body to the at least one of the mobile device and the case.

13. The attachment assembly according to claim 1, wherein a first one of the attachment base and the attachment body includes at least one rail; and wherein a first other of the attachment base and the attachment body includes at least one groove configured to slidably receive the at least one rail to removably secure the attachment body to the attachment base.

14. The attachment assembly according to claim 13, wherein a second one of the attachment base and the attachment body includes a tab with a detent;

wherein a second other of the attachment base and the attachment body includes a recess configured to receive the detent;

wherein, with the tab in a first orientation, the detent engages the recess to prevent removal of the at least one rail from the at least one groove; and wherein, with the tab in a second orientation, the detent is removed from the recess to allow removal of the at least one rail from the at least one groove.

15. The attachment assembly according to claim 1, with the mobile device including a microphone, wherein the attachment base includes an opening configured to align with the microphone when the attachment base is secured to the at least one of the mobile device and the case.

16. The attachment assembly according to claim 1, wherein the at least one optical device includes one or more of a mirror arrangement, a lens, a light pipe, a light source and a grating.

17. An attachment base for securing an attachment body to a case for a mobile device with a camera, the attachment body including at least one optical device for use with the camera, the case including a first camera opening that is configured to align with a lens of the camera when the mobile device is inserted into the case, and the case further including a first shoulder at least partly surrounding the first camera opening, the attachment base comprising:

a second camera opening; and a second shoulder at least partly surrounding the second camera opening, the second shoulder engaging the first shoulder to at least partly align the second camera opening with the lens of the camera when the attachment base is secured to the case and the mobile device is inserted into the case;

the attachment base being configured to be removably secured to the attachment body, with at least one of the attachment base and the attachment body extending at least partly through the first camera opening, to secure the attachment body to the case.

18. The attachment base of claim 17, with the attachment body further including at least one of an attachment-body opening with an overhang and an attachment-body arm with a protrusion, the attachment base further comprising:

at least one of an attachment-base opening with an overhang and an attachment-base arm with at least one protrusion;

wherein the attachment-base opening is configured to receive at least part of the attachment-body arm, and the overhang of the attachment-base opening being configured to engage the at least one protrusion of the attachment-body arm, to removably secure the attachment body to the attachment base; and wherein the attachment-base arm is configured to extend at least partly into the attachment-body opening with the protrusion of the attachment-base arm engaging the overhang of the attachment-body opening to removably secure the attachment body to the attachment base.

19. An attachment assembly for use with a mobile device with a camera and a case for the mobile device, the case including a first camera opening that is configured to align with a lens of the camera when the mobile device is inserted into the case, and the case further including a first shoulder at least partly surrounding the first camera opening, the attachment assembly comprising:

an attachment base including:
at least one of attachment-base opening with an overhang and an attachment-base arm with a protrusion;
a second camera opening; and
a second shoulder at least partly surrounding the second camera opening, the second shoulder configured to engage the first shoulder to align the second camera opening with the lens of the camera when the mobile device is inserted into the case and prevent removal of the attachment base from the case via the first camera opening; and an attachment body including:
at least one optical device for use with the camera; and
at least one of an attachment-body arm with a protrusion and an attachment-body opening with an overhang;
the attachment-body arm being configured to extend at least partly into the attachment-base opening with the protrusion of the attachment-body arm engaging the overhang of the attachment-base opening, to removably secure the attachment body to the attachment base; and
the attachment-body opening being configured to receive at least part of the attachment-base arm, and the overhang of the attachment-body opening being configured to engage the protrusion of the attachment-base arm, to removably secure the attachment body to the attachment base.

20. An attachment assembly for use with one or more of a mobile device with a camera and a case for the mobile device, the attachment assembly comprising:
- an attachment base configured to be secured to at least one of the mobile device and the case; and
- an attachment body including at least one optical device for use with the camera and configured to be removably secured to the attachment base;
- the attachment base removably securing the attachment body to the at least one of the mobile device and the case when the attachment body is removably secured to the attachment base and the attachment base is secured to the at least one of the mobile device and the case
- one of the attachment base and the attachment body including at least one attachment opening with at least one overhang;
- another of the attachment base and the attachment body including at least one attachment arm with at least one protrusion; and
- with at least part of the at least one attachment arm disposed within the at least one attachment opening, the at least one protrusion engaging the at least one overhang to removably secure the attachment body to the attachment base.

21. The attachment assembly according to claim 20, wherein the at least one attachment opening includes a first attachment opening with a first overhang and a second attachment opening with a second overhang;
- wherein the at least one attachment arm includes a first attachment arm with a first protrusion and a second attachment arm with a second protrusion; and
- wherein the first protrusion engages the first overhang and the second protrusion engages the second overhang to removably secure the attachment body to the attachment base.

22. The attachment assembly according to claim 21, wherein the first attachment arm is spaced apart from the second attachment arm relative to a direction extending along a width of the attachment body; and
- wherein a free end of the first protrusion is spaced apart from a free end of the second protrusion relative to a direction extending along a length of the attachment body.

23. The attachment assembly according to claim 20, wherein the one of the attachment base and the attachment body that includes the at least one attachment opening with at least one overhang further includes at least one indent;
- wherein the other of the attachment base and the attachment body includes at least one detent; and
- wherein, when the at least one protrusion engages the at least one overhang, the at least one detent engages the at least one indent to further removably secure the attachment body to the attachment base.

24. The attachment assembly according to claim 23, wherein the at least one indent is disposed on an opposite side of the at least one attachment opening from the at least one overhang.

25. The attachment assembly according to claim 20, wherein the mobile device seats against an inward-facing surface of the attachment base; and
- wherein, when the attachment body is removably secured to the attachment base, a free end of the at least one attachment arm is offset from the inward-facing surface and the mobile device.

26. The attachment assembly according to claim 20, with the case including a first camera opening configured to align with the camera when the mobile device is inserted into the case, and with the case including a first shoulder at least partly surrounding the first camera opening, wherein the attachment base includes:
- a second camera opening; and
- a second shoulder at least partly surrounding the camera opening;
- the second shoulder engaging the first shoulder to align the second camera opening with the camera when the attachment base is secured to the case.

27. The attachment assembly according to claim 26, wherein the second shoulder is disposed inside of the case when the attachment base is secured to the case, with the first shoulder preventing removal of the attachment base from the case via the first camera opening.

28. The attachment assembly according to claim 20, wherein the attachment base includes a camera opening configured to be aligned with the camera when the attachment base is secured to the at least one of the mobile device and the case; and
- wherein the attachment body includes an attachment lip configured to extend at least partly into the camera opening when the attachment body is removably secured to the attachment base.

29. The attachment assembly according to claim 20, wherein the attachment body further includes an attachment tab configured to engage at least one of a front of the case, a front of the mobile device, a side of the case, and a side of the mobile device to further secure the attachment body to the at least one of the mobile device and the case.

30. The attachment assembly according to claim 20, with the mobile device including a microphone, wherein the attachment base includes an opening configured to align with the microphone when the attachment base is secured to the at least one of the mobile device and the case.

31. The attachment assembly according to claim 20, wherein the at least one optical device includes one or more of a mirror arrangement, a lens, a light pipe, a light source and a grating.

* * * * *